US010341221B2

(12) United States Patent
Eckert et al.

(10) Patent No.: US 10,341,221 B2
(45) Date of Patent: *Jul. 2, 2019

(54) TRAFFIC ENGINEERING FOR BIT INDEXED EXPLICIT REPLICATION

(71) Applicant: Cisco Technology, Inc., San Jose, CA (US)

(72) Inventors: Toerless Eckert, Mountain View, CA (US); Ijsbrand Wijnands, Leuven (BE); Gregory J. Shepherd, Eugene, OR (US); Neale D. R. Ranns, Basingstoke (GB)

(73) Assignee: Cisco Technology, Inc., San Jose, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/814,575

(22) Filed: Jul. 31, 2015

(65) Prior Publication Data

US 2016/0254987 A1 Sep. 1, 2016

Related U.S. Application Data

(60) Provisional application No. 62/121,291, filed on Feb. 26, 2015.

(51) Int. Cl.
*H04L 12/761* (2013.01)
*H04L 12/46* (2006.01)
(Continued)

(52) U.S. Cl.
CPC .......... *H04L 45/16* (2013.01); *H04L 12/4633* (2013.01); *H04L 45/28* (2013.01);
(Continued)

(58) Field of Classification Search
None
See application file for complete search history.

(56) References Cited

U.S. PATENT DOCUMENTS 5,088,091 A 2/1992 Schroeder
5,138,615 A 8/1992 Lamport ....................... 370/400
(Continued)

FOREIGN PATENT DOCUMENTS

CN 1725 679 A 1/2006 ............. H04L 12/56
CN 1754 353 3/2006
(Continued)

OTHER PUBLICATIONS

Aggarwal, R., et al., "BGP Encodings and Procedures for Multicast in MPLS/BGP IP VPNs," Internet Engineering Task Force (IETF), Request for Comments 6514, Feb. 2012, pp. 1-59.
(Continued)

*Primary Examiner* — Chirag G Shah
*Assistant Examiner* — Amarnauth G Persaud
(74) *Attorney, Agent, or Firm* — Campbell Stephenson LLP

(57) ABSTRACT

Methods and network devices are disclosed for traffic-engineered forwarding through a new form of bit indexed explicit replication. In one embodiment, a method includes receiving at a first node in a network a message comprising a message bit array, and comparing bit values at one or more bit positions in the message bit array to one or more entries in a forwarding table stored at the first node. The one or more bit positions correspond in this embodiment to links in the network. This embodiment of the method further includes forwarding the message over a link represented in the forwarding table if a result of the comparing indicates that the link is included in a path to be taken by the message. In a further embodiment of the method, the message is a multicast message and forwarding the message comprises forwarding a replica of the multicast message.

19 Claims, 18 Drawing Sheets

(51) Int. Cl.

| | |
|---|---|
| ***H04L 12/703*** | (2013.01) |
| ***H04L 29/06*** | (2006.01) |
| *H04L 12/741* | (2013.01) |
| *H04L 12/751* | (2013.01) |
| *H04L 12/931* | (2013.01) |

(52) U.S. Cl.

CPC .............. *H04L 69/22* (2013.01); *H04L 45/02* (2013.01); *H04L 45/745* (2013.01); *H04L 49/201* (2013.01)

(56) References Cited

U.S. PATENT DOCUMENTS 5,764,624 A 6/1998 Endo ............................ 370/218
5,999,531 A 12/1999 Ferolito ........................ 370/390
6,032,197 A 2/2000 Birtwell ........................ 709/216
6,130,881 A 10/2000 Stiller .......................... 370/238
6,147,976 A * 11/2000 Shand ............... H04L 29/12009 370/254
6,148,000 A 11/2000 Feldman ....................... 370/394
6,240,188 B1 5/2001 Dondeti ........................ 380/259
6,374,303 B1 4/2002 Armitage et al. ............ 709/242
6,577,600 B1 4/2003 Bare ............................ 370/238
6,615,336 B1 9/2003 Chen ............................ 711/202
6,647,428 B1 11/2003 Bannai et al. ................ 709/245
6,771,673 B1 8/2004 Baum .......................... 370/535
6,778,532 B1 8/2004 Akahane ....................... 370/389
6,873,627 B1 3/2005 Miller
6,963,570 B1 11/2005 Agarwal .................... 370/310.2
7,023,846 B1 4/2006 Andersson et al. .......... 370/389
7,031,253 B1 4/2006 Katukam et al. ............. 370/222
7,031,607 B1 4/2006 Aswood Smith ............... 398/51
7,061,921 B1 6/2006 Sheth ....................... 370/395.52
7,068,654 B1 6/2006 Joseph et al. ................ 370/392
7,072,346 B2 7/2006 Hama ...................... 370/395.53
7,088,721 B1 8/2006 Droz et al. ................ 370/395.1
7,111,101 B1 9/2006 Bourke .......................... 326/40
7,154,416 B1 12/2006 Savage .......................... 341/51
7,174,387 B1 2/2007 Shand et al. .................. 709/238
7,180,887 B1 2/2007 Schwaderer .................. 370/351
7,260,097 B2 8/2007 Casey .......................... 370/392
7,281,085 B1 10/2007 Garg ............................ 370/235
7,286,479 B2 10/2007 Bragg .......................... 370/255
7,330,440 B1 2/2008 Bryant .......................... 370/254
7,359,377 B1 4/2008 Kompella et al. ............ 370/389
7,373,401 B1 5/2008 Azad ......................... 370/236.2
7,420,992 B1 9/2008 Fang ............................ 370/477
7,430,210 B2 9/2008 Havala et al. ........... 370/395.53
7,462,639 B2 12/2008 Rekhter ....................... 370/409
7,463,639 B1 12/2008 Rekhter ....................... 370/409
7,466,661 B1 12/2008 Previdi et al. ................ 370/254
7,471,669 B1 12/2008 Sabesan ....................... 370/351
7,519,733 B1 4/2009 Thubert ....................... 709/232
7,551,599 B2 6/2009 Levit ............................ 370/254
7,564,803 B1 7/2009 Minei et al. .................. 370/254
7,577,143 B1 8/2009 Kompella ..................... 370/392
7,602,778 B2 10/2009 Guichard et al. ............. 370/389
7,610,330 B1 10/2009 Quinn .......................... 709/201
7,773,630 B2 8/2010 Huang et al. ................. 370/474
7,817,667 B2 10/2010 Frederiksen et al. ......... 370/474
7,885,259 B2 2/2011 Filsfils ......................... 370/389
7,885,294 B2 2/2011 Patel ............................ 370/202
7,894,352 B2 2/2011 Kompella et al. ............ 370/248
7,894,458 B2 2/2011 Jiang ............................ 370/401
7,925,778 B1 4/2011 Wijnands ...................... 370/389
7,940,695 B1 5/2011 Bahadur ....................... 370/254
7,983,174 B1 7/2011 Monaghan .................... 370/242
8,064,441 B2 11/2011 Wijnands et al. ............ 370/389
8,320,374 B2 11/2012 de Heer ........................ 370/390
8,325,726 B2 12/2012 Baban et al. ................. 370/390
8,339,973 B1 12/2012 Pichumani .................... 370/248
8,422,514 B1 4/2013 Kothari et al. ............... 370/466
8,542,706 B2 9/2013 Wang et al. .................. 370/474
8,611,335 B1 12/2013 Wu .............................. 370/351
8,619,817 B1 12/2013 Everson ........................ 370/474
8,630,167 B2 1/2014 Ashwood Smith ........... 370/255
8,670,146 B1 3/2014 Van Couvering ............ 358/1.15
8,711,883 B2 4/2014 Kang ............................ 370/389
8,774,179 B1 7/2014 Gaggara ....................... 370/389
8,787,400 B1 7/2014 Barth ............................ 370/419
8,792,384 B2 7/2014 Banerjee et al. ............. 370/254
8,830,826 B2 9/2014 Chen ............................ 370/228
8,848,728 B1 * 9/2014 Revah ..................... H04L 47/50 370/386
8,880,869 B1 11/2014 Shah ............................ 713/151
8,890,903 B2 11/2014 Russell ......................... 345/690
8,923,292 B2 12/2014 Friskney
8,942,256 B1 1/2015 Barth ............................ 370/469
8,953,590 B1 2/2015 Aggarwal ..................... 370/389
9,036,474 B2 5/2015 Dibirdi et al. ................ 370/235
9,049,233 B2 6/2015 Frost et al.
9,065,766 B2 6/2015 Matsuoka
9,094,337 B2 7/2015 Bragg
9,112,734 B2 8/2015 Edwards et al.
9,118,572 B2 8/2015 Sajassi
9,455,918 B1 9/2016 Revah ........................... 370/429
9,571,349 B2 2/2017 Previdi et al.
9,660,897 B1 5/2017 Gredler
9,749,227 B2 8/2017 Frost et al.
2001/0037401 A1 11/2001 Soumlya ....................... 709/232
2001/0055311 A1 12/2001 Trachewsky .................. 370/445
2002/0103732 A1 8/2002 Bundy et al. ................... 705/35
2002/0126661 A1 9/2002 Ngai ............................ 370/380
2002/0191628 A1 12/2002 Liu .............................. 370/428
2003/0016678 A1 1/2003 Maeno .......................... 370/400
2003/0026271 A1 2/2003 Erb et al. ...................... 370/401
2003/0043802 A1 3/2003 Yazaki .......................... 370/389
2003/0048779 A1 3/2003 Doherty ........................ 370/389
2003/0088696 A1 5/2003 McCanne ..................... 709/238
2003/0126272 A1 7/2003 Corl et al. .................... 709/230
2003/0133412 A1 7/2003 Iyer .............................. 370/235
2003/0142674 A1 7/2003 Casey .......................... 370/393
2003/0142685 A1 7/2003 Bare ............................ 370/410
2003/0210695 A1 * 11/2003 Henrion .................. H04L 45/00 370/392
2003/0231634 A1 12/2003 Henderson ............... 370/395.32
2004/0160958 A1 8/2004 Oh ............................ 370/395.1
2004/0174879 A1 9/2004 Basso et al. ................. 370/392
2004/0190527 A1 * 9/2004 Okura ..................... H04L 45/00 370/395.21
2004/0196840 A1 10/2004 Amrutur et al. .............. 370/389
2004/0202158 A1 10/2004 Takeno ......................... 379/389
2004/0240442 A1 12/2004 Grimminger ................. 379/389
2004/0264374 A1 12/2004 Yu ............................... 370/230
2005/0073958 A1 4/2005 Atlas ............................ 370/238
2005/0105515 A1 5/2005 Reed ............................ 370/360
2005/0157724 A1 * 7/2005 Montuno ................ H04L 45/00 370/392
2005/0169270 A1 8/2005 Mutou .......................... 370/390
2005/0181807 A1 8/2005 Dowling .................... 455/456.1
2005/0213513 A1 9/2005 Ngo ............................. 370/254
2005/0232272 A1 10/2005 Deng ........................... 370/390
2005/0259655 A1 11/2005 Cuervo et al. ................ 370/392
2006/0002304 A1 1/2006 Ashwood-Smith ........... 370/238
2006/0013209 A1 1/2006 Somasundaram ............ 370/389
2006/0056397 A1 3/2006 Aizu ............................. 370/352
2006/0075134 A1 4/2006 Aalto ............................ 709/238
2006/0080421 A1 4/2006 Hu ............................... 709/223
2006/0092940 A1 5/2006 Ansari .......................... 370/392
2006/0126272 A1 6/2006 Horio et al. .................. 709/230
2006/0133298 A1 6/2006 Ng ............................... 370/254
2006/0146696 A1 7/2006 Li ................................ 370/218
2006/0182035 A1 8/2006 Vasseur ........................ 370/238
2006/0187817 A1 8/2006 Charzinski ................... 370/216
2006/0262735 A1 11/2006 Guichard ...................... 370/254
2006/0274716 A1 12/2006 Oswal et al. ................. 370/349
2006/0280192 A1 12/2006 Desanti ........................ 370/409
2006/0291444 A1 12/2006 Alvarez ........................ 370/351
2007/0019647 A1 1/2007 Roy et al. ..................... 370/392
2007/0053342 A1 3/2007 Sierecki ........................ 370/351
2007/0058638 A1 3/2007 Guichard et al. ........ 370/395.31
2007/0127474 A1 6/2007 Mirtorabi et al. ............ 370/390
2007/0189291 A1 8/2007 Tian ............................. 370/390
2007/0245034 A1 10/2007 Retana ......................... 709/238

(56) References Cited

U.S. PATENT DOCUMENTS

| | | | | |
|---|---|---|---|---|
| 2008/0002699 | A1 | 1/2008 | Rajsic | 370/392 |
| 2008/0037117 | A1 | 2/2008 | Seki et al. | 370/471 |
| 2008/0049610 | A1 | 2/2008 | Linwong | 370/225 |
| 2008/0069125 | A1 | 3/2008 | Reed | 370/410 |
| 2008/0075016 | A1 | 3/2008 | Ashwood-Smith | 370/252 |
| 2008/0084881 | A1 | 4/2008 | Dharwadkar et al. | 370/392 |
| 2008/0101239 | A1 | 5/2008 | Good | 370/235 |
| 2008/1010227 | | 5/2008 | Fujita et al. | 370/232 |
| 2008/0159285 | A1 | 7/2008 | De Heer | 370/390 |
| 2008/0165783 | A1 | 7/2008 | Desanti | 370/392 |
| 2008/0172497 | A1 | 7/2008 | Mohan et al. | 709/249 |
| 2008/0189393 | A1 | 8/2008 | Wagner | 709/218 |
| 2008/0192762 | A1 | 8/2008 | Kompella et al. | 370/395.53 |
| 2008/0194240 | A1 | 8/2008 | Dowling | 455/414.3 |
| 2008/0212465 | A1 | 9/2008 | Yan | 370/225 |
| 2008/0225864 | A1 | 9/2008 | Aissaoui et al. | 370/401 |
| 2008/0240105 | A1 | 10/2008 | Abdallah | 370/392 |
| 2008/0253367 | A1 | 10/2008 | Ould-Brahim | 370/389 |
| 2008/0255986 | A1 | 10/2008 | Scarborough | 705/38 |
| 2008/0259820 | A1 | 10/2008 | White et al. | 370/255 |
| 2008/0316916 | A1* | 12/2008 | Tazzari | H04B 3/54<br>370/216 |
| 2009/0041038 | A1 | 2/2009 | Martini et al. | 370/401 |
| 2009/0049194 | A1 | 2/2009 | Csaszar | 709/242 |
| 2009/0067348 | A1 | 3/2009 | Vasseur | 370/256 |
| 2009/0067445 | A1 | 3/2009 | Diguet | 370/419 |
| 2009/0080431 | A1 | 3/2009 | Rekhter | 370/392 |
| 2009/0135815 | A1 | 5/2009 | Pacella | 370/389 |
| 2009/0185549 | A1 | 7/2009 | Shon | 370/379 |
| 2009/0196289 | A1* | 8/2009 | Shankar | H04L 12/4666<br>370/390 |
| 2009/0213735 | A1 | 8/2009 | Check | 370/236 |
| 2009/0219817 | A1 | 9/2009 | Carley | 370/235 |
| 2009/0225650 | A1 | 9/2009 | Vasseur | 370/218 |
| 2009/0247157 | A1 | 10/2009 | Yoon | 455/434 |
| 2009/0296710 | A1 | 12/2009 | Agrawal | 370/392 |
| 2009/0310610 | A1 | 12/2009 | Sandstrom | 370/392 |
| 2010/0046400 | A1 | 2/2010 | Wu | |
| 2010/0046515 | A1 | 2/2010 | Wong | 370/390 |
| 2010/0063983 | A1 | 3/2010 | Groarke et al. | 707/803 |
| 2010/0088717 | A1 | 4/2010 | Candelore et al. | 725/32 |
| 2010/0124231 | A1 | 5/2010 | Kompella | 370/40 |
| 2010/0142548 | A1 | 6/2010 | Sheth | 370/410 |
| 2010/0191911 | A1 | 7/2010 | Heddes | 711/118 |
| 2010/0220739 | A1 | 9/2010 | Ishiguro | 370/401 |
| 2010/0232435 | A1 | 9/2010 | Jabr et al. | 370/392 |
| 2010/0272110 | A1 | 10/2010 | Allan et al. | 370/395.53 |
| 2010/0284309 | A1 | 11/2010 | Allan et al. | 370/256 |
| 2011/0060844 | A1 | 3/2011 | Allan et al. | 709/241 |
| 2011/0063986 | A1 | 3/2011 | Denechaeu | 370/248 |
| 2011/0090913 | A1 | 4/2011 | Kim | 370/400 |
| 2011/0149973 | A1* | 6/2011 | Esteve Rothenberg | H04L 45/00<br>370/392 |
| 2011/0202761 | A1 | 8/2011 | Sarela et al. | 716/163 |
| 2011/0228770 | A1 | 9/2011 | Dholakia | 370/390 |
| 2011/0228780 | A1 | 9/2011 | Ashwood-Smith | |
| 2011/0261722 | A1 | 10/2011 | Awano | 370/254 |
| 2011/0268114 | A1 | 11/2011 | Wijnands et al. | 370/389 |
| 2011/0274112 | A1 | 11/2011 | Czaszar | 370/392 |
| 2011/0280123 | A1 | 11/2011 | Wijnands et al. | 370/228 |
| 2011/0286452 | A1 | 11/2011 | Balus | 370/390 |
| 2011/0299531 | A1 | 12/2011 | Yu | 370/392 |
| 2012/0044944 | A1 | 2/2012 | Kotha et al. | 370/401 |
| 2012/0063526 | A1 | 3/2012 | Xiao | 375/259 |
| 2012/0069740 | A1 | 3/2012 | Lu et al. | 370/238 |
| 2012/0069845 | A1 | 3/2012 | Carney et al. | 370/392 |
| 2012/0075988 | A1 | 3/2012 | Lu | 370/218 |
| 2012/0082034 | A1 | 4/2012 | Vasseur | 370/235 |
| 2012/0099591 | A1 | 4/2012 | Kotha | 370/392 |
| 2012/0099861 | A1 | 4/2012 | Zheng | 398/45 |
| 2012/0106560 | A1* | 5/2012 | Gumaste | H04L 45/04<br>370/401 |
| 2012/0120808 | A1 | 5/2012 | Nandagopal et al. | 370/238 |
| 2012/0170461 | A1 | 7/2012 | Long | 370/235 |
| 2012/0179796 | A1 | 7/2012 | Nagaraj | 709/223 |
| 2012/0213225 | A1 | 8/2012 | Subramanian et al. | 370/392 |
| 2012/0218884 | A1 | 8/2012 | Kini | 370/228 |
| 2012/0236857 | A1 | 9/2012 | Manzella | 370/390 |
| 2012/0236860 | A1 | 9/2012 | Kompella et al. | 370/392 |
| 2012/0243539 | A1* | 9/2012 | Keesara | H04L 45/66<br>370/392 |
| 2012/0287818 | A1 | 11/2012 | Corti et al. | 370/254 |
| 2012/0307629 | A1 | 12/2012 | Vasseur | 370/228 |
| 2013/0003728 | A1 | 1/2013 | Kwong et al. | 370/389 |
| 2013/0034097 | A1 | 2/2013 | Dharmapurikar | 370/390 |
| 2013/0051237 | A1 | 2/2013 | Ong | 370/237 |
| 2013/0051376 | A1 | 2/2013 | Hatashita | 370/338 |
| 2013/0077476 | A1 | 3/2013 | Enyedi | 370/225 |
| 2013/0077624 | A1 | 3/2013 | Keesara et al. | 370/390 |
| 2013/0077625 | A1 | 3/2013 | Khera | 370/390 |
| 2013/0077626 | A1 | 3/2013 | Keesara et al. | 370/390 |
| 2013/0114402 | A1 | 5/2013 | Ould-Brahim | 370/225 |
| 2013/0114595 | A1 | 5/2013 | Mack-Crane | 370/390 |
| 2013/0114619 | A1 | 5/2013 | Wakumoto | 370/406 |
| 2013/0136117 | A1 | 5/2013 | Schrum, Jr. | 370/338 |
| 2013/0136123 | A1 | 5/2013 | Ge | 370/390 |
| 2013/0142052 | A1 | 6/2013 | Burbidge | 370/242 |
| 2013/0170450 | A1 | 7/2013 | Anchan | 370/329 |
| 2013/0188634 | A1 | 7/2013 | Magee | 370/389 |
| 2013/0195001 | A1 | 8/2013 | Liu | 370/312 |
| 2013/0201988 | A1 | 8/2013 | Zhou | 370/390 |
| 2013/0219034 | A1 | 8/2013 | Wang | 709/222 |
| 2013/0258842 | A1 | 10/2013 | Mizutani | 370/228 |
| 2013/0266012 | A1 | 10/2013 | Dutta et al. | 370/392 |
| 2013/0266013 | A1 | 10/2013 | Dutta et al. | 370/392 |
| 2013/0308948 | A1* | 11/2013 | Swinkels | H04B 10/27<br>398/66 |
| 2013/0329728 | A1 | 12/2013 | Ramesh | 370/390 |
| 2013/0336315 | A1 | 12/2013 | Guichard | 370/389 |
| 2013/0343204 | A1 | 12/2013 | Geib et al. | 370/248 |
| 2013/0343384 | A1 | 12/2013 | Shepherd | 370/390 |
| 2014/0010223 | A1 | 1/2014 | Wang | 370/338 |
| 2014/0043964 | A1 | 2/2014 | Gabriel | 370/229 |
| 2014/0098813 | A1 | 4/2014 | Mishra | 370/390 |
| 2014/0119191 | A1 | 5/2014 | Onoue | 370/236 |
| 2014/0126575 | A1 | 5/2014 | Janneteau | |
| 2014/0160925 | A1 | 6/2014 | Xu | 370/235 |
| 2014/0169370 | A1 | 6/2014 | Filsfils et al. | 370/392 |
| 2014/0177638 | A1 | 6/2014 | Bragg et al. | 370/395.3 |
| 2014/0189156 | A1 | 7/2014 | Morris | 709/238 |
| 2014/0189174 | A1 | 7/2014 | Ajanovic | 710/106 |
| 2014/0192677 | A1 | 7/2014 | Chew | 370/254 |
| 2014/0254596 | A1 | 9/2014 | Filsfils et al. | 370/392 |
| 2014/0269266 | A1 | 9/2014 | Filsfils et al. | 370/228 |
| 2014/0269421 | A1 | 9/2014 | Previdi et al. | 370/254 |
| 2014/0269422 | A1 | 9/2014 | Filsfils et al. | 370/254 |
| 2014/0269698 | A1 | 9/2014 | Filsfils et al. | 370/389 |
| 2014/0269699 | A1 | 9/2014 | Filsfils et al. | 370/389 |
| 2014/0269721 | A1 | 9/2014 | Bashandy et al. | 370/392 |
| 2014/0269725 | A1 | 9/2014 | Filsfils et al. | 370/392 |
| 2014/0269727 | A1 | 9/2014 | Filsfils et al. | 370/392 |
| 2014/0286195 | A1 | 9/2014 | Fedyk | 370/254 |
| 2014/0317259 | A1 | 10/2014 | Previdi et al. | 709/223 |
| 2014/0341222 | A1 | 11/2014 | Filsfils et al. | 370/395.5 |
| 2014/0362846 | A1 | 12/2014 | Li | 370/338 |
| 2014/0369356 | A1 | 12/2014 | Bryant | 370/392 |
| 2015/0003458 | A1 | 1/2015 | Li | 370/392 |
| 2015/0006823 | A1 | 1/2015 | Ganga | 370/235 |
| 2015/0016469 | A1 | 1/2015 | Ganichev | 370/429 |
| 2015/0023328 | A1 | 1/2015 | Thubert et al. | 370/336 |
| 2015/0030020 | A1 | 1/2015 | Kini | 370/389 |
| 2015/0049760 | A1 | 2/2015 | Xu | 370/390 |
| 2015/0078377 | A1 | 3/2015 | Wijnands et al. | 370/390 |
| 2015/0078378 | A1 | 3/2015 | Wijnands et al. | 370/390 |
| 2015/0078379 | A1 | 3/2015 | Wijnands et al. | 370/390 |
| 2015/0078380 | A1 | 3/2015 | Wijnands et al. | 370/390 |
| 2015/0081941 | A1 | 3/2015 | Brown | 710/116 |
| 2015/0085635 | A1 | 3/2015 | Wijnands et al. | 370/216 |
| 2015/0092546 | A1 | 4/2015 | Baratam | 370/230 |
| 2015/0109902 | A1 | 4/2015 | Kumar | 370/219 |
| 2015/0131658 | A1 | 5/2015 | Wijnands et al. | 370/390 |
| 2015/0131659 | A1 | 5/2015 | Wijnands et al. | 370/390 |

(56) References Cited

U.S. PATENT DOCUMENTS

| | | | | |
|---|---|---|---|---|
| 2015/0131660 | A1 | 5/2015 | Shepherd et al. | 370/390 |
| 2015/0138961 | A1 | 5/2015 | Wijnands et al. | 370/228 |
| 2015/0139228 | A1 | 5/2015 | Wijnands et al. | 370/390 |
| 2015/0181309 | A1 | 6/2015 | Wijnands et al. | 725/109 |
| 2015/0249587 | A1* | 9/2015 | Kozat | H04L 43/10 370/222 |
| 2015/0263940 | A1 | 9/2015 | Kini | 370/236.2 |
| 2015/0326675 | A1 | 11/2015 | Kini | 709/224 |
| 2015/0334006 | A1* | 11/2015 | Shao | H04L 45/22 370/225 |
| 2016/0006614 | A1 | 1/2016 | Zhao | 370/254 |
| 2016/0034209 | A1 | 2/2016 | Nanduri | 711/114 |
| 2016/0034370 | A1 | 2/2016 | Nanduri | 714/6.22 |
| 2016/0119159 | A1 | 4/2016 | Zhao | 370/390 |
| 2016/0127142 | A1* | 5/2016 | Tian | H04L 12/1886 370/390 |
| 2016/0142248 | A1 | 5/2016 | Thubert et al. | 370/372 |
| 2016/0173366 | A1 | 6/2016 | Saad | 370/218 |
| 2016/0182353 | A1 | 6/2016 | Garcia-Luna-Aceves | 709/241 |
| 2016/0191372 | A1* | 6/2016 | Zhang | H04L 45/16 370/390 |
| 2016/0205588 | A1 | 7/2016 | Liu | 370/392 |
| 2016/0218961 | A1 | 7/2016 | Lindem | 370/389 |
| 2016/0226725 | A1 | 8/2016 | Iizuka | |
| 2016/0352654 | A1 | 8/2016 | Filsfils et al. | 370/392 |
| 2016/0344616 | A1 | 11/2016 | Roch | |
| 2017/0019330 | A1 | 1/2017 | Filsfils et al. | 370/389 |
| 2017/0099232 | A1 | 4/2017 | Shepherd | 370/390 |
| 2017/0104673 | A1 | 4/2017 | Bashandy et al. | 370/392 |
| 2017/0111277 | A1 | 4/2017 | Previdi et al. | 370/392 |
| 2017/0126416 | A1 | 5/2017 | McCormick | |
| 2017/0142006 | A1 | 5/2017 | Wijnands et al. | 370/390 |
| 2017/0346718 | A1 | 11/2017 | Psenak et al. | 370/235 |
| 2017/0346737 | A1 | 11/2017 | Previdi et al. | 370/392 |
| 2017/0366453 | A1 | 12/2017 | Previdi et al. | 370/392 |
| 2018/0083871 | A1 | 3/2018 | Filsfils | 370/392 |
| 2018/0102965 | A1 | 4/2018 | Hari | |
| 2018/0205636 | A1 | 7/2018 | Hu | |
| 2018/0278470 | A1 | 9/2018 | Wijnands et al. | 370/390 |
| 2018/0309664 | A1 | 10/2018 | Balasubramanian | |

FOREIGN PATENT DOCUMENTS

| | | | |
|---|---|---|---|
| CN | 1792 065 | 6/2006 | H04L 12/56 |
| CN | 101247 253 A | 8/2008 | H04L 12/18 |
| CN | 101242413 | 8/2008 | H04L 29/06 |
| CN | 101385 275 | 3/2009 | H04L 12/18 |
| CN | 101399 688 A | 4/2009 | H04L 12/18 |
| CN | 101496 357 A | 7/2009 | H04L 12/56 |
| CN | 101572667 | 11/2009 | H04L 12/56 |
| CN | 101616 466 A | 12/2009 | H04W 40/02 |
| CN | 101689 172 | 3/2010 | G06F 15/173 |
| CN | 101803 293 A | 8/2010 | H04L 12/28 |
| CN | 101841 442 A | 9/2010 | H04L 12/56 |
| CN | 101931 548 A | 12/2010 | H04L 12/24 |
| CN | 102025538 | 4/2011 | H04L 12/56 |
| CN | 102098 222 A | 6/2011 | H04L 12/56 |
| CN | 102132533 A | 7/2011 | H04L 12/56 |
| CN | 102299852 A | 12/2011 | H04L 12/56 |
| CN | 10249869 A | 6/2012 | H04L 12/56 |
| CN | 102577 238 | 7/2012 | H04L 12/18 |
| CN | 102714625 A | 10/2012 | H04L 12/56 |
| WO | WO 2007/095331 | 8/2007 | 370/390 |

OTHER PUBLICATIONS

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.;"Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-to-End Quality of Service Model," Aug. 2005, pp. 1-18.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet—Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc., "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet—Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-l3vpn-mvpn-bier-01," Internet Engineering Task Force, Internet—Draft, Oct. 16, 2014, pp. 1-9.

Schulzrinne, H. et al., "RTP: A Transport Protocol for Real-Time Applications," Network Working Group, Request for Comments 3550, Jul. 2003, pp. 1-89.

SMPTE, "Beyond the Digital Conversion, the Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.

SMPTE, "Transport of High Bit Rate Media Signals Over IP Networks (HBRMT)," ST 2022-6:2012, © 2015 by the Society of Motion Picture and Television Engineers, Inc. (SMPTE), p. 1.

SMPTE, "Definition of Vertical Interval Switching Point for Synchronous Video Switching," RP 168:2009, © 2015 by the Society of Motion Picture and Television Engineers, Inc. (SMPTE), p. 1.

(56) References Cited

OTHER PUBLICATIONS

Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol in-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet—Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet—Draft, Dec. 4, 2014, pp. 1-27.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Yongliang Li, et al., Abstract Translation of CN-201010573400-A and CN 102025538, Database EPODOC [Online], European Patent Office, dated Apr. 20, 2011, pp. 1-2 [XP002740355 on Extended EP SR].
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).
Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.
Awduche, Daniel O., et al., "RSVP-TE: Extensions to RSVP for LSP Tunnels," Network Working Group, Internet-Draft, Aug. 2000, pp. 1-12.
Awduche, Daniel O., et al., "RSVP-TE: Extensions to RSVP for LSP Tunnels," Network Working Group, Request for Comments 3209, Dec. 2001, pp. 1-61.
Backes, P. and Rudiger Geib, "Deutsche Telekom AG's Statement About IPR Related to Draft-Geig-Spring-OAM-Usecase-01," Feb. 5, 2014, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
CISCO Systems, Inc., "Introduction to Intermediate System-to-Intermediate System Protocol," published 1992-2002; pp. 1-25.
Crabbe, E., et al., "PCEP Extensions for MPLS-TE LSP Protection With Stateful PCE Draft-Crabbe-PCE-Stateful-PCT-Protection-00," Network Working Group, Internet—Draft, Apr. 2013, pp. 1-12.
Crabbe, E., et al., Stateful PCE Extensions for MPLS-TE LSPs, draft-crabbe-pce-statement-pce-mpls-te-00; Network Working Group, Internet—Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol—Traffic Enginerring (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP", draft-filsfils-spring-segment-routing-ldp-interop-01.txt; Apr. 18, 2014, pp. 1-16.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Berlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.

(56) References Cited

OTHER PUBLICATIONS

Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).
Alcatel-Lucent, "Segment Routing and Path Computation Element—Using Traffic Engineering to Optimize Path Placement and Efficienc in IP/MPLS Networks"; Technology White Paper; 2015; 28 pages.
Awduche, D. et al., "Requirements for Traffic Engineering Over MPLS"; Network Working Group; Request for Comments: 2702; Sep. 1999; pp. 1-29.
Awduche, D. et al., "Overview and Principles of Internet Traffic Engineering"; Network Working Group; Request for Comments: 3272; Max 2002; pp. 1-71.
Filsfils, C. et al., "Segment Routing Architecture"; draft-ietf-spring-segment-routing-07; Network Working Group, Internet-Draft; Dec. 15, 2015; pp. 1-24.
Filsfils, C. et al., "Segment Routing Use Cases", draft-filsfils-rtgwg-segment-routing-use-cases-02; Network Working Group; Internet-Draft; Oct. 21, 2013; pp. 1-36.
Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.
Psenak, Peter et al., "Enforcing Strict Shortest Path Forwarding Using Strict Segment Identifiers" U.S. Appl. No. 15/165,794, filed May 26, 2016; consisting of Specification, Claims, Abstract, and Drawings (52 pages).
Das, Kaushik, "IPv6 Header Deconstructed"; http://www.ipv6.com/articles/general/IPv6-Header.htm; Apr. 18, 2008; 2 pages.
Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.
Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).
Frost, Daniel C. et al., "MPLS Segment Routing"; U.S. Appl. No. 15/637,744, filed Jun. 29, 2017; consisting of Specification, Claims, Abstract, and Drawings (26 pages).
Filsfils, Clarence et al., "Seamless Segment Routing"; U.S. Appl. No. 15/639,398, filed Jun. 30, 2017; consisting of Specification, Claims, Abstract, and Drawings (31 pages).
Wang, Xiaorong et al.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).
Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).
Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).
Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.
Akiya, N. et al., "Seamless Bidirectional Forwarding Detection (BFD) for Segment Routing (SR)"; draft-aliya-bfd-seamless-sr-01; Internet Engineering Task Force; Internet-Draft; Dec. 5, 2013; 7 pages.
Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.
Akiya, N. et al., "Seamless Bidirectional Forwarding Detection (BFD) for Segment Routing (SR)"; draft-akiya-bfd-seamless-sr-03; Internet Engineering Task Force; Internet-DraftAug. 23, 2014; 7 pages.
Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.
Akiya, N., "Segment Routing Implications on BFD"; Sep. 9, 2013; 3 pages.
Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing with MPLS Data Plane", draft-ietf-spring-segment-routing-mpls-05; Network Working Group; Internet-Draft; Jul. 6, 2016; 15 pages.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.

(56) References Cited

OTHER PUBLICATIONS

Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.
Nainar, Nagendra Kumar et al., "Reroute Detection in Segment Routing Data Plane"; U.S. Appl. No. 15/266,498, filed Sep. 15, 2016; consisting of Specification, Claims, Abstract, and Drawings (61 pages).
Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Previdi, Stefano B. et al., "Segment Routing Extension Headers", U.S. Appl. No. 15/677,210, filed Aug. 15, 2017; consisting of Specification, Claims, Abstract, and Drawings (58 pages).
Microsoft,"IPv6 Addressing (TechRef)"; Apr. 3, 2011; http://technet.microsoft.com/enus/library/dd392266(v=ws.10).aspx; pp. 1-30.
Li, Tony et al., "IGP Requirements for Traffic Engineering With MPLS, draft-li-mpls-igp-te-00.txt," Network Working Group, Internet-Draft, Feb. 1999, pp. 1-6.
Moy, J., Ascend Communications, Inc., "OSPF Version 2," Network Working Group, Request for Comments 2328, Apr. 1998, pp. 1-244.
Psenak, P. et al., "OSPF Extensions for Segment Routing, draft-psenak-ospf-segment-routing-extension-05," Open Shortest Path First IGP, Internet-Draft, Jun. 2014, pp. 1-33.
Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.
Shen, N. et al., "Calculating Interior Gateway Protocol (IGP) Routes Over Traffic Engineering Tunnels," Network Working Group, Request for Comments 3906, Oct. 2004, pp. 1-8.
Wijnands, Ijsbrand et al., "Bit Indexed Explicit Replication Using Internet Proptocol Version 6"; U.S. Appl. No. 15/919,552, filed Mar. 13, 2018 consisting of Specification, Claims, Abstract, and Drawings (49 pages).

* cited by examiner

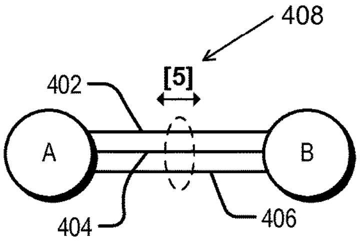
FIG. 4A
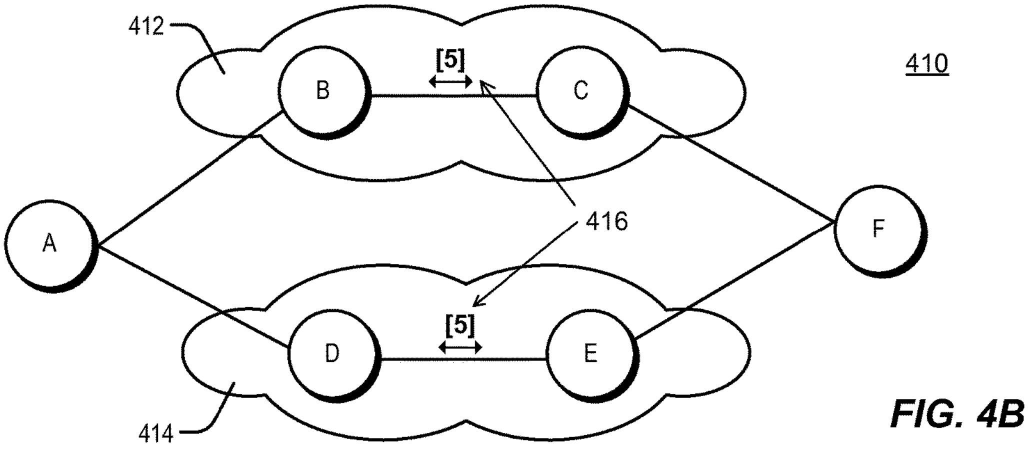
FIG. 4B
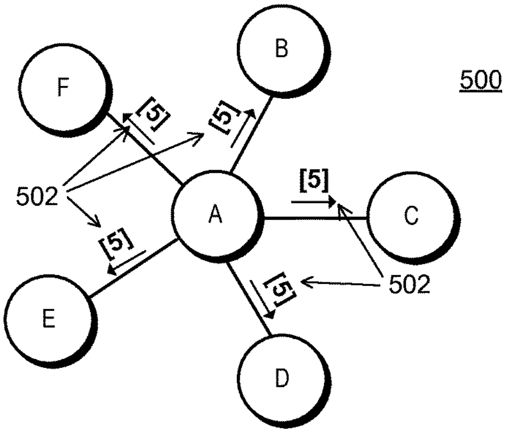
FIG. 5A
| BTFT A 510 | |
|---|---|
| BP | Link |
| ⋮ | ⋮ |
| 5 | AB |
| | AC |
| | AD |
| | AE |
| | AF |
| ⋮ | ⋮ |
512 (rows for BP 5)
FIG. 5B

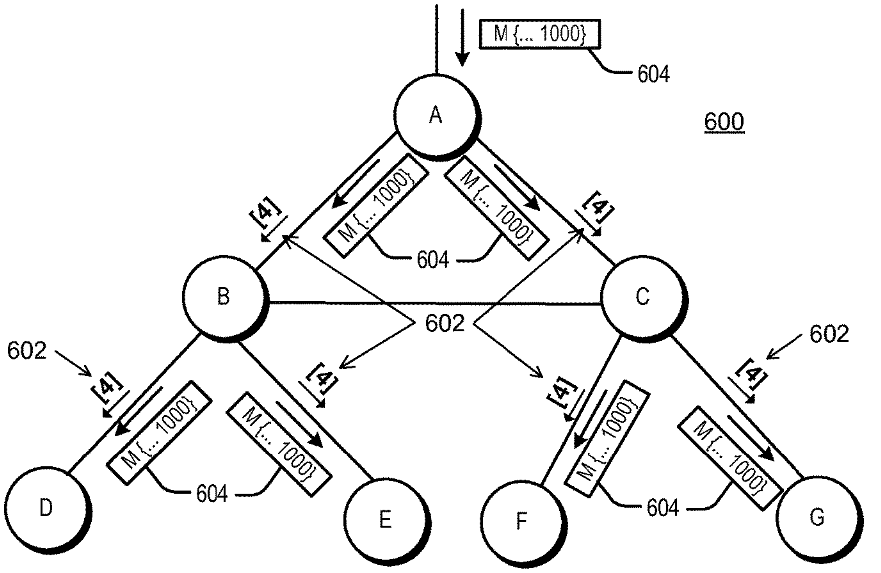
FIG. 6A
| | BTFT B 610 | | |
|---|---|---|---|
| | BP | Link | Reset |
| | ⋮ | ⋮ | ⋮ |
| 612 | 4 | BD | N |
| | | BE | N |
| | ⋮ | ⋮ | ⋮ |
FIG. 6B
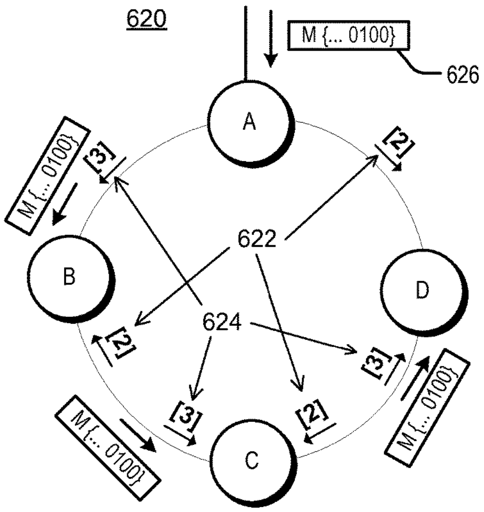
FIG. 6C
| | BTFT B 630 | | |
|---|---|---|---|
| | BP | Link | Reset |
| | ⋮ | ⋮ | ⋮ |
| 632 | 2 | CB | N |
| 634 | 3 | AB | N |
| | | BC | N |
| | ⋮ | ⋮ | ⋮ |
FIG. 6D FIG. 8
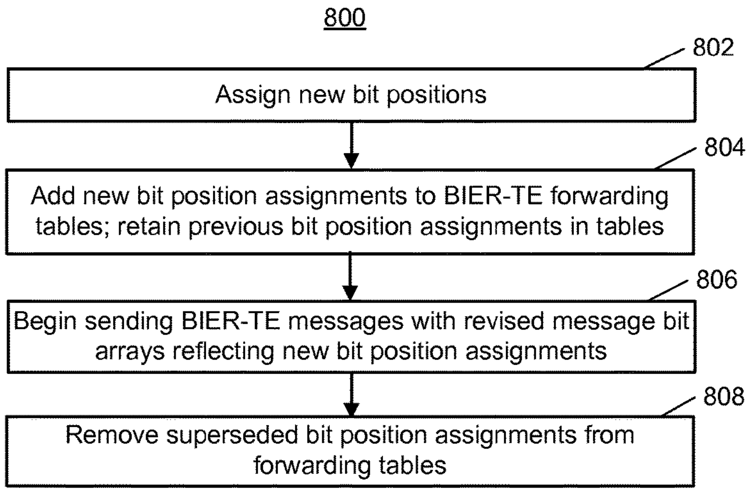
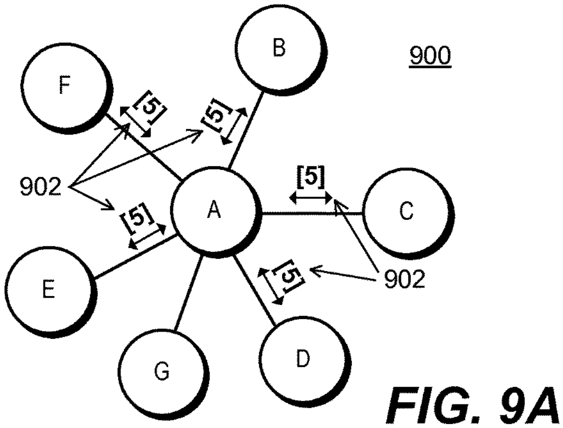
FIG. 9A
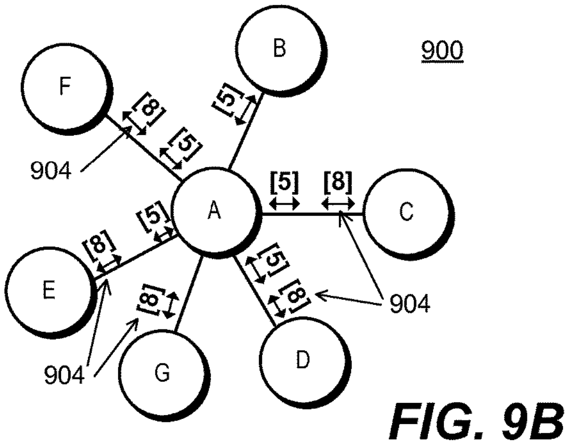
FIG. 9B
| BTFT A 910 | |
|---|---|
| BP | Link |
| ⋮ | ⋮ |
| 5 | AB |
| | AC |
| | AD |
| | AE |
| | AF |
| 8 | AC |
| | AD |
| | AE |
| | AF |
| | AG |
| ⋮ | ⋮ |
912 (BP 5 entries), 914 (BP 8 entries)
FIG. 9C

| BTFT E 1020 | |
|---|---|
| **LBA** | **Link** |
| 0000 0000 1000 | BE |
| 0000 0010 0000 | CE |
| 0010 0000 0000 | AE |
| 0000 0001 0000 | EF |
| 0000 0010 0000 | EC |
| 0000 0100 0000 | E |
| | |
| **Reset Mask** | **Reset timing** |
| 1101 1101 0111 (1022) | Receive |
| 1111 1000 1111 (1024) | Send |
| 1101 1000 0111 (1026) | Send |

| BTFT E 1196 | | | | | |
|---|---|---|---|---|---|
| BP | Send Node | Receive Node | Interface | Need reset | No reset |
| 4 | B | E | 1 | | |
| 5 | E | F | 3 | | |
| 6 | C | E | 2 | Y | |
| | E | C | 2 | Y | |
| 7 | E | [Ext. Prot.] | | | |
| 10 | A | E | | | |
FIG. 11C
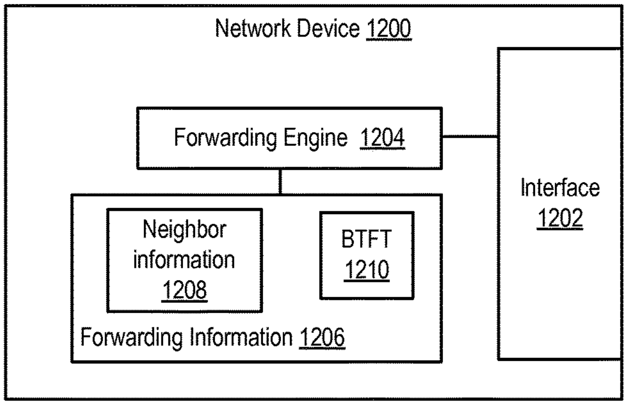
FIG. 12A
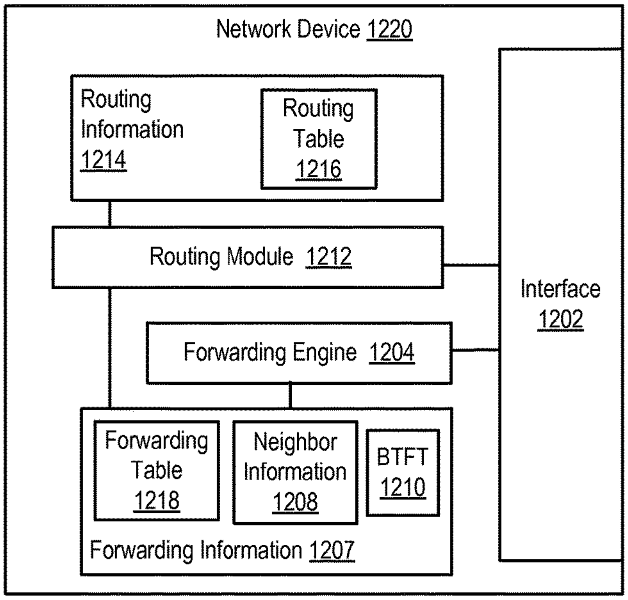
FIG. 12B

TRAFFIC ENGINEERING FOR BIT INDEXED EXPLICIT REPLICATION

RELATED APPLICATIONS

This application claims the domestic benefit under Title 35, Section 119(e) of the United States Code of U.S. Provisional Patent Application No. 62/121,291, entitled "Traffic Engineering for Bit Indexed Explicit Replication," filed Feb. 26, 2015, which application is hereby incorporated by reference in its entirety and for all purposes as if completely and fully set forth herein.

BACKGROUND

Network nodes forward data. Network nodes may take form in one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Forwarding messages involves various processes that, while simple in concept, can be complex. The processes involved in forwarding vary, depending on the type of forwarding method used. Overall forwarding configurations include unicast, broadcast, and multicast forwarding. Unicast is a method of point-to-point communication most often used when a particular node (known as a source) wishes to send data to another particular node (known as a receiver) and is not concerned with sending the data to multiple receivers. Broadcast is method used when a source wishes to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features, and advantages made apparent to those skilled in the art by referencing the accompanying drawings.

FIG. 4A is a simplified diagram illustrating an example of a network portion.

FIG. 4B is a simplified diagram illustrating an example of a network portion.

FIG. 5A is a simplified diagram illustrating an example of a network portion.

FIG. 5B illustrates an example of a forwarding table portion.

FIG. 6A is a simplified diagram illustrating an example of a network portion.

FIG. 6B illustrates an example of a forwarding table portion.

FIG. 6C is a simplified diagram illustrating an example of a network portion.

FIG. 6D illustrates an example of a forwarding table portion.

FIG. 8 is a flowchart illustrating an example of a process carried out by a controller or node of a network described herein.

FIGS. 9A and 9B are simplified diagrams illustrating examples of network portions.

FIG. 9C illustrates an example of a forwarding table portion.

FIG. 11C illustrates an example of a forwarding table portion.

FIG. 12A through 12D are simplified block diagrams illustrating certain components of example network devices that can be employed in the networks described herein.

DETAILED DESCRIPTION

Overview

Figure 1:
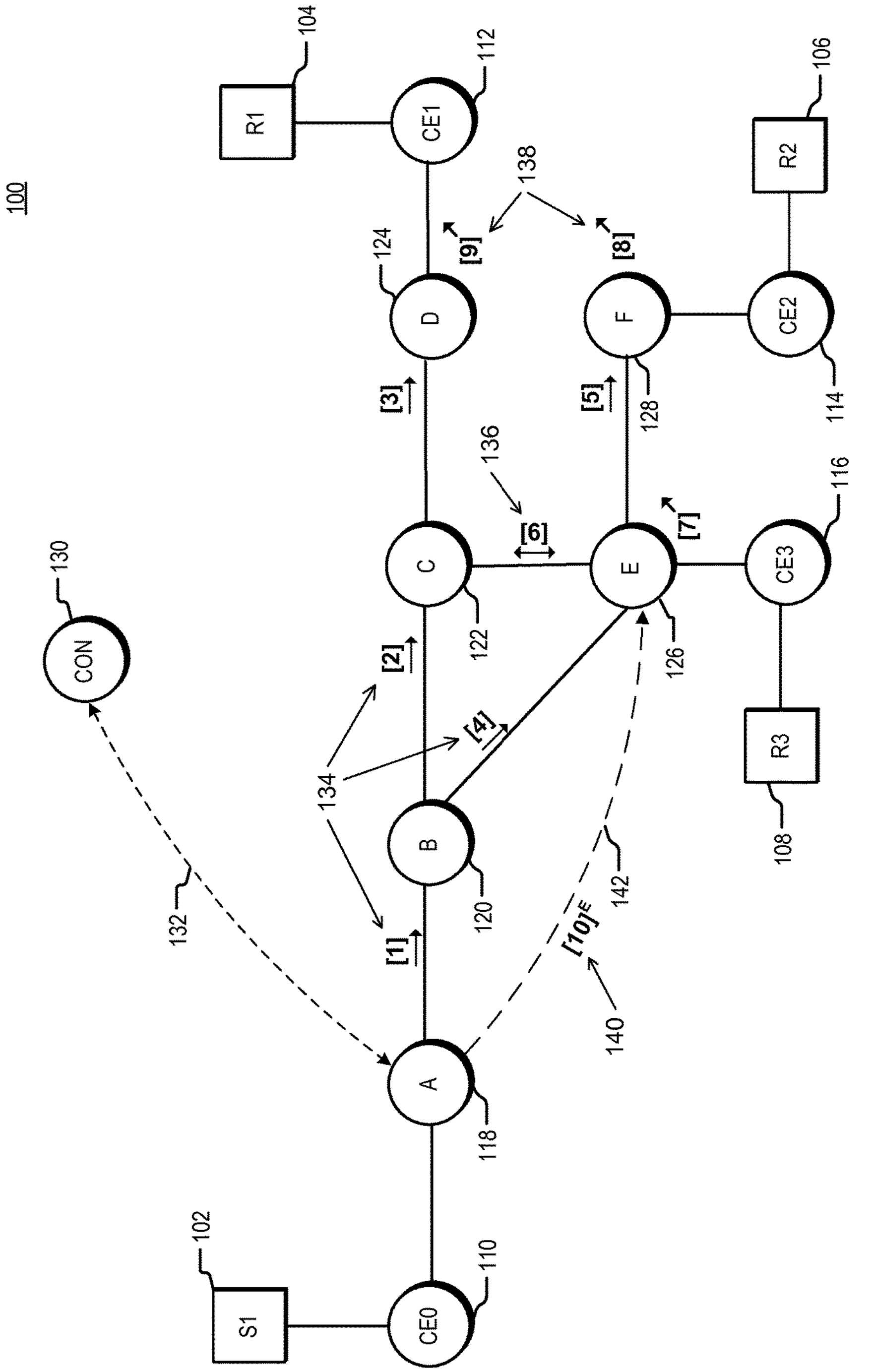
FIG. 1 is a simplified diagram illustrating certain components of an example network.

Methods and network devices are disclosed for traffic-engineered forwarding through a new form of bit indexed explicit replication (BIER). In one embodiment, a method includes receiving at a first node in a network a message comprising a message bit array, and comparing bit values at one or more bit positions in the message bit array to one or more entries in a forwarding table stored at the first node. The one or more bit positions correspond in this embodiment to links in the network. This embodiment of the method further includes forwarding the message over a link represented in the forwarding table if a result of the comparing indicates that the link is included in a path to be taken by the message. In a further embodiment of the method, the message is a multicast message and forwarding the message comprises forwarding a replica of the multicast message.

Multicast

Multicast transmission delivers multicast packets (packets that traditionally include information identifying a multicast group, such as a multicast group address) from a source to multiple receivers without unduly burdening the source. Although some of the discussion in this disclosure is in terms of packets, it should be understood that the disclosures made herein may also be applicable to other types of network messages, such as datagrams or data frames. As used herein, the term "receiver" signifies a host (such as a computing device or application) that has subscribed to a multicast group. Instead of the source replicating a multicast packet and sending a copy of the multicast packet to each receiver, the source sends a single copy of a multicast packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast packet close to the destination of that multicast packet, obviating the use of multiple unicast connections for the same purpose. This saves network bandwidth and improves throughput.

Typical multicast routing protocols require that each node's multicast forwarding table include, for example, information mapping source and group identifiers for each multicast flow to the interfaces over which the node must forward a packet replica for that group, and the interface over which a packet for that group should properly arrive. The multicast forwarding tables maintained by each multicast-enabled node can become quite large in networks with many multicast sources, many multicast groups, or both. Maintaining such multicast forwarding tables imposes limitations on network scalability.

Bit Indexed Explicit Replication (BIER)

In a "stateless multicast" technique known as Bit Indexed Explicit Replication (BIER), the amount of state information within a multicast network is reduced. In BIER forwarding, receiver information is encoded in the packet rather than looked up in tables at each node based on multicast source and group information. Specifically, the receiver information is encoded in a bit array carried by the packet. BIER forwarding is described in more detail in, for example, co-pending U.S. application Ser. No. 14/604,092, but generally speaking each node associated with a multicast receiver is assigned a bit position in the bit array. A node connected to a receiver may also be referred to as a "receiver node" or a "destination node" herein. The value of the bit at a given bit position indicates whether the receiver node corresponding to that bit position is an intended receiver, or destination, for the multicast packet carrying the bit array.

In forwarding a BIER multicast packet containing a packet bit array (or, more generally, a BIER multicast message containing a message bit array), a BIER-enabled node determines whether any intended destination nodes for the packet are also reachable nodes from the BIER-enabled node. This is done using a bit-indexed forwarding table stored at the BIER-enabled node, the forwarding table having an entry for each of the BIER-enabled node's neighbor (directly connected next-hop) nodes. In an embodiment, the entry for each neighbor node includes a neighbor bit array with the same mapping of bit positions to destination nodes as that of the packet bit array. In a neighbor bit array, however, the value of the bit at a given bit position indicates whether the corresponding receiver node is reachable from the neighboring node associated with the forwarding table entry containing the neighbor bit array. Whether a node is "reachable," for purposes of BIER forwarding, from a neighboring node depends on whether the neighboring node is included in the shortest path to the destination node, as determined through an interior gateway protocol (IGP) used in the network. A message bit array may also be called a "bit string" herein, and a neighbor bit array may be called a "bit mask."

If comparison of the packet bit array of an incoming BIER packet with a neighbor bit array in a forwarding table entry shows that at least one intended destination node for the multicast packet is reachable via a neighbor node, a replica of the multicast packet is forwarded to the neighbor node, using routing information from the forwarding node's unicast routing table. This process is repeated for forwarding table entries associated with any other neighbor nodes, and each forwarded replica packet is in turn handled in a similar manner when received by the respective BIER-enabled neighbor node. In this manner the multicast packet is replicated and forwarded as needed to reach the intended destinations. In some embodiments, modifications are made to a packet bit array during the forwarding process, either as a packet bit array is compared to neighbor bit arrays in successive forwarding table entries at the node, or before a replica packet carrying a packet bit array is forwarded to a neighbor node, or in both situations. Such modifications can prevent looping and replication of packets.

Traffic Engineering

The BIER forwarding mechanism referenced above depends on the use of a forwarding node's unicast routing information. The BIER packet bit array tells a BIER-enabled node which destinations the packet must reach, but not the path to use to get them there. The path used for forwarding a given replica packet is the path determined by the forwarding node's unicast routing table, which is typically built using a shortest-path-first algorithm. There is no mechanism for routing a packet along an explicit path (also called "traffic engineering") using BIER as typically implemented.

There are situations in which explicit routing of multicast packets is desirable. For example, explicit paths are often used in Operations, Administration and Maintenance (OAM) activities designed to monitor or measure network path variables such as packet loss or transmission delay. Another application in which explicit routing can be useful is that of professional media networks using Internet Protocol (IP) for video broadcasting. Video broadcasting networks typically involve capture of content in multiple locations, processing of the content, and transmission of content (known as contribution) to one or more other locations. Content from various sources can be merged into a continuous stream and provided to potentially numerous receivers, based on control signals generated by a controller. Switching between content sources and modifying the selection of receivers that receive the stream is extremely time-critical. If these transitions do not occur on very specific boundaries or time intervals, video and audio distortions or discontinuities can result. Video transmission is also very sensitive to errors caused by the packet loss that may occur in IP networks. As such, some error correction schemes involve sending matching packet streams over alternate paths so that a receiver can switch between the streams to reconstruct an error-free signal. The stringent timing requirements involved in video broadcasting generally, along with the requirement for multiple independent paths in certain situations, makes an ability to define explicit paths desirable.

Certain existing technologies allow for traffic engineering. In a network employing Multiprotocol Label Switching (MPLS), for example, an explicit path can be established using a protocol called Resource Reservation Protocol with Traffic Engineering (RSVP-TE). An explicit path, or "tunnel" is specified using RSVP-TE when the initial node sends a request message from node to node along the length of the requested path, and the final node of the path confirms by sending back along the path the MPLS labels to be used for the path. These labels must then be added to the forwarding tables of the nodes along the path. The reservation process must be done again if the explicit path is altered in response to a change in network topology or conditions. The RSVP-TE process can be extended to multicast trees using point-to-multipoint (P2MP) RSVP-TE. Each multicast group will have its own tree reservation process and its own set of labels, requiring significant state at each node for forwarding tables relating labels to group and source information, in addition to the time and bandwidth required for the reservation process.

Another forwarding mechanism allowing creation of explicit paths is segment routing. Segment routing is described in detail in, for example, co-pending U.S. patent application Ser. No. 14/292,264. In segment routing, path information is carried with the packet in the form of a set of segment identifiers, where the path is constructed from topological sub-paths with each sub-path associated with a segment identifier. The set of segment identifiers carried by the packet can be implemented in various data plane technologies, such as through a stack of MPLS labels, or through a string of identifiers embedded in an Internet Protocol version 6 (IPv6) extension header. Segment identifiers can be advertised and exchanged using the existing IGP used for exchanging unicast routing information in the IP network, so that a control plane protocol such as the Label Distribution Protocol (LDP) or RSVP-TE protocols used in MPLS networks is not needed. A set of segment identifiers defining the path for a packet is determined by, for example, an ingress node or a network controller and added to the encapsulation of the packet. The encapsulation arranges the segment identifiers in sequential order along the defined path. Forwarding then proceeds by lookup, in a segment routing forwarding table of the forwarding node, of the first segment identifier (e.g., the uppermost identifier, in an MPLS implementation using a label stack). When the sub-path corresponding to a segment identifier has been traversed, that identifier is removed from the active set of segment identifiers carried by the packet. The path for the packet is accordingly defined by accessing the segment identifiers carried by the packet in sequential order. Although segment routing allows an explicit path to be defined with relatively minimal "state" (storage of identifiers, labels, etc.) at each forwarding node, segment routing as currently defined does not allow for multicast path definition or forwarding.

Bit Indexed Explicit Replication with Traffic Engineering (BIER-TE)

A new forwarding method called Bit Indexed Explicit Replication with Traffic Engineering (BIER-TE) allows multicast explicit paths to be defined while exhibiting a similar reduction of multicast state information to that provided by the existing BIER forwarding mechanism described above. The existing BIER mechanism may be referred to as "BIER", BIER-shortest path first ("BIER-SPF") or "non-TE BIER" herein. Both BIER and BIER-TE encode path-related information in a bit array carried by the packet. However, the type of information encoded is different for the two techniques. As described above, bit positions in the bit array used in BIER correspond to receivers of a multicast packet (such as egress nodes connected to respective receivers, or egress interfaces of such egress nodes). In BIER-TE, by contrast, bit positions correspond to links within a path, where "link" is used in a general sense herein as a data connection between a network node and another node or another protocol level of the network. Links as described herein function as path segments, or sub-paths, such that the path for a message is formed from a series of connected links. Links represented by bit positions may also be referred to as "hops" or "adjacencies" herein.

A link represented by a bit position in a BIER-TE bit array can be of multiple different types. For example, a link can connect one network node and a directly-connected adjacent node. This type of direct link can be defined as either a one-way or two-way link. A bit position may also represent an indirect connection between one node and a non-adjacent node, such that the link includes one or more intervening nodes. In addition to these direct and indirect connections between network nodes, a bit position may represent a connection between the BIER-TE protocol layer and a higher protocol layer of the network.

Preparation for forwarding of a packet by BIER-TE includes four basic processes: the path (or set of paths forming a multicast tree) for the packet (and other packets in the same multicast group) is determined; bit positions are assigned to the links that join together to create the path or tree; the packet is encapsulated to include a packet bit array having set bits in the bit positions corresponding to the links along the path; and for each node along the path, bit positions representing links connected to that node are added to a BIER-TE forwarding table at the node, along with appropriate forwarding instructions. These processes are discussed in more detail below.

BIER-TE Forwarding Examples

FIG. 1 shows an example network 100. Network 100 includes nodes 118, 120, 122, 124, 126 and 128, which are configured to forward packets or other messages using BIER-TE. For example, these BIER-TE-enabled nodes are configured to store and use respective bit-indexed forwarding tables based on BIER-TE bit position assignments, as explained further below. In some embodiments, some or all of these BIER-TE-enabled nodes are also enabled to forward non-TE BIER packets, using different forwarding tables reflecting different bit position assignments. Letters A through F denote respective unique identifiers for the BIER-TE-enabled nodes, such as IP loopback addresses (in the case of an IP network). For brevity, these letters are used herein to reference the respective nodes and for describing links and paths in network 100. The solid lines between the nodes represent data connections between them; in an embodiment, the connections are physical point-to-point links.

Figure 2:
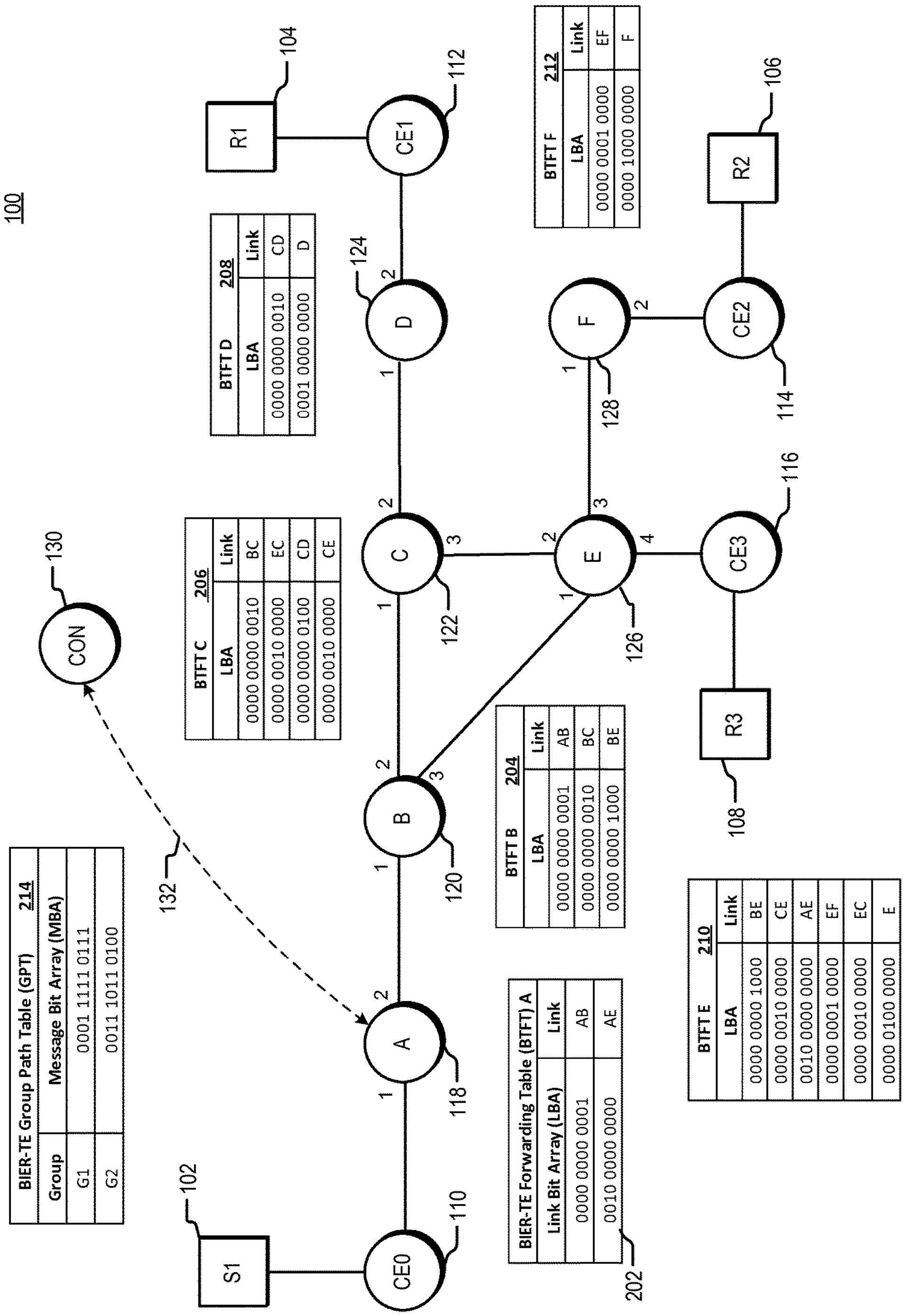
FIG. 2 is a simplified diagram illustrating certain components of an example network.

In the embodiment of FIG. 1, BIER-TE-enabled nodes 118, 120, 122, 124, 126 and 128 form a provider network, or domain. Such a provider network could be employed by an Internet service provider to transport packets to customers. The domain includes core nodes 120 and 122, and provider edge nodes 118, 124, 126, and 128. The provider edge nodes are coupled to customer edge nodes 110, 112, 114, and 116. Hosts 102, 104, 106, and 108 are coupled to the customer edge nodes. In the embodiment of FIG. 2, host 102 is a multicast source, while hosts 104, 106, and 108 are configured as multicast receivers, or subscribers. BIER-TE-enabled node 118 is configured as an ingress router for multicast data packets. The ingress router is coupled, via customer edge node 110, to source 102. Multicast data packets from source 102 enter the BIER-TE network via ingress router 118. Each of BIER-TE-enabled nodes 124, 126, and 128 is configured as an egress router. The egress routers can be connected (directly or via customer edge routers) to hosts, such as receivers, or other networks. An egress router as used herein is a BIER-TE-enabled node that is the last BIER-TE-enabled node on a path between a source and a receiver. The egress router may be a provider edge node that is coupled to the receiver either directly or indirectly (e.g., through a non-BIER-enabled customer edge node).

Network 100 also includes a central controller 130. In an embodiment, controller 130 is a controller host external to the data path of the BIER-TE network. In an alternative embodiment, ingress node 118 is configured to perform some or all of the functions of controller 130. In yet another embodiment, some or all of the functions of controller 130 may be performed through manual configuration procedures. In an embodiment, controller 130 of FIG. 1 interacts with each of the BIER-TE-enabled nodes through a mechanism and/or protocol different than those used to forward multicast packets through network 100. This interaction may be referred to as "out-of-band" or "overlay" signaling. An exemplary interaction between controller 130 and ingress node A is illustrated by dashed line 132 in FIG. 1. Although additional dashed lines are omitted from FIG. 1 for clarity, similar communications occur between controller 130 and each of nodes B through F. Communication between controller 130 and the BIER-TE-enabled nodes may occur through one or more control protocols. As an example, communications with controller 130 may occur using the NETCONF and/or RESTCONF protocols and the YANG data modeling language. These protocols are described further in, for example, "Network Configuration Protocol (NETCONF)," by R. Enns, M. Bjorklund, J. Schoenwaelder, and A. Bierman, Eds., RFC 6241, June 2011, available at https://tools.ietf.org/html/rfc6241, "RESTCONF Protocol," by A. Bierman, M. Bjorklund, and K. Watsen, Jun. 4, 2015, available at https://tools.ietf.org/html/draft-ietf-netconf-restconf-05, and "YANG—A Data Modeling Language for the Network Configuration Protocol (NETCONF)," by M. Bjorklund, Ed., RFC 6020, October 2010, available at https://tools.ietf.org/html/rfc6020, which documents are incorporated by reference as if fully set forth herein. As another example, controller 130 may communicate with nodes A through F using a border gateway protocol (BGP), in an embodiment in which the BIER-TE-enabled nodes are running a BGP. Communications with controller 130 are carried over data links to controller 130 that are not explicitly shown in FIG. 1. In an embodiment, control communications between nodes A through F and controller 130 are carried over some or all of the same physical links used for transmission of messages through network 100, although different protocols are used for the message transmission and the control communications.

The functions of controller 130 in the embodiment of FIG. 1 include: assigning bit positions to links within the BIER-TE-enabled portion of network 100; communicating the bit position assignments to forwarding tables in the respective BIER-TE-enabled nodes; determining the explicit path (or tree) to be followed by messages within a particular multicast group; and communicating to the BIER-TE ingress node for the group the bit positions making up the path, along with an identification of the multicast group. Embodiments employing a controller such as controller 130 may be associated with software-defined networking (SDN) implementations. In assigning bit positions, the controller uses topological information for the network. In an embodiment, the network nodes are running an interior gateway protocol (IGP), and controller 130 obtains the topology of network 100 through IGP advertisements. In an alternative embodiment, controller 130 obtains topology information through operation of a different protocol, or through manual configuration. Controller 130 typically also uses multicast group membership information in assigning bit positions. Bit position assignments are needed only for network links that are included in a path taken by messages in the network, not necessarily for every link in the network. Multicast group membership information can therefore assist controller 130 in determining which network links should be assigned bit positions and included in explicit paths. In an embodiment, provider edge nodes such as nodes A, D, E and F of network 100 communicate with controller 130 to identify their respective hosts as either a source of or a receiver of (subscriber to) a particular multicast transmission, and inform the controller of any changes in group membership status. In a further embodiment, communication by a provider edge node with controller 130 is in response to receiving a multicast protocol message (such as a "join" or "prune" message) from the node's associated host.

An exemplary assignment of bit positions to links is illustrated in FIG. 1. In the notation used in FIG. 1, a bit position assigned to a link is denoted by a numeral in brackets. Other aspects of the notation represent different types of links, as explained further below. For example, bit position assignments 134 include a bit position number in brackets positioned above a one-way arrow. The arrow is oriented to point in the direction of the link represented by the bit position. For example, bit position 1 is assigned to the direct link between node A and node B, for a message traveling from A to B. In other words, bit position 1 represents a one-way direct link between nodes A and B. Such a direct link may also be called, for example, a "direct adjacency," a "connected adjacency," a "forward-connected adjacency" or a "direct-hop" link or adjacency. Similarly, bit position 2 is assigned to a one-way direct link between nodes B and C, and bit position 4 to a one-way direct link between nodes B and E. Other one-way direct links between BIER-TE-enabled nodes in network 100 include those between nodes C and D (assigned bit position 3) and between nodes E and F (assigned bit position 5).

In the convention used herein, assignment of a bit position number to a link means that a bit array encoding a path containing that link will have a set bit (a bit value of "1" rather than "0") in the bit position corresponding to the link's bit position number, counting from the right. For example, a 12-bit bit array encoding only the path between nodes B and C in FIG. 1 (assigned bit position 2) is denoted {0000 0000 0010}, where bits in the bit array are arranged in groups of four for readability. Other conventions may be used in embodiments of the methods and systems described herein, however. For example, the use of a bit value of "1" in the position of a link included in the path and "0" otherwise could be reversed, or the bit positions could be counted from the leftmost bit of the bit array in some embodiments. As another example, although bit positions are numbered herein starting with “1”, a numbering system beginning with “0” could be used in other embodiments.

Returning to FIG. 1, another type of link is represented by bit position assignment 136. Assignment 136 assigns bit position 6 to a two-way direct link between nodes C and E, as indicated by the two-way arrow below the bit position numeral. In other words, bit position 6 represents both the direct link from node C to node E and the link in the other direction, from node E to node C. Still another type of link is represented by bit position assignments 138 in FIG. 1. Bit position assignments 138 are for links associated with egress nodes such as nodes D and F. The diagonally-upward arrow used in the notation for assignments 138 indicates a link to a higher protocol layer in network 100. In particular, the assigned bit position is associated with decapsulation of the BIER-TE information from the message, and passing of the message to the next higher protocol layer, or the forwarding protocol used outside of the BIER-TE domain. As an example, the protocol that the message is passed to can be an MPLS multicast or IP multicast protocol. Any further replication or forwarding needed is then performed using the higher layer protocol. This type of link to a higher protocol may be called, for example, a “local link,” “local adjacency,” or “local decapsulation” adjacency or link. In the embodiment of FIG. 1, bit position 9 is associated with a link at node D to the next higher protocol layer in network 100, bit position 8 is associated with a link at node F to the next higher protocol layer, and bit position 7 is associated with a similar link at node E.

Bit position assignment 140 in FIG. 1 represents yet another type of network link. Assignment 140 assigns bit position 10 to a link between node A and node E, but the link is not a direct link, since the nodes are not directly connected in network 100. In the embodiment of FIG. 1, a message can travel between nodes A and E either by going through node B to node E or by going through node B and then node C to reach node E. For some messages forwarded by node A, it may be important that the message goes through node E, but it may not matter which path to node E the message takes. For such a message, controller 130 can construct an explicit path including an indirect link from node A to node E. This indirect link is illustrated in FIG. 1 by dashed line 142, and indicated in the notation of bit position assignment 140 by a superscript E denoting the destination node, with the absence of an arrow pointing along a particular route. This type of indirect link may also be called, for example, a “remote adjacency,” a “forward-routed adjacency,” or a “loose-hop” link or adjacency. In an embodiment, node A implements the message forwarding associated with bit position 10 by using unicast routing information stored at node A. Forwarding mechanisms associated with the bit position assignments discussed above are described further in connection with FIGS. 2 and 3 below.

The bit position assignments shown in FIG. 1 are used to describe the explicit path to be taken by a multicast message. For example, a path ABEF through the network is made up of links having bit positions 1, 4 and 5. A 12-bit bit array carried by a message assigned to path ABEF can be denoted {0000 0001 1001}. Path ABCD is made up of links having bit positions 1, 2 and 3, resulting in a bit array for the path denoted {0000 0000 0111}.

The bit position assignment notation of FIG. 1 is intended to aid in visualization of explicit path formation using links, or path segments, having assigned bit positions. Use of assigned bit positions in BIER-TE forwarding is implemented through forwarding table entries corresponding to those bit positions relevant to a given BIER-TE-enabled node, and through encapsulation of messages to carry a bit array encoding the explicit path to be traveled by the message. Exemplary message bit arrays and forwarding table entries are shown in FIG. 2. FIG. 2 illustrates network 100 as shown in FIG. 1, but with the bit position assignments reflected in exemplary forwarding table portions for each node. FIG. 2 also includes designations of interfaces of the BIER-TE enabled nodes. For example, node B has three interfaces designated 1-3, respectively. These interface designations are omitted from representations of network 100 in FIGS. 1, 3A and 3B to make other features shown in those drawings easier to see, but it should be understood that the same designations are nonetheless assigned to interfaces of network 100 as depicted in those Figures as well. Beginning with node A, a portion 202 of a BIER-TE forwarding table (BTFT) is stored at node A. A forwarding table for BIER-TE may also be referred to as a Bit Forwarding TE (BFTE) table. Table portion 202 associates a link bit array (LBA) with each link to a BIER-TE-enabled node from node A. The link bit array is simply an array of bits having a single set bit corresponding to the bit position assigned to the corresponding link. Bit arrays illustrated in the tables herein may have the bits grouped into 4-bit subgroups for readability. The link bit array in the forwarding table may also be referred to a “bit mask” herein. In an embodiment, storing the bit position of a link in the form of a link bit array facilitates comparison of the link bit array to the message bit array in an incoming message. Alternatively, the bit position assigned to a link may in some embodiments be stored as simply the number of the bit position (e.g., “1” for link AB in table 202 and “10” for link AE). Such a bit position number may of course be stored as a number in any suitable numbering system, including binary or hexadecimal.

In the “Link” column of the BTFTs of FIG. 2, a link between two of the BIER-TE-enabled nodes in network 100 is denoted by the letter designating the sending node of a link, followed by the letter designating the receiving node. For example, link AB designates a direct one-way link from node A to B, while AE designates an indirect (because these nodes are not directly connected in network 100) one-way link from node A to node E. A single letter is used to denote a “local” link at a node (i.e., a link from the BIER-TE protocol layer to the next higher protocol layer). This link notation is for convenience and ease of explanation, and may not reflect the way a link is identified in an actual forwarding table. Links may be stored in forwarding tables in various ways that will be recognized by one of ordinary skill in the art in view of this disclosure. For example, a forwarding table may include node addresses, may store sending and receiving ends of a link separately, and/or may include additional information about the type or properties of a link. In general, a BTFT for a BIER-TE-enabled node includes additional information not shown in the table portions of FIG. 2, such as additional forwarding instructions or ingress and egress interface information. In an embodiment, the bit position and link information in BTFT portion 202 is received from controller 130 over control link 132 once bit positions have been assigned to links within network 100. In an alternative embodiment, bit position and link information for table portion 202 is provided to node A through a manual configuration process.

Portion 202 of the BTFT for node A assigns bit position 1 to the direct link from node A to node B, and bit position 10 to the indirect link from node A to node E. These forwarding table entries reflect the two bit position assignments involving node A shown using a different notation in FIG. 1. Because there are only two bit position assignments involving node A, there are only two entries in the BTFT for node A. The forwarding table at each BIER-TE node includes entries only for links connecting that node to other BIER-TE nodes, and among those links to other BIER-TE nodes, only those links having an assigned bit position are included. Although a bit position is assigned to each direct connection between BIER-TE-enabled nodes in the simplified example of network 100, in other embodiments bit positions are not assigned to every direct link. In an embodiment, bit positions are assigned only to links that are needed to form paths or trees to be traveled by messages in the network.

Portion 204 of the BTFT for node B is also illustrated in FIG. 2. In the embodiment of FIG. 2, BTFT B includes both incoming and outgoing links. Link AB, having assigned bit position 1 and also included in the BTFT for node A, is represented in BTFT B as an incoming link to node B. Links BC and BE, having assigned bit positions 2 and 4, respectively, are outgoing links from node B included in BTFT B. The basic mechanism of BIER-TE forwarding at a node, described further in connection with FIG. 3 below, involves determining whether bit positions associated with outgoing links from the node include a set bit in the message bit array of the message to be forwarded. Inclusion of incoming links in a BTFT as well can be advantageous in some cases, however. In some embodiments, for example, bits in bit positions corresponding to incoming links are reset in the message bit array of the message being forwarded. This kind of reset procedure may prevent looping and duplication of messages; embodiments of reset procedures are discussed in more detail below. Depending on the timing of any reset procedure, bit positions corresponding to incoming links can be used in some embodiments in determining whether a message entering a node should be accepted by the node or rejected. Entries for incoming links in BTFT B and other forwarding tables shown in FIG. 2 may therefore be used in processes including these reset and checking procedures. In the link notation used in FIG. 2, the name of an incoming link has the letter representing the node in the second position (e.g., link AB is incoming to node B), while the names of outgoing links have the letter representing the node in the first position (e.g., link BC is outgoing from node B). In an embodiment a BTFT includes an additional field or column to indicate whether the link of a table entry is an incoming or outgoing link. In an alternative embodiment to that of FIG. 2, the BTFTs for each of the BIER-TE-enabled nodes include entries only for outgoing links from their respective nodes.

Comparison to the bit position assignments illustrated in FIG. 1 shows that the same assignments for links AB, BC and BE are reflected in BTFT portion 204. In an embodiment, the bit position and link information in BTFT portion 204 is received from controller 130 over a control link similar to control link 132. In an alternative embodiment, bit position and link information for table portion 204 is provided to node B through a manual configuration process.

Bit positions assigned to links connecting node C to other BIER-TE-enabled nodes are shown in portion 206 of a BTFT for node C. Table portion 206 includes links both incoming to and outgoing from node C, and the considerations discussed above in connection with node B apply to node C as well. Because the link between nodes C and E is a two-way link with a single assigned bit position, as discussed above in connection with FIG. 1, BTFT C includes two entries for bit position 6: one in each direction of the two-way link. Link EC is an incoming link to node C, while link CE is an outgoing link. In an alternative embodiment, BTFT C includes a single entry for the link between nodes C and E, and the entry includes an additional field or column indicating whether the link is a one-way or two-way link. Comparison to the bit position assignments illustrated in FIG. 1 shows that the same assignments for links BC, EC, CE and CD are reflected in BTFT portion 206. In an embodiment, the bit position and link information in BTFT portion 206 is received from controller 130 over a control link similar to control link 132. In an alternative embodiment, bit position and link information for table portion 206 is provided to node C through a manual configuration process.

Portion 208 of the BTFT for node D is also shown in FIG. 2. Node D is an egress node from the BIER-TE domain, and its BTFT includes a link to a higher protocol layer. Bit position 2 is assigned to incoming link CD, and bit position 9 is assigned to the link at node D to the next higher protocol layer. The entries in BTFT portion 208 correspond to the bit position assignments shown in FIG. 1 in connection with node D. Like the other BIER-TE-enabled nodes of network 100, node D can receive information for storage in its BTFT from controller 130 or through a manual configuration process. Portion 212 of a BTFT for node F is also shown in FIG. 2, and is similar to the BTFT portion for node D. Bit position 5 in BTFT portion 212 is assigned to incoming link EF, and bit position 8 is assigned to the link at node F to the next higher protocol layer.

The largest BTFT portion shown in FIG. 2 is for node E, including bit position assignments for three incoming links, two outgoing links and a link to the next higher protocol layer at node E. In the embodiment of network 100, node E is an egress node for messages sent to receiver 108 through CE node 116, and a core node for messages sent on to BIER-TE-enabled node F. Like the BTFT for node C, BTFT portion 210 for node E includes both incoming and outgoing links assigned to bit position 6 because of the two-way link between nodes C and E assigned to that bit position. The entries in BTFT portion 210 correspond to the bit position assignments shown in FIG. 1 in connection with node E. Like the other BIER-TE-enabled nodes of network 100, node E can receive information for storage in its BTFT from controller 130 or through a manual configuration process.

As noted above, the BTFTs illustrated in FIG. 2 generally include additional information not shown, including interface or port information, and BTFTs may have information and entries arranged differently than is shown in FIG. 2. For example, the BTFTs of FIG. 2 have entries for incoming links grouped separately than entries for outgoing links. In other embodiments a BTFT may have entries sorted by bit position number without regard for whether links are incoming or outgoing. As another example, the BTFTs of FIG. 2 include entries only for bit positions assigned to links connected to the node where the BTFT is stored. In an alternate embodiment, each BTFT includes an entry for every bit position in the bit array length used in the network, but entries are empty (have no link information) for bit positions not assigned to a link connected to that node.

In addition to populating the BIER-TE forwarding tables for each BIER-TE-enabled node, preparation for forwarding by BIER-TE includes storing of a BIER-TE message bit array for each multicast group to be forwarded using BIER-TE. An exemplary portion of a BIER-TE group path table (GPT) 214 is shown in FIG. 2. In an embodiment, the GPT of portion 214 is stored at ingress node A for use by node A in encapsulating incoming multicast packets for BIER-TE forwarding. In a further embodiment, the message bit array assigned to each multicast group is provided to node A by controller 130. Alternatively, message bit arrays for multicast groups are provided to node A through a manual configuration process. Portion 214 of the GPT for network 100 includes columns for a group identifier or address and for a message bit array to be assigned to messages in that group. In an embodiment, the group identifier or address in the GPT is the group identifier or address carried by the incoming multicast message. In another embodiment, the GPT includes multicast source information instead of or in addition to multicast group information. The message bit array (MBA) is the bit array to be carried by the message when it is encapsulated for BIER-TE forwarding. In a packet network, the message bit array may be called a packet bit array (PBA) herein. A message bit array or packet bit array may also be called a "bit string" herein. As used herein, the term bit array, bit string or bit mask refers to a set of bits that has a fixed or variable length.

The length of the bit arrays used in a particular BIER-TE network—i.e., the number of bits in the array—can be statically configured or dynamically assigned and distributed through the BIER-TE network. The bit array can have any suitable length. In an embodiment, the length is determined in view of the size and capabilities of the network. In one embodiment, the length of the bit array is between 8 and 4096 bits. In a further embodiment, the length of the bit array is between 256 and 1024 bits. The maximum bit array length value is determined, in one embodiment, by hardware or software limitations of the BIER-TE-enabled nodes in the BIER-TE network. In one embodiment, different BIER-TE-enabled nodes in the BIER-TE network have different maximum bit array lengths. For example, one BIER-TE-enabled node may have a maximum bit array length of 128 bits while another BIER-TE-enabled node may have a maximum bit array length of 256 bits. The number of links, or path segments, that can be represented by a bit position in a message bit array depends on the length of the array. Methods for reducing the number of bit positions used in defining paths or trees in a network are discussed further below.

Along with the BIER-TE forwarding tables, the GPT is in some embodiments populated with information received from controller 130. As noted above, controller 130 uses topology information and multicast group information in assigning bit positions and determining explicit paths and trees for multicast groups. In an embodiment, controller 130 and nodes in network 100 run an IGP, and controller 130 obtains topology information through IGP advertisements. In an alternative embodiment, BIER-TE-enabled nodes provide topology information (such as neighbor information) to controller 130 through a query or reporting process using a control protocol. In embodiments in which some or all of the BIER-TE-enabled nodes are not running an IGP, the nodes can still obtain neighbor information through, for example, Layer 2 handshaking or announcement protocols. In an embodiment, BIER-TE-enabled nodes obtain neighbor information using Address Resolution Protocol (ARP) or Neighbor Discovery Protocol (NDP).

As also noted above, multicast group information is in some embodiments provided to controller 130 by provider edge nodes such as nodes A, D, E and F in network 100. In another embodiment, controller 130 is in communication with customer edge nodes such as nodes 110, 112, 114 and 116 of network 100 and receives multicast group information from those nodes. In addition to topology information and multicast group information, rules or requirements related to a particular network or application may be used by controller 130 in determining explicit paths and trees for multicast groups. For example, error correction schemes in video transmission networks can require a video stream to be sent over two separate non-overlapping paths. Various traffic engineering rules and requirements are accounted for by controller 130 in some embodiments. As an example, shared risk group (SRG) information can be considered in some embodiments. In some embodiments, some or all of the above information used by controller 130 is provided to controller 130 through a manual configuration process. In another embodiment, explicit path or tree information is provided to controller 130 or to ingress node A through a manual configuration process.

Portion 214 of the GPT in FIG. 2 includes message bit arrays for two multicast groups. Group G1 is assigned an MBA of {0001 1111 0111} (shown here with spaces between groups of 4 bits for readability). The MBA for group G1 has set bits at bit positions (BPs) 1, 2, 3, 5, 6, 7, 8 and 9. Comparison to the links in the BTFTs for the BIER-TE-enabled nodes shows that the tree for group G1 includes links AB (BP 1), BC (BP 2), CD (BP 3), EF (BP 5), CE or EC (BP 6), E (local—BP 7), F (local—BP 8) and D (local—BP 9). The direction taken through the two-way link between nodes C and E becomes clear upon considering this set of links in view of the topology of network 100. Entering at node A, the G1 message is forwarded to node B and then node C, at which point it is replicated, with one copy forwarded to node D and one to node E. Bit position 6 therefore corresponds to link CE in the tree for group G1. A replica message is then sent from node E to node F, and another replica is decapsulated at E in accordance with the "local" link for node E. Forwarding of the G1 packet is described in more detail below in connection with FIG. 3A.

Group G2 in GPT portion 214 is assigned an MBA of {0011 1011 0100}, with set bits at BPs 3, 5, 6, 8, 9, and 10. According to the BP assignments in the BIER-TE forwarding tables, the tree for group G2 includes links CD (BP 3), EF (BP 5), CE or EC (BP 6), F (local—BP 8), D (local—BP 9) and AE (BP 10). Considering this set of links in view of the topology of network 100, and assuming a G2 message enters the BIER-TE domain at node A, the message is forwarded first to node E where it is replicated, with one copy forwarded to node F and one to node C. Bit position 6 therefore corresponds to link EC in the tree for group G2. The message sent to node C is then forwarded to node D, where it is decapsulated in accordance with the "local" link for node D. The message copy sent to node F is also decapsulated, according to the "local" link for node F. Forwarding of the G2 packet is described in more detail below in connection with FIG. 3B.

Figure 3A:
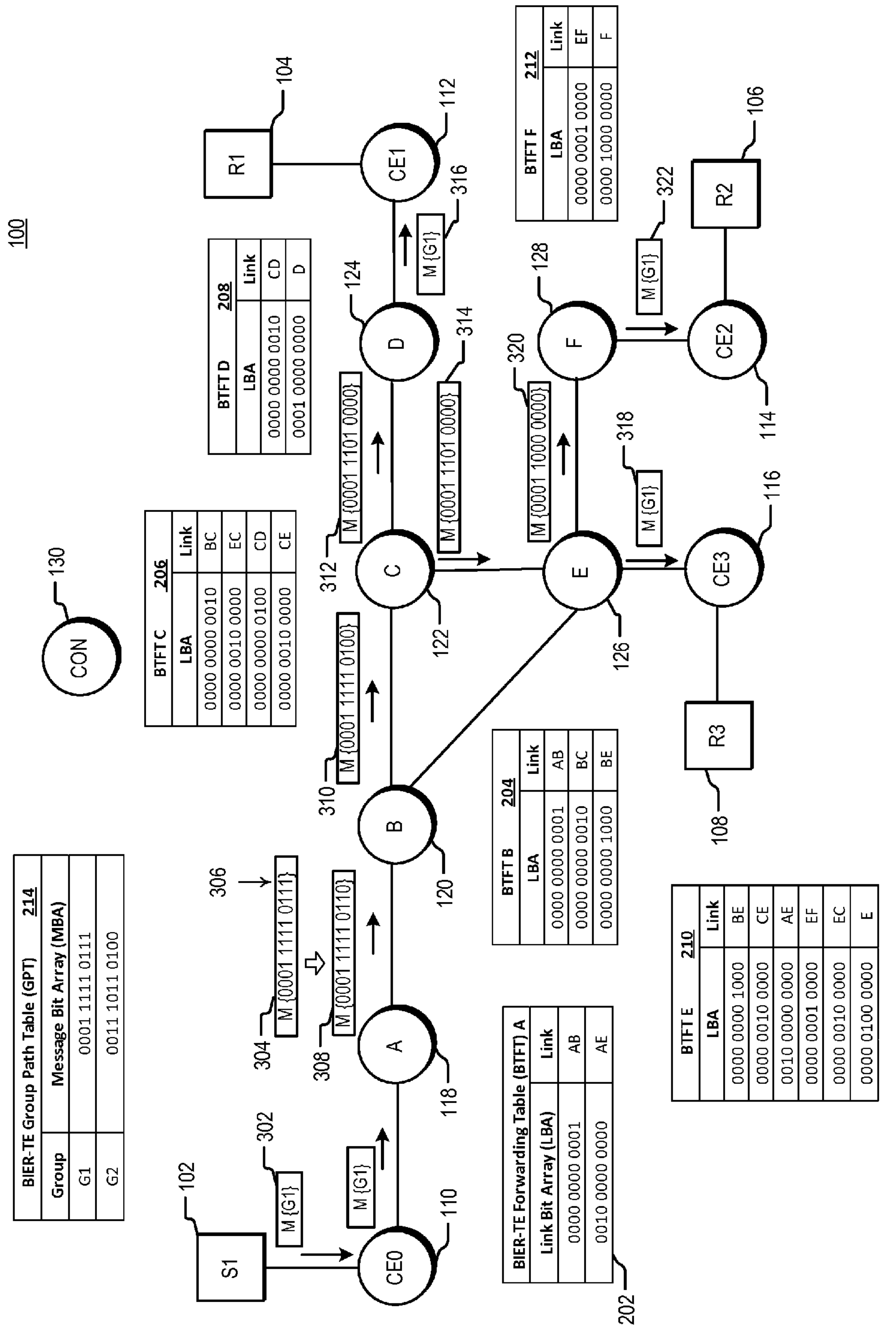
FIG. 3A is a simplified diagram illustrating message forwarding through an example network.

FIG. 3A illustrates the forwarding process through network 100 for a multicast message, such as a packet, frame or datagram, in multicast group G1. Network 100 appears as shown in FIGS. 1 and 2, along with GPT portion 214 and BTFT portions for nodes A through F as also shown in FIG. 2. Control link 132 shown in FIGS. 1 and 2 has been removed from FIG. 3, in part for clarity of the drawing but also to illustrate that communication between controller 130 and BIER-TE-enabled nodes is generally not required during actual forwarding of a message. Communication by controller 130 sets up network 100 for BIER-TE forwarding, and is subsequently used to update the GPT and/or forwarding tables in the case of any changes to the network or the multicast flows. In FIG. 3A, icons representing multicast messages, such as original message 302 and BIER-TE-encapsulated message 304, are superimposed onto the diagram of network 100. The icons represent snapshots taken at successive times as the message (or replicas of the message)

moves through the network in the direction of the arrows. At one point in time, for example, message 310 is moving from node B to node C. At a subsequent point in time, message 310 has been replicated and forwarded on, so that message replicas 312 and 314 are moving from node C toward nodes D and E, respectively. In the embodiment of FIG. 3A, message 302 is sent from source host 102 through customer edge node 110 to BIER-TE ingress node A. Ingress node A uses the multicast group address and/or source address included in the multicast message to access its GPT and select a message bit array associated with the multicast group. After selecting an MBA that corresponds to the multicast group, node A encapsulates the message bit array into the multicast message, resulting in BIER-TE message 304.

In embodiments for which ingress node A is capable of multicast forwarding by other methods than BIER-TE, node A will need to determine that message 302 is to be encapsulated as BIER-TE. In one embodiment, node A checks each table it has stored for encapsulation of multicast messages (such as a GPT for BIER-TE or a group membership table (GMT) for non-TE BIER). If the multicast group or source information for the incoming multicast message is included in one of the available tables, the corresponding encapsulation is used. In a further embodiment, the tables are checked in a specified order, and the encapsulation corresponding to the first table including group or source information for the incoming message is used. In an alternative embodiment, the encapsulation of the incoming multicast message is extended to include an indication that BIER-TE forwarding should be used where available. In such an embodiment, node A knows to check the BIER-TE GPT for a message bit array to be applied to the incoming message.

Encapsulation of a message bit array onto message 302 to form BIER-TE message 304 can be accomplished in multiple ways. In an embodiment, an existing encapsulation is adapted or extended to carry BIER-TE information. For example, a message bit array is written to the destination address field of an Internet Protocol version 6 (IPv6) header in one embodiment for which the multicast message is an IP packet. In another embodiment, a message bit array is written to one or more IPv6 extension headers. As another example, an IP packet with an MPLS encapsulation is forwarded using one or more 32-bit labels inserted between the IP header and data link layer header of the packet. In one embodiment, BIER-TE-related information including the message bit array is included in a stack of MPLS labels. In an alternative embodiment the message bit array is encoded outside of the MPLS label structure, between the MPLS label stack and the payload of the packet. In a still further embodiment, the bit array may be included in a BIER-TE header appearing between the label stack and the payload, where the BIER-TE header may also include additional information. As an alternative to adapting an existing encapsulation in ways such as those described above, a dedicated BIER-TE encapsulation, such as a dedicated BIER-TE header, may be used in some embodiments. In a further embodiment, controller 130 communicates a BIER-TE encapsulation format to BIER-TE-enabled nodes in network 100.

When an incoming message has been encapsulated to form a BIER-TE message, node A proceeds with BIER-TE forwarding of the message. The basic BIER-TE forwarding mechanism is to determine whether any of the bit positions representing outgoing links in the forwarding node's BIER-TE forwarding table include set bits in the message bit array. If a set bit in the MBA shares the bit position of an outgoing link in the forwarding table, a replica of the packet is forwarded over the link. In one embodiment, determining whether any set bits in the MBA have the same bit position as links in the forwarding table includes representing the link in the forwarding table as a link bit array, where every bit in the LBA is set to zero except for the bit in the bit position assigned to the link. In a further embodiment, a logical AND operation is then performed between the message bit array and the link bit array. If the result of the AND operation is TRUE, the message bit array does have a set bit in the bit position assigned to the link. In another embodiment, the bit value for a bit position in the MBA corresponding to a link in the forwarding table is checked using a different operation. In yet another embodiment, bit positions for set bits in the message bit array are identified, and the BIER-TE forwarding table is then checked to determine whether there are links in the table corresponding to any of the identified bit positions.

Applying this mechanism to message 304 at node A of FIG. 3A, the message bit array of message 304 is compared to the entries of BTFT portion 202. The BTFT for node A has only two bit positions corresponding to links: BP 1 for link AB and BP 10 for link AE. One of these, BP 1, corresponds to a set bit in the MBA of message 304. The message is therefore forwarded to node B over link AB. It is noted that the comparison of the MBA for message 304 with the entries of the BTFT for node A could have been carried out in multiple ways, including those described above. For example, a logical AND of the MBA of message 304 with the LBA for link AB in BTFT A gives a result of TRUE, while the same operation with the LBA for link AE in BTFT A gives a result of FALSE. A variation of this method is to first perform a logical OR of the link bit arrays of all outgoing links in the BTFT, then AND the result with the MBA and identify the bit positions of any set bits in the result of the AND operation. A replica of the message is then forwarded over any links corresponding to set bits. As another example, the bit positions of set bits in the MBA of message 304 can be considered one by one, checking the BTFT for a link associated with each bit position of a set bit. The result of this procedure is again that a message is forwarded over only link AB.

In an embodiment, BIER-TE forwarding over a directly-connected link such as that between nodes A and B is done by layer 2 (L2) forwarding rather than routing. In a further embodiment in which only directly-connected links are used, the BIER-TE-enabled nodes do not need to have routing tables or to run an IGP.

In the embodiment of FIG. 3A, a reset operation is carried out at node A before message 304 is forwarded over link AB. Bit position 306 corresponds to the link that the message is forwarded over; the bit in this position is reset (set to 0, in the bit value convention used herein), resulting in message 308. Resetting of bits in each bit position corresponding to a link that the message is forwarded over ensures that the same message cannot be re-sent over the same link in the event of a loop in the network. In an embodiment, the reset procedure is performed using a reset bit mask associated with each BTFT. For the bit value convention used in FIG. 3A, the reset bit mask has a bit value of 0 at each bit position corresponding to a link the message is being forwarded over, and a 1 in every other position. In a further embodiment, each BTFT stores a reset bit mask having a 0 in each bit position corresponding to a link that a message can be forwarded over from that node. For example, the link bit arrays for each outgoing link in the BTFT can be OR'd together, and the result inverted, so that the reset mask has a 0 in the bit position for each outgoing link in the table, and a 1 in every other bit position. In this way, the same reset bit mask can be used regardless of which links a particular message is actually forwarded over; bit positions for any unused links will be set to 0 in the message bit array anyway, so that the reset mask has no effect on those bit positions of the MBA in the forwarded message. In a still further embodiment, the reset bit mask has a 0 in each bit position corresponding to either an incoming or outgoing link connected to the node. The reset procedures described herein are not needed in loop-free network topologies, and there are some bit position assignment scenarios requiring bits to not be reset. Reset procedure variations are discussed further below.

Returning to the forwarding example of FIG. 3A, BIER-TE-enabled node B receives message 308 from node A. In an embodiment in which node B forwards messages through other methods in addition to BIER-TE, node B first needs to determine that message 308 is a BIER-TE message. Identification of a message as a BIER-TE message can be included in the encapsulation of the message in various ways. In an embodiment for which BIER-TE is implemented in an MPLS network, for example, a specific uppermost MPLS label may be used to identify a BIER-TE message. Alternatively, a dedicated header or header field may be used to identify a message as a BIER-TE message.

When node B recognizes message 308 as a BIER-TE packet, forwarding proceeds in a similar manner to that described above for node A. The message bit array in message 308 is compared to the forwarding table entries associated with outgoing links in the BTFT for node B. BTFT portion 204 for node B includes two bit positions assigned to outgoing links: BP 2 for link BC and BP 4 for link BE. The message bit array in message 308 has a set bit at BP 2 but not at BP 4. The message is therefore forwarded, in the manner discussed above for node A, to node C over link BC. In the embodiment of FIG. 3A, node B also employs a reset procedure as discussed for node A above, so that forwarded message 310 has the bit at BP 2 reset. BIER-TE forwarding at node C proceeds in a similar manner as for node B. Portion 206 of the BTFT for node C includes two outgoing links: CD (with BP 3) and CE (with BP 6). The message bit array of incoming message 310 has a set bit at both BP 3 and BP 6. Message 310 is therefore replicated, with one copy, message 312, forwarded to node D over link CD and another, message 314, to node E over link CE. Node C also implements a bit reset procedure so that the bits at BP 3 and BP 6 are reset in each of the forwarded messages.

At node D, where message replica 312 is received, the only outgoing link in the BTFT table is the local link for node D, at BP 9. The message bit array for message 312 has a set bit at BP 9, so node D removes the BIER-TE encapsulation from the message, restoring the format of the original multicast message 302. The decapsulated message becomes message 316, which is handed off to the next higher protocol layer at node D (such as, for example, IP multicast or m-LDP) and then forwarded to receiver 104 via customer edge node 112.

At node E, where message replica 314 is received, there are three outgoing links in the BTFT: EC (with BP 6), EF (with BP 5) and the local link for node E, with BP 7. The message bit array for message 314 has set bits at bit positions 5 and 7, but not at BP 6. The two-way link between nodes E and C illustrates the importance of the bit reset procedure in certain situations. Because bit position 6 is assigned to both directions of the link between nodes C and E, a message would be sent back to node C from node E if BP 6 had not been reset at node C before forwarding of message 314. The message would continue to be sent back and forth between these nodes if the bit at BP 6 in the message bit array were not reset by either node. Instead, message 314 is replicated, with one copy forwarded to node F as message 320, and the other copy decapsulated to form message 318 in the original message format used outside of the BIER-TE domain. Message 320 is subsequently decapsulated at node F pursuant to the set bit at BP 8 in the message bit array of message 320, to form message 322. Messages 318 and 322 are forwarded to their respective receivers with the protocol used outside of the BIER-TE domain.

As shown by FIG. 3A and the description above, forwarding of a multicast message through the BIER-TE domain of FIG. 3A results in delivery of copies of the message to receivers 104, 106 and 108 via a specific predefined set of paths. It is noted that because of the reset procedure employed by the BIER-TE nodes in the example of FIG. 3A, the comparison of the message bit array to the forwarding table entries at each node can include forwarding table entries for incoming links as well as outgoing links. The reset procedure of FIG. 3A ensures that no bits in the MBA of a message arriving at a node are set at bit positions corresponding to incoming links for the node.

Figure 3B:
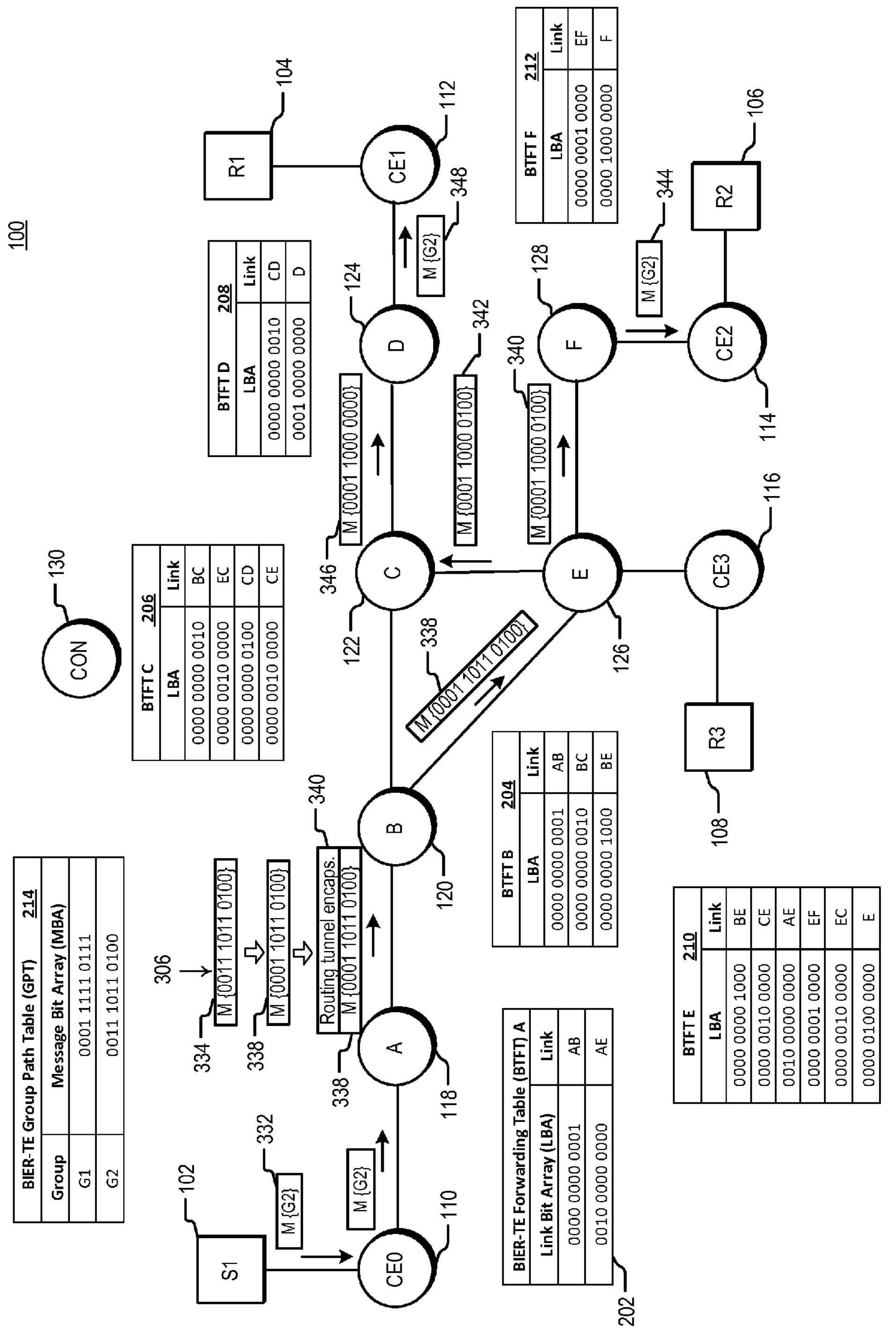
FIG. 3B is a simplified diagram illustrating message forwarding through an example network.

An additional BIER-TE message forwarding example is illustrated in FIG. 3B, this time for a message in multicast group G2 of GPT 214. Multicast message 332 in group G2 is forwarded to ingress node A in the same manner as described above for message 302 in group G1. Message 332 is also encapsulated in the manner described above for message 302, to form BIER-TE message 334. Comparison of the message bit array in message 334 with the BTFT entries for node A shows that the only bit position representing a link in BTFT A and also having a set bit in the message bit array is bit position 10, assigned to link AE. Node A therefore needs to forward the multicast message to node E. First node A performs a reset procedure as described above in connection with FIG. 3A, so that message 338 is formed having bit position 10 reset. Because node E is not directly connected to node A, message 338 is routed to node E. In an embodiment, a BIER-TE message forwarded to a remote, or indirectly connected, node is routed using unicast routing tables at the nodes along the indirect path. Message 338 is encapsulated for unicast routing, forming a unicast "tunnel" to node E. As an example, in a network configured for MPLS unicast routing, routing encapsulation 340 applied to message 338 can take the form of an uppermost MPLS label, where the MPLS label is the label provided by the routing information base (RIB) of node A for routing to node E. The encapsulated message is forwarded to node B, which routes the message as a unicast message according to the uppermost MPLS label. In the embodiment of FIG. 3B it is assumed that the MPLS scheme employs penultimate-hop popping (PHP), so that the unicast MPLS label is removed before forwarding the message on its final hop to node E. (It is also assumed in this embodiment that the path ABE is chosen by the routing algorithm as the shortest path from node A to node E.) In a larger network, a unicast routing tunnel implementing an indirect link between BIER-TE-enabled nodes could of course be much longer than the tunnel in the example of FIG. 3B.

In the embodiment of FIG. 3B, node E receives BIER-TE message 338 because the tunnel encapsulation is removed for the last hop of the path from node A to node E. Node E then proceeds with BIER-TE forwarding as discussed above. Comparison of the message bit array in message 338 with the BTFT entries for node E shows that the bit positions representing links in BTFT E and also having set bits in the message bit array are bit positions 5 and 6, assigned to links EF and EC, respectively. After a reset procedure to reset bits 5 and 6, message 338 is replicated and replica messages 340 and 342 are forwarded to nodes F and C, respectively. As noted above in connection with FIG. 3A, it is important that at least bit 6 is reset before message 342 is forwarded by node C, or else node C will send the message back to node E again. Comparison of the message bit array in message 342 with the BTFT entries for node C shows that message 342 should be forwarded to node D. A reset procedure results in message 346 with bit 3 reset, which is forwarded to node D. Because message 346 has a set bit in BP 9, it is decapsulated at node D and forwarded to receiver 104 via the protocol in use outside of the BIER-TE domain. Meanwhile, message 340 is received by node F and decapsulated pursuant to the set bit in bit position 8 of its message bit array. The decapsulated message 344 is forwarded to receiver 106.

As shown by FIG. 3B and the related description above, forwarding of a multicast message in group G2 through the BIER-TE domain in network 100 results in delivery of copies of the message to receivers 104 and 106, via a combination of a "loose" path to node E and explicit paths from node E to each receiver. The direct-connected links and "loose" indirect links in BIER-TE are similar in some ways to direct-connected segments (or "adjacency segments") and indirect routed segments (or "nodal segments') that have been described for use in segment routing. Segment routing differs from BIER-TE in important ways, however. For example, in segment routing as currently defined a message carries identifiers for each segment of the path to be traversed, and the identifiers have to be arranged in the same order that the segments appear along the path. A node along the segment routed path typically reads only the one identifier corresponding to the position of that node along the path. In BIER-TE, by contrast, no particular ordering of bit positions carried by the packet is needed, as long as the same bit position assignments are used in the message bit array and the BIER-TE forwarding tables at each node. Because each BIER-TE node has in its forwarding table only the links with assigned bit positions that are connected to that node, the node can be presented with a bit array containing bits representing every link along an entire path or tree and pick out only the bit positions relevant to the links at that node. In effect, storage of only the relevant links in each node's BIER-TE forwarding table sets up a kind of self-assembly process for the path or tree, as a message starts its journey carrying bits reflecting the entire tree, but the bits are gradually used in building the path as the messages (or replica messages) progress from node to node.

Because each BIER-TE node can access the message bit array containing bits representing all links in the remainder of the message's path or tree, and can replicate and send a message over any of the links that are connected to the node, multicast transmission is available using BIER-TE. This is in contrast to segment routing as currently defined, which is limited to unicast paths since only one path segment at a time is accessible to a node. The capability of BIER-TE to perform explicit-path forwarding in multicast does not mean that BIER-TE is limited to multicast, however. The forwarding examples discussed above make clear that a BIER-TE bit array can also be used to define an explicit unicast path for a message. In some embodiments, a BIER-TE message bit array may provide a more compact encoding of a given explicit path than the set of segment identifiers needed to encode the same path in a segment routing implementation.

Forwarding by BIER-TE is similar in some ways to forwarding by non-TE BIER, primarily in that both methods encode path information in a bit array carried by the message being forwarded, and the message bit array is compared to bit position information in a forwarding table at each node. As a result, both methods allow the forwarding nodes to be free of multicast state, such as stored tree information for multicast groups. There are important differences between the two methods, however. As one example, BIER-TE provides for explicit paths and trees because the BIER-TE message bit array includes bits corresponding to each link in the tree. In non-TE BIER, on the other hand, bits in the message bit array correspond to receiving nodes and the MBA does not carry explicit path information. The BIER and BIER-TE methods also differ in the operations performed at forwarding nodes. In BIER forwarding, each node maintains a routing table for making SPF-based determinations of which receiver nodes are reachable from each of the node's neighboring nodes. The reachable receiver nodes from each neighbor are reflected in a bit-indexed forwarding table created at each node. In a BIER-TE node, on the other hand, the forwarding table is populated by information provided by an external controller or by manual configuration. At least in the case of paths formed using only directly-connected links, a BIER-TE-enabled node does not require a routing table or any topology information beyond knowing its immediate neighbors. In some embodiments, a BIER-TE-enabled node does not run an IGP.

Bit Position Assignment in BIER-TE

The assignment of bit positions to network links in BIER-TE, as opposed to receiver nodes as in non-TE BIER, allows explicit paths and trees to be defined but also requires a relatively high number of bit positions. The number of bits used to define an explicit multicast tree in BIER-TE can be much higher than the number needed to create a non-explicit tree to the same receiver nodes using non-TE BIER. Bit position assignments in BIER-TE should therefore be done so that the number of bit positions used is minimized. As an initial matter, bit positions are needed only for those links included in an explicit path or tree, and not necessarily for every link in a network. In some embodiments, explicit paths are needed only in one or more portions of the total path taken by a message. If there is a portion of a network where no multicast replication or traffic engineering is required, that portion can be "bypassed" (from the standpoint of the BIER-TE implementation) by defining an indirect link, similar to link AE described in FIGS. 1-4, between BIER-TE-enabled nodes on either side of the bypassed portion. In this manner, only one bit position is needed to traverse this part of the network. In an embodiment, the indirect bypass link is implemented by encapsulating a forwarded message to be routed using the unicast routing tables of the nodes in the bypassed section. This type of unicast-routed indirect link is also useful in bypassing portions of a network having nodes that are not BIER-TE-enabled.

Another situation in which assignment of a bit position can be avoided in some embodiments is a node configured to forward over only one link or otherwise take only one action. As an example, each of egress nodes D and E in network 100 of FIGS. 1-4 has only one outgoing link in its BIER-TE forwarding table, the local decapsulation link for passing a message out of the BIER-TE domain. This type of egress node may be referred to as a "leaf" node. In an embodiment, instead of having a bit position assigned to each of these local links, nodes D and E are configured to decapsulate all BIER-TE messages received and pass them to the next higher protocol layer. In other embodiments an ingress node or a core node of a BIER-TE domain having only one outgoing link is configured to forward all BIER-TE messages over the link, without assignment of a bit position to the link. Forwarding of a message over a link within a BIER-TE domain without assigning a bit position to the link will prevent the node receiving the forwarded message from performing an acceptance check of the message based on bit position, however. Acceptance checking considerations are discussed further below. It is noted that node E in FIGS. 1-4 acts as an egress node for messages sent to receiver 108 but also as a core node for messages sent to node C or to egress node F. As such, there are multiple outgoing links in the BTFT for node E, and a bit position should be assigned to each of those links.

Another approach to conserving bit positions in BIER-TE networks is to share bit positions among links—i.e., to assign a single bit position to more than one link within a BIER-TE domain. One example of this is illustrated by nodes C and E of network 100 discussed above: bit position 6 is assigned to both directions of a two-way point-to-point link between the nodes. In many cases, a single bit position can be used for both directions of this type of two-way point-to-point link. Use of a single bit position for both directions typically requires use of a bit reset procedure, as discussed above in connection with bit position 6 in FIGS. 3A and 3B. Another case in which a single bit position can be assigned to multiple links is that of local decapsulation links for egress nodes such as nodes D and F of network 100. For example, instead of the assignment shown in FIGS. 1-4 of bit position 8 for decapsulation at node F and bit position 9 for decapsulation at node D, a single bit position, such as bit position 8, is assigned as the decapsulation link for both nodes, and any other similar egress nodes in a network. This approach is an alternative to the method described above in which no bit position is assigned to egress nodes such as nodes D and F of network 100. At the cost of one additional bit position compared to the above approach, allocating a single bit position for decapsulation at egress-only nodes, or leaf nodes, has the advantage of allowing an egress node to at least verify that decapsulation is intended, rather than configuring it to decapsulate all received traffic no matter what.

FIGS. 4A and 4B illustrate additional examples of situations in which bit positions may be shared. In FIG. 4A, for example, links 402, 404 and 406 are equal-cost multi-path (ECMP) point-to-point links between nodes A and B, forming a bundle link. A single bit position (BP 5) is assigned to the bundle in both directions, as shown in FIG. 4A by assignment 408, represented using the link assignment notation of FIG. 1. The link to be used by a given BIER-TE message is determined by the forwarding node using an ECMP algorithm considering, for example, an entropy field in the message header and/or a seed parameter stored in the BTFT of the forwarding node. Because the multiple links in the bundle constitute alternative paths to one another, only one of the links will be traversed by any one message and the same bit position can be used for each of the links.

Another example of links that can share a bit position is that of links that will not be connected in series within a path or tree. One example of this situation is a dual-plane network, illustrated in FIG. 4B. Network 410 of FIG. 4B has an upper layer 412 and a lower layer 414. Access nodes A and F determine which layer is traversed by a given message. Because the layers are independent, bit position 5 can be assigned to both the link between nodes B and C in upper layer 412 and the link between nodes D and E in lower layer 414 through assignments 416. In an embodiment, each network layer has its own BIER-TE controller to assign bit positions and determine explicit paths and trees. In an alternative embodiment, a single BIER-TE controller manages both layers of network 410. In some embodiments, a single-layer network can be divided into portions such that links in one portion are not included in the same paths or trees as links in another portion of the network. In such an embodiment, the same set of bit positions can be used for BIER-TE assignments in each portion of the network.

FIGS. 5A through 5D illustrate additional examples of assignment of a single bit position to multiple links, for cases in which a message can be replicated to all links connected to a node. In network portion 500 of FIG. 5A, node A is configured as a hub in a hub-and-spoke arrangement with one-way links to each of nodes B through F. In an alternative embodiment, the links are two-way links with a bit reset procedure employed at each node to prevent messages from bouncing back and forth. If traffic is intended to be sent from node A to each of the connected nodes, a single bit position can be assigned to all of the spoke links, as shown by bit position assignments 502 in FIG. 5A. In this example, use of a single bit position results in a savings of four bit positions. Even if a message sent by node A to all of the connected nodes is not needed by all of the nodes, some sending of unwanted messages may be tolerable in view of the bit positions gained. For network portion 500 as well as the other networks and network portions described herein, if a message is not needed by a receiving node, there will be no set bit at a position in the message bit array of the message corresponding to a link for the receiving node. In this case the unnecessary message will be dropped.

FIG. 5B shows an exemplary BIER-TE forwarding table portion 510 for node A of network portion 500. In the embodiment of FIG. 5B, entries in BTFT portion 510 are sorted by bit position number, with only entry 512 for bit position 5 shown. In an alternative embodiment, a full link bit array is included in table portion 510, in a manner similar to the BTFTs shown in FIG. 2. Entry 512 includes the five links that bit position 5 is assigned to. Forwarding instructions for node A, encoded either elsewhere in the BTFT or in a forwarding engine at node A, require that a BIER-TE message from node A having bit 5 set in its message bit array is forwarded to each of nodes B, C, D, E and F. As in the case of all forwarding table portions illustrated herein, BTFT A generally includes additional information not shown, such as node interface identifiers or additional forwarding instructions.

Figure 5C:
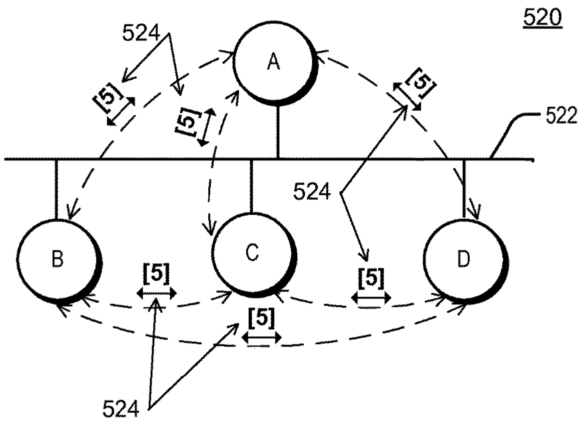
FIGS. 5C through 5F are simplified diagrams illustrating examples of network portions.

Another example of assigning one bit position to multiple links is shown in FIG. 5C. Network portion 520 includes a local area network (LAN) 522 with connected nodes A, B, C and D, so that each of the connected nodes has a two-way connection with any other connected node. These links between the nodes are illustrated using dashed lines in FIG. 5C. If it is acceptable for BIER-TE traffic to one of the connected nodes to be sent to all of the other connected nodes, the same bit position can be assigned to each of the connections. In network 520, bit position 5 is assigned to each of the links between the connected nodes, as shown by assignments 524. In the embodiment of FIG. 5C the BTFT at each of the nodes connected to LAN 522 includes a mapping of bit position 5 to all three links between that node and the other connected nodes. Because the bit position assignments of FIG. 5C are to two-way links, a bit reset procedure is needed at each node to prevent messages from bouncing back and forth between nodes. Use of a single bit position for the six links between the nodes connected to LAN 522 provides a savings of five bit positions.

Figure 5D:
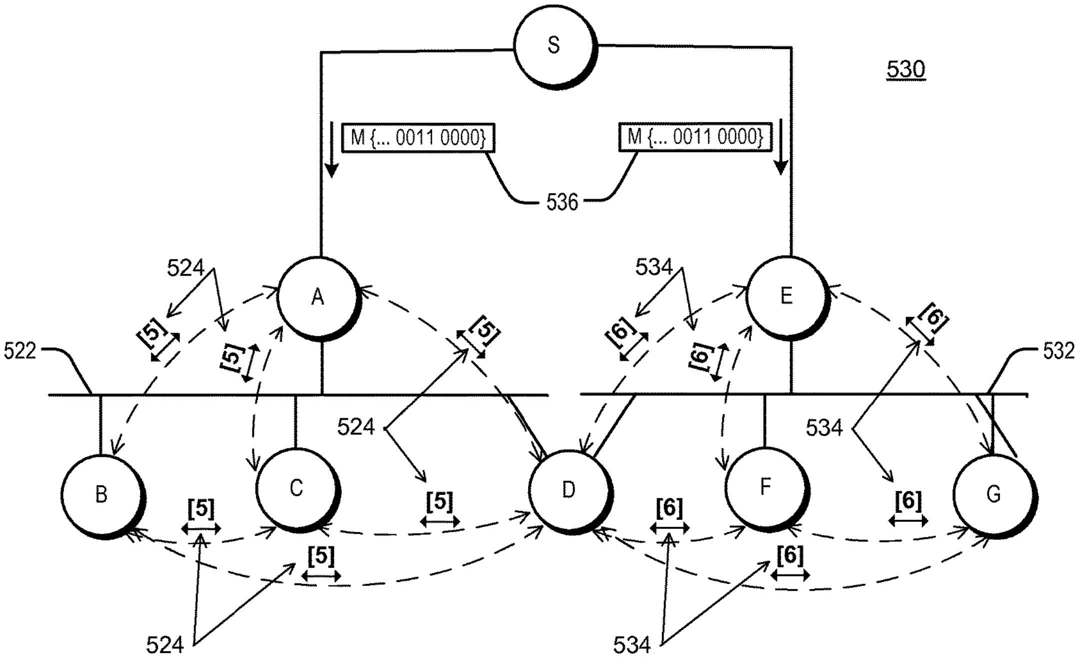

A difficulty can arise when using a single bit position for multiple links in a network structure if the structure has a node in common with another network structure that also has a single bit position assigned to multiple links. An example is shown in FIG. 5D using LAN structures like that of FIG. 5C, but a similar situation can arise using other network structures, such as a hub-and-spoke structure. Network portion 530 of FIG. 5D includes LAN 522 as shown in FIG. 5C, except that node D is also connected to another LAN, LAN 532. In the same manner that bit position 5 is assigned to all of the links between connected nodes of LAN 522, bit position 6 is assigned to all connected nodes of LAN 532, as shown by assignments 534. The BTFT for node D would accordingly include an entry mapping bit position 5 to links to nodes A, B and C and another entry mapping bit position 6 to links to nodes E, F and G. Network portion 530 also includes a node S connected to nodes A and E of LANs 522 and 532, respectively. In the embodiment of FIG. 5D, node S forwards copies of message 536 to each of nodes A and E. The message bit array for message 536 includes set bits in bit positions 5 and 6, with the intent that the copy of message 536 forwarded to node A will reach the nodes on LAN 522 through bit position 5, and the copy forwarded to node E will reach the nodes on LAN 532 through bit position 6.

Figure 5E:
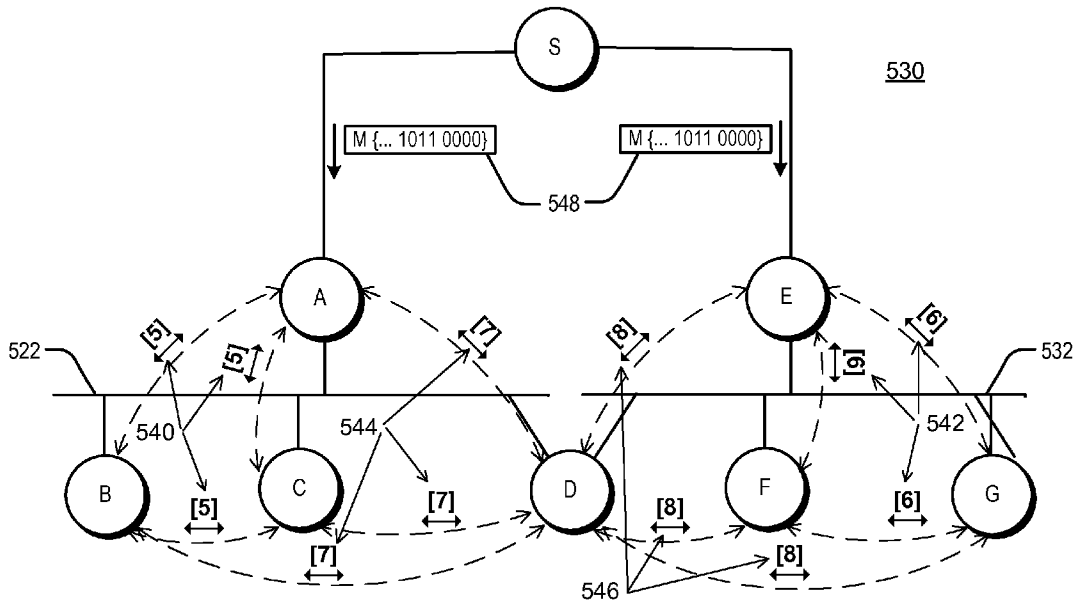

If LANs 522 and 532 were not connected via node D, the setting of bit 6 in the message bit area of a message reaching node A and LAN 522 would have no effect, nor would the setting of bit 5 in the MBA of a message reaching node E and LAN 532 have any effect. With node D bridging the two LANs, however, not only does node D get two copies of the message (one through each of nodes A and E), but node D will forward messages received through LAN 532 over to the nodes of LAN 522, and vice versa. Presence of node D bridging the two LANs therefore can result in significant duplication of messages. An alternative bit assignment that avoids this duplication is shown in FIG. 5E. FIG. 5E shows network portion 530 having the same topology as in FIG. 5D, but with changes to the bit position assignments and the message bit array of incoming messages. Assignments 540 map bit position 5 to the links between nodes A, B and C, but not node D. Similarly, assignments 542 map bit position 6 to the links between nodes E, F and G, but not D. Links between node D and nodes connected to LAN 522 are mapped to bit position 7 as shown by assignments 544, and links between node D and nodes connected to LAN 532 are mapped to bit position 8. In the embodiment of FIG. 5E, copies of message 548 are forwarded by node S to nodes A and E. The message bit array of message 548 includes set bits at bit positions 5, 6 and 8, with the intent of reaching node D using bit position 8 (via node E), the remaining nodes on LAN 522 using bit position 5 (via node A), and the remaining nodes on LAN 532 using bit position 6 (via node E). Because node D has no links assigned to bit positions 5 or 6, it does not act as a "back door" entrance to either LAN. In an alternative embodiment, the message bit array has a set bit in BP 7 rather than BP 8, to reach node D through node A instead of node E. As long as a bit is set in only one of bit positions 7 or 8, node D will not get a duplicate message. The bit position assignment in FIG. 5E uses four bit positions for twelve links, saving eight bit positions.

Figure 5F:
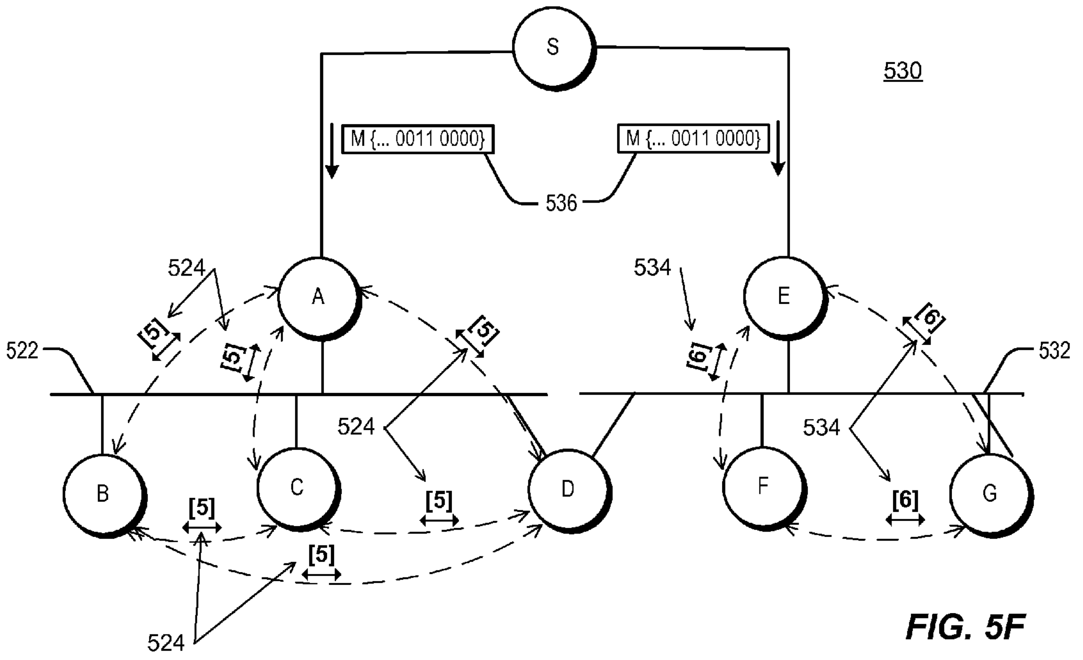

An additional approach to avoiding the duplication resulting from the bit position assignment of FIG. 5D is shown in FIG. 5F. In this embodiment, bit position 5 is assigned to all links between nodes connected to LAN 522, as also shown in FIG. 5D. No bit position is assigned to links involving node D on LAN 532, however. Message 536 will therefore reach node D via node A, but not via node E. In effect, this bit position assignment removes the connection between node D and LAN 532 for purposes of BIER-TE forwarding. Node D may be accessible through LAN 532 by messages forwarded using other methods, however.

In the above examples of sharing of one bit position by multiple links, the links sharing a bit position have been alternative links that are not connected in series along a path. In some embodiments, however, a bit position can be shared by links connected in series along the same path. For example, if there is a portion of a network in which all routers should receive a message (or at least can receive the message) if any of them receive it, a single bit position can be assigned to each link in the network portion (or effectively to the entire network portion). This assignment of a bit position to a network portion may be referred to as a "topology adjacency." If the network portion includes links connected in series, it is important that the bit position assigned to the network portion is not reset when forwarding (else the message will be dropped after a single hop). As noted in connection with some of the examples above, however, failure to reset a bit position when forwarding can lead to looping and/or duplication of messages in some embodiments. In an embodiment, use of a single bit position for multiple links along multi-hop paths is limited to loop-free networks employing one-way links.

An example of a loop-free network with one-way links is shown in FIG. 6A. Network portion 600 of FIG. 6A is assigned bit position 4, because incoming messages such as message 604 are intended to reach each of nodes D and E (through node B) and F and G (through node C). Bit position 4 is assigned to one-way links, as shown by assignments 602. Bit positions are assigned only to those links that create loop-free paths, however. The link between nodes B and C would create a loop, so no bit position is assigned to that link. The link therefore does not appear in the BIER-TE forwarding table for either of nodes B and C, and no message will be sent across it. The link between nodes B and C is effectively removed for purposes of BIER-TE forwarding. In an embodiment, the BTFT for each of nodes A through G includes an instruction that bit position 4 is not to be reset. An example of a BTFT portion for node B is shown in FIG. 6B. In the embodiment of FIG. 6B, BTFT portion 610 is sorted by bit position, and includes only outgoing links. Entry 612 includes the two outgoing links from node B corresponding to bit position 4: links BD and BE. For each of these links, entry 612 also includes a "no" instruction in a reset column of BTFT portion 610, so that bit position 4 is not reset in a message that traverses link BD or BE. As replicas of message 604 are forwarded through network 600 of FIG. 6A, the bit in bit position 4 of the message bit array therefore remains set.

Another example of a network portion using a single bit position for multiple links in series is the ring arrangement of FIG. 6C. Network portion 620 of FIG. 6C includes nodes A, B, C and D connected in a ring. Links in a clockwise direction from A to D, D to C, and C to B are assigned bit position 2, as shown by assignments 622. Links in a counterclockwise direction from A to B, B to C, and C to D are assigned bit position 3, as shown by assignments 624. All of the bit position assignments include an instruction not to reset the MBA bit in the assigned bit position. Because no clockwise bit position is assigned between nodes B and A, a message having a set bit in its MBA at bit position 2 will travel from node A to D to C to B and then stop without continuing to loop around the ring. Similarly, the lack of bit position assignment to the counterclockwise link between nodes D and A "breaks the loop" in the counterclockwise direction. Message 626 having a bit at bit position 3 in its MBA set accordingly travels from node A to B to C to D, where it stops. An example of a BTFT portion for node B of network 620 is shown in FIG. 6D. In the embodiment of FIG. 6D, BTFT portion 630 includes both incoming and outgoing links. In this embodiment, table portion 630 is sorted by bit position, with entry 632 corresponding to bit position 2 and entry 634 to bit position 3. Only incoming link CB to node B is included in entry 632 for bit position 2, reflecting the lack of a bit position assignment for an outgoing link from B in the clockwise direction.

Figure 7:
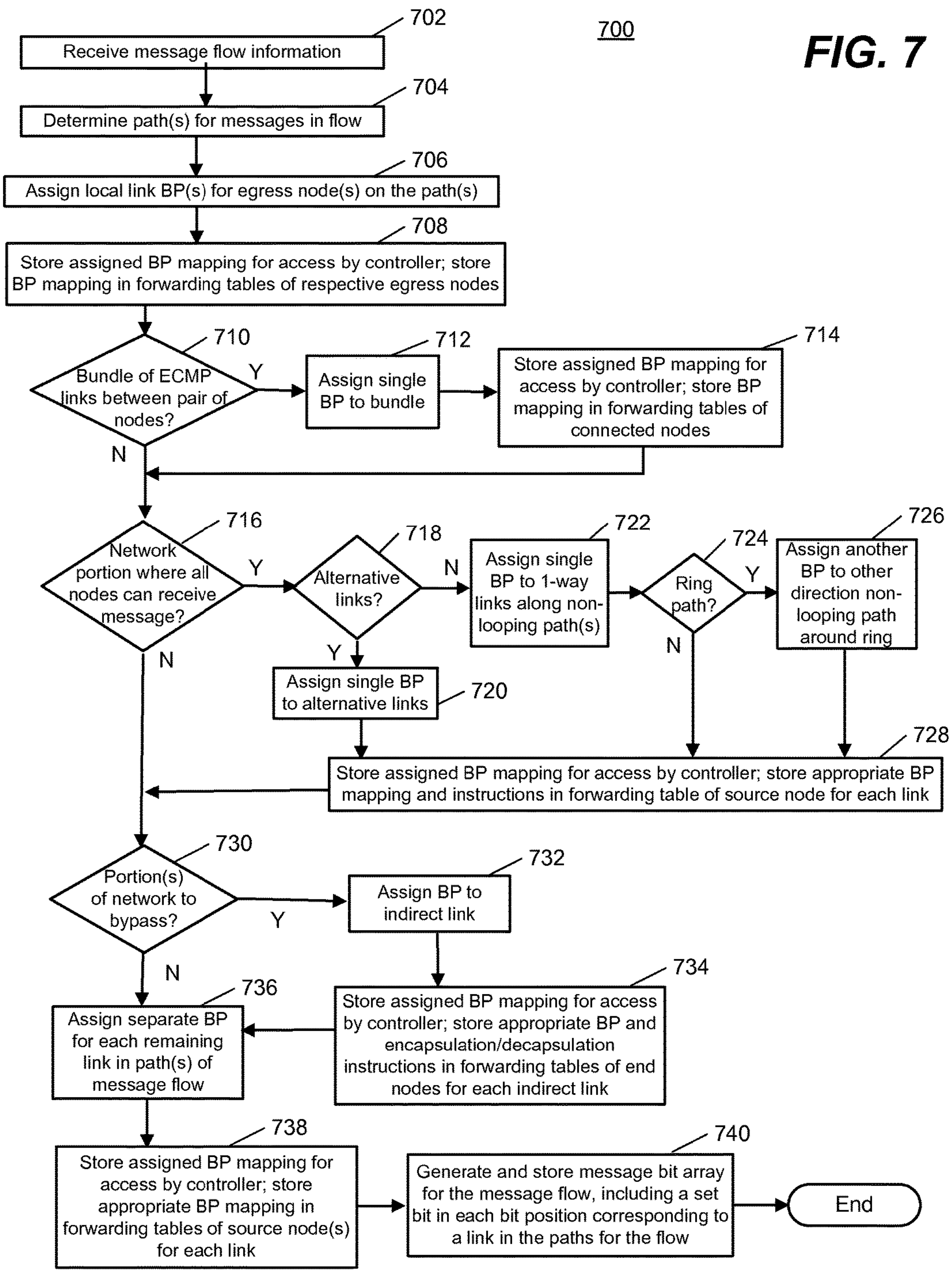
FIG. 7 is a flowchart illustrating an example of a process carried out by a controller or node of a network described herein.

An example of a method for assigning bit positions to links in a network is illustrated by the flowchart of FIG. 7. In an embodiment, method 700 of FIG. 7 is carried out by a network controller. The method begins with receiving message flow information (step 702). A "flow" as used herein is a stream of one or more messages traveling between a particular source and a particular destination having a set of common properties. In an embodiment, the message flow information includes multicast group and/or source information. Alternatively, the message flow information relates to a unicast message flow, and includes, for example, ingress and egress node information for the flow. The message flow information is received from ingress or egress nodes of the network, in one embodiment. In an alternative embodiment, the message flow information is received through a manual configuration process.

Method 700 continues with determining paths for messages in the flow (step 704). As discussed in connection with the forwarding examples above, network topology information is used along with message flow information to determine paths. Message flow information considered may include information regarding additional message flows in the network in addition to the particular message flow that a path is being determined for. In an embodiment, additional rules or requirements related to a particular network or application are also used in determining paths. For example, various traffic engineering considerations understood by one of ordinary skill in view of this disclosure are used in determining paths in certain embodiments. Determining a path in some embodiments involves receiving entry of a path through a manual configuration process. In an embodiment, the path determination of step 704 provides an initial path definition that may be altered and/or refined as method 700 proceeds and bit positions are assigned.

In step 706, local decapsulation bit positions are assigned to one or more egress nodes on the path or tree for the message flow. These are bit position assignments similar to assignments 138 of FIG. 1. In one embodiment, separate bit positions are assigned to each egress node, in the manner of assignments 138 of FIG. 1. In another embodiment, a single bit position is assigned to the local decapsulation link at multiple egress nodes, as described in the above discussion of sharing of bit positions. A mapping of the assigned bit position(s) to their corresponding links is stored at the controller, or at a location accessible to the controller (step 708). In an embodiment, the bit position mapping is stored in a routing table configured to store information for populating forwarding tables at respective nodes along the path or tree. In addition to being stored for access by the controller, bit position mapping is also stored in the forwarding tables of nodes connected to the link in question. In the case of the local decapsulation bit position assignment of step 706, mapping of the bit position to the local decapsulation link is stored in the forwarding table for the egress node(s) performing the decapsulation. In an embodiment, instructions to decapsulate a message having an MBA bit set at the bit position corresponding to the local decapsulation link are also stored in the forwarding table at the egress node. In an alternative embodiment, the forwarding table at the egress node maps a bit position to a link that is identified in some manner as a local decapsulation link, and the specific instructions for how to handle such a link are encoded elsewhere, such as in a forwarding engine of the egress node. Steps 706 and 708 of method 700 describe a sub-method of assigning a bit position to a local decapsulation link at an egress node. This sub-method is optional, and some embodiments of a bit position assignment method do not include this sub-method. In some embodiments, for example, egress nodes are configured to decapsulate all arriving messages, so that no bit position for a local decapsulation link is assigned.

In step 710 of method 700 it is determined whether a pair of nodes along the path of the message flow is connected by a bundle of ECMP links. In an embodiment, this determination is made using topography information for the network. An example of this type of bundle is shown in FIG. 4A. In the embodiment of method 700, if there is a bundle of ECMP links between a pair of nodes, a single bit position is assigned to the bundle (step 712). The mapping of the bit position to the bundle is stored for access by the controller (step 714), in the manner described in connection with step 708 above. The bit position mapping is also stored in forwarding tables of one or both of the nodes connected to the bundle (step 714). In an embodiment for which the forwarding table is sorted by bit position, a forwarding table entry for the bit position assigned to the bundle identifies all of the ECMP links in the bundle as assigned to the bit position. If the ECMP links are one-way links, a mapping of the assigned bit position to the ECMP links is included in the BIER-TE forwarding table at the sending node for the links. If the ECMP links are two-way links, the mapping of the bit position to the links is included in the BTFT at each of the bundle. In some embodiments, a mapping of the bit position to incoming links as well as outgoing links is included in the appropriate forwarding table(s). Steps 710, 712 and 714 of method 700 describe a sub-method of checking for and assigning a bit position to a bundle of ECMP links between a pair of nodes. This sub-method is optional and some embodiments of a bit position assignment method do not include this sub-method. In an alternate embodiment, for example, separate bit positions are assigned to the respective ECMP links. In a further embodiment, alternative message bit arrays encoding a path or tree are established, one using each of the alternative ECMP links. In such an embodiment, an ECMP algorithm can be applied at the ingress node to choose which of the alternative message bit arrays to use for the BIER-TE encapsulation of an incoming message.

Method 700 continues at step 716, where it is determined whether there are network portions traversed by the path or tree for which all nodes can receive a copy of the message being forwarded. In an embodiment, the network portion identified is one in which all nodes need to receive the message. In other embodiments, the network portion is one in which enough of the nodes need to receive the message that some duplication to other nodes is tolerable, in view of the opportunity to save bit positions by assigning one bit position to multiple links. If a network portion is identified, it is determined in step 718 whether the identified network portion includes links on alternative paths (i.e., links not connected in series along a path). Examples of this type of network portion include the dual-plane network shown in FIG. 4B, the hub-and-spoke configuration of FIG. 5A, and the LAN configurations of FIGS. 5C through 5F. If the network portion does include links on alternative paths, a single bit position is assigned to one or more of the alternative links (step 720), in ways similar to those described in the discussions herein of the above-listed examples. The mapping of the assigned bit position to the corresponding links is stored for access by the controller (step 728), in a similar manner to that described in connection with steps 708 and 714 above. The bit position mapping and any appropriate instructions are also stored in a BIER-TE forwarding table of the source node for each link (step 728). In embodiments for which the alternative links are two-way links, the node at each end of a link is a source node for one direction of the link and therefore includes a link for the assigned bit position in its forwarding table. The loop in the flowchart of FIG. 7 formed by steps 716, 718, 720 and 728 of method 700 represents a sub-method of checking for and assigning a bit position to links on alternative paths. This sub-method is optional and some embodiments of a bit position assignment method do not include this sub-method. In an embodiment for which the method of steps 716, 718, 720 and 728 is not performed, separate bit positions are assigned to respective links within the network portion.

Returning to step 718 of method 700, if the network portion for which all nodes can receive a copy of the message does have links connected in series ("N" branch of decision 718), a bit position is assigned to one-way links only along non-looping paths (step 722). One example of this type of bit position assignment is shown in FIG. 6A and described in the related discussion above. If the network portion is in a ring configuration (decision step 724) or any other configuration for which it is desirable to send messages across links in both directions, a separate bit position is assigned to one way links in the opposite direction (step 726). As discussed in connection with FIGS. 6A and 6C above, the message path in either direction needs to be non-looping because bit positions are not reset when a message is forwarded across series links having the same bit position assignment. In an embodiment, loops are avoided by not assigning a bit position to any link that would create a loop. Mappings of links to assigned bit positions are stored for access by the controller (step 728), in a similar manner to that described in connection with steps 708, 714 and 728 above. The bit position mapping and any appropriate instructions are also stored in a BIER-TE forwarding table of the source node for each one-way link (step 728). In an embodiment, instructions not to reset the assigned bit position are also included in the BTFT of the source node for each one-way link. The loop in the flowchart of FIG. 7 formed by steps 716, 718, 722, 724, 726 and 728 of method 700 represents a sub-method of checking for and assigning a bit position to links connected in series on a path. This sub-method is optional and some embodiments of a bit position assignment method do not include this sub-method. In an embodiment for which this sub-method is not performed, separate bit positions are assigned to respective links within the network portion.

Method 700 continues with decision step 730, where it is determined whether there are one or more portions of the network that may be bypassed by a message traversing a path or tree. A "bypassed" network portion in this context is a portion that is traversed using conventional unicast routing so that the explicit path taken through that portion is not determined using BIER-TE. In general, network portions that can be bypassed from the standpoint of BIER-TE are areas in which replication of messages is not occurring, and which do not otherwise require that specific links or nodes be traversed. Stated another way, a network portion can be bypassed if the specific path by which the network portion is traversed by a message flow is unimportant. If such a network portion exists, it is bypassed in the embodiment of method 700 by assigning a bit position to an indirect link across the network portion (step 732). An example of such an indirect link is link AE in network 100 of FIGS. 1 through 3B, although an indirect link may of course include a much longer routed path than that of link AE. Mapping of the assigned bit positions to the indirect link (typically to the end node of the unicast-routed path) is stored for access by the controller (step 734), in a similar manner to that described in connection with steps 708, 714 and 728 above. The bit position mapping and appropriate instructions are also stored in the BIER-TE forwarding tables of nodes at each end of the indirect link. In an embodiment, for example, instructions and/or information for encapsulation of a message for unicast routing is stored in the BTFT at the starting node of the indirect link. In alternate embodiments, some or all of the encapsulation instructions are encoded in the forwarding engine of the starting node. Similarly, instructions and/or information for removal of the unicast routing encapsulation is included in the BTFT at the ending node of the indirect link in some embodiments. In embodiments for which the unicast encapsulation is removed prior to the last hop of unicast routing (such as the MPLS with PHP described in connection with FIG. 3B above), decapsulation instructions may not be needed at the ending node. Steps 730, 732 and 734 of method 700 describe a sub-method of checking for a network portion not requiring explicit routing and assigning a bit position to a bypass link traversing that network portion. This sub-method is optional and some embodiments of a bit position assignment method do not include this sub-method. In an embodiment for which this sub-method is not performed, bit positions are assigned to directly-connected links throughout the length of the message path.

If there are links in the path or tree for the message flow that have not yet been assigned bit positions after the assignments described above, those links are each assigned an additional bit position (step 736). These bit position assignments are for directly-connected links and are similar to bit position assignments 134 and 136 in FIG. 1. These remaining bit position assignments may be to two-way links, one-way links, or a combination of both. Mappings of the links to their assigned bit positions are stored for access by the controller (step 738), in a similar manner to that described in connection with steps 708, 714, 728 and 734 above. The bit position mapping is also stored in forwarding tables of one or both of the nodes connected to each link. If the links are one-way links, a mapping of the assigned bit position to each link is included in the BIER-TE forwarding table at the source node for the link. In embodiments for which bit positions are assigned to two-way links, the node at each end of a link is a source node for one direction of the link and therefore includes a link for the assigned bit position in its forwarding table. In some embodiments, a mapping of a bit position to incoming links as well as outgoing links is included in the appropriate forwarding table(s).

When bit positions have been assigned to links that combine to form the entire path or tree for the message flow, a message bit array for the message flow is generated and stored (step 740). According to the bit convention used herein, the message bit array includes a set bit in each bit position corresponding to a link in the path or tree. In an embodiment, a mapping between the message bit array and an address or identifier for the message flow is stored in a group path table, or flow path table, at the BIER-TE ingress node for the message flow. A bit position assignment and message bit array generation process like that of method 700 is performed for each message flow to be forwarded by a BIER-TE network or domain.

Method 700 of FIG. 7 illustrates various considerations and processes for BIER-TE bit position assignment. Method 700 illustrates one embodiment, and many other variations are possible and contemplated. As noted above, for example, many of the sub-methods within method 700 are optional and are not performed in some embodiments. Alternative embodiments of a bit position assignment method may include none of these sub-methods, one of them, or combinations of any two of the sub-methods, any three of the sub-methods or any four of the sub-methods. In addition, the sequence in which the sub-methods of method 700 are performed can be different in other embodiments. Moreover, although in method 700 bit position assignments are stored in the appropriate forwarding tables at BIER-TE nodes following assignment of each type of bit position, in other embodiments communication of bit position assignments to BIER-TE nodes is done once at the end of the assignment process, or at different intervals within the process.

Although shown as separate steps within method 700, it is noted that determination of a path or tree for a message flow and assignment of bit positions to links within the path may be interrelated processes in some embodiments. For example, an inquiry such as that of decision step 730—whether a network portion can be bypassed—may form part of the process of determining the path itself. Some or all of a bit position assignment method such as method 700 may be iterated in some embodiments as part of an optimization process for arriving at a path or tree definition and a corresponding set of bit position assignments.

Some or all of a bit position assignment method such as method 700 of FIG. 7 may be used in generating revised bit position assignments in addition to being used for making initial bit position assignments. Bit position assignments within a BIER-TE network may need to be changed for reasons including network changes or changes in message flow paths. In general, a change in the topography of a BIER-TE network without a change to the bit position assignments or message bit arrays may cause some messages to be dropped. This situation should not cause looping or duplication of messages, however, because any new links causing loops in the topology are not yet assigned bit positions and therefore BIER-TE messages are not forwarded over the new links. Changes to bit position assignments and encoding of paths in message bit arrays should be undertaken carefully to ensure that the changes do not create looping or unacceptable duplication.

An embodiment of a method for updating bit positions and message bit arrays is illustrated by the flowchart of FIG. 8. In an embodiment, method 800 of FIG. 8 is carried out by a network controller. Method 800 begins with assigning of new bit positions (step 802). An example of a new bit position assignment is illustrated by FIGS. 9A and 9B. FIG. 9A shows network portion 900 having a hub-and-spoke arrangement similar to that of FIG. 5A above, except that a new node G has been added to the arrangement. At the time of the network change adding node G, bit position 5 is assigned to the links between node A and nodes B through F, respectively. Continued operation of the BIER-TE network as configured in FIG. 9A will not involve the link between node A and node G, because no bit position has been assigned to it. An example of assigning a new bit position to incorporate node G is illustrated by FIG. 9B. FIG. 9B shows new bit position assignments 904 assigning bit position 8 to the links between node A and nodes C through G, respectively. In the embodiment of FIG. 9B, new bit position 8 is not assigned to the link between nodes A and B. A decision to remove node B from the group of nodes connected to node A by the same bit position could be occasioned by, for example, a change in whether receivers are reachable from node B (it is assumed that the nodes in network portion 900 have additional connections, not shown, to a wider network). The pre-existing assignments of bit position 5 to some of the links are maintained, so that some links have two assigned bit positions.

Returning to method 800, the new bit position assignments are added to the BIER-TE forwarding tables of the affected nodes, while the previous bit position assignments are retained in the tables as well (step 804). An example of a BIER-TE forwarding table reflecting a new bit position assignment is shown in FIG. 9C. FIG. 9C shows BTFT portion 910 for node A of network portion 900. In the embodiment of FIG. 9C, the BTFT is sorted by bit position and includes only outgoing links. Entry 912 includes the mapping of bit position 5 to the original five links from node A to nodes B through F, respectively. Entry 914 includes the mapping of newly-assigned bit position 5 to the links from node A to nodes C through G, respectively. During a period in which BTFT portion 910 includes both entries 912 and 914, which links are traversed by a message sent through node A depends on whether the message bit array carried by the message has a set bit in bit position 5 or in bit position 8.

In the embodiment of method 800, any messages being sent when step 804 is carried out carry message bit arrays reflecting the pre-existing bit assignments. Because the previous bit assignments remain in the forwarding tables after step 804, the messages can still be forwarded over any still-functioning original links. Subsequently, the message bit arrays for any message flows affected by the new bit position assignment are changed to reflect the new assignment. Messages then begin to be forwarded using the new message bit arrays (step 806). The superseded bit position assignments, such as assignments 902 of bit position 5 in FIG. 9A, are eventually removed from the forwarding tables of the affected nodes (step 808). At this point, the previous bit position has been "reclaimed" and is available for assignment to some other link(s) the next time a new bit position assignment is needed.

In an embodiment, method 800 includes careful checking to ensure that new bit position assignments do not result in looping or unacceptable amounts of duplication. The sequential process of method 800 and temporary assignment of two bit positions to certain links allows the transition between bit position assignments to proceed gradually and carefully. In an embodiment, message bit arrays of forwarded messages can be changed back to the original form to reflect the previous bit position assignments, if a problem is discovered with the new assignments quickly enough after message traffic reflecting the new assignments begins to flow.

Reset and Acceptance Procedures

Figures 10A, 10B:
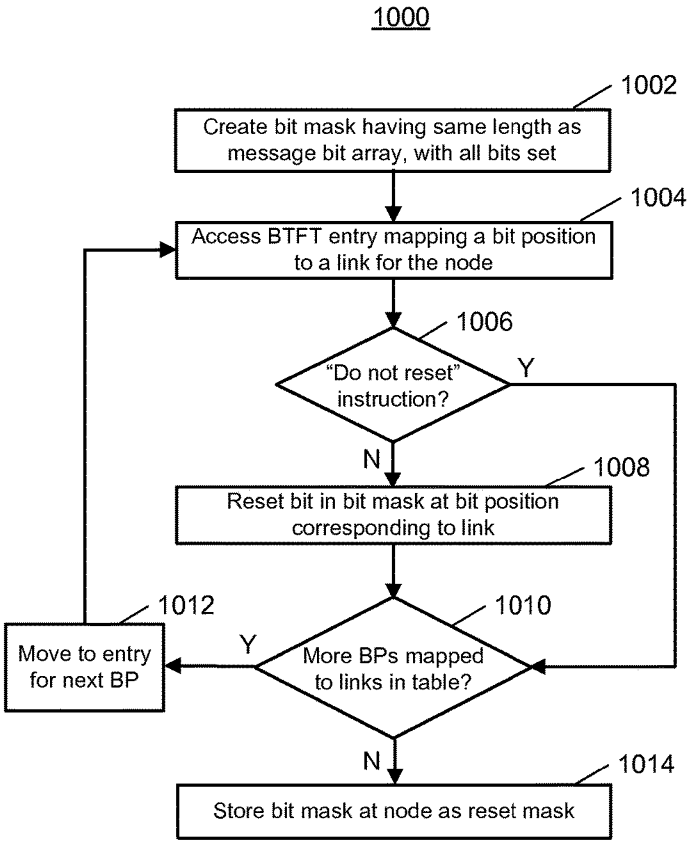
FIG. 10A is a flowchart illustrating an example of a process carried out by a controller or node of a network described herein.
FIG. 10B illustrates an example of a forwarding table portion.

As illustrated by the forwarding examples of FIGS. 3A and 3B, a bit reset procedure is employed in some embodiments. A reset process is particularly needed when forwarding a BIER-TE message via a two-way link assigned to a single bit position. In some situations, however, bits in bit positions corresponding to links within a path should not be reset, as discussed, for example, in connection with FIGS. 6A and 6C. As noted above in the discussion regarding FIG. 3A, one way to implement a reset procedure is using a reset mask. A reset mask can be designed to account for bit positions in which bits either should or should not be reset. An example of a method for creating a reset mask is illustrated by the flow chart of FIG. 10A. In an embodiment, a method such as method 1000 of FIG. 10A is performed by the forwarding engine at each forwarding node, once the BIER-TE forwarding table at the node has been populated using information received from the BIER-TE controller. In another embodiment, method 1000 is performed by the BIER-TE controller, and a reset mask is provided to each BIER-TE node along with other BIER-TE forwarding table information. Method 1000 of FIG. 10A may be particularly suitable for use with a BTFT containing bit position numbers but not necessarily full link bit arrays to represent bit positions.

Method 1000 of FIG. 10A begins by creating a bit mask, or bit array, of the same length as the message bit array used for BIER-TE packets in the network, where the bit mask initially has all bits set (step 1002). For the numbering convention used in this disclosure, the bit mask therefore has all bits set to "1" initially. The method proceeds by accessing an entry in the node's BTFT mapping a bit position to a link (step 1004). If the entry includes an instruction not to reset the bit in that bit position (decision step 1006), that entry is not used in making the reset mask. The method would in that case move on to an entry for another bit position mapped to a link represented in the BTFT ("Y" branches of decision steps 1006 and 1010; step 1012). If the entry does not include an instruction not to reset, that bit position is included in the reset mask by resetting the bit at the corresponding position in the bit mask ("N" branch of decision step 1006; step 1008). The process is then repeated for any remaining bit positions mapped to links in the BIER-TE forwarding table. When all bit positions have been processed, the bit mask includes reset bits in bit positions corresponding to links in the BTFT, and set bits otherwise. This bit mask is stored at the node as a reset mask (step 1014). The reset mask is applied during a reset procedure by performing a logical AND between the reset mask and the message bit array of a message. This causes MBA bits in bit positions corresponding to links in the BTFT to be reset (if not reset already).

Method 1000 as shown in FIG. 10A does not distinguish between incoming and outgoing links. Inclusion in the reset mask of bit positions corresponding to all links in the BTFT (except for those with "do not reset" instructions) results in a reset mask for a reset procedure performed just before forwarding a message, described herein as a "reset-on-send" procedure. A BTFT will always include bit position mappings for outgoing links from a node, and may also include incoming links. The bit positions for outgoing links need to be included in a reset mask for a reset-on-send procedure, and bit positions for incoming links can be included in this reset mask as well without affecting operation. The forwarding examples of FIGS. 3A and 3B above include a reset-on-send procedure. In an alternative embodiment, only outgoing links are represented in a reset mask created using a method such as method 1000. Such an embodiment produces a reset mask that is also suitable for a "reset-on-send" procedure.

In yet another embodiment, only incoming links are represented in a reset mask created using a method such as method 1000. A reset mask having bits reset only at bit positions corresponding to incoming links is suitable for a reset procedure performed after a message is received at a node and before the message bit array of the received message is compared to entries in the node's BTFT to determine where the message goes next. This type of reset procedure is referred to herein as a "reset-on-receive" procedure. An advantage of the reset-on-receive procedure is that a message arriving at a node still has an MBA bit set in the bit position corresponding to the link that the message arrives over. This allows the receiving node to perform an acceptance check of the message by verifying that the message bit array has a bit set in a bit position corresponding to a proper incoming link to the node. Reference to FIG. 3A shows that the reset-on-send procedure illustrated there does not allow for acceptance checking of incoming messages at a node. Considering the link from node A to node B, for example, this link is assigned bit position 1 as shown in BTFT portion 202. Message 308 sent from node A to node B does not have a set bit in position 1 of its MBA, however, because that bit is reset by the reset-on-send procedure before the message leaves node A. For a reset-on-receive procedure to be employed, a BTFT at a node has to include both incoming and outgoing links to the node.

Embodiments of a reset mask for use with an example forwarding table are shown in FIG. 10B. Forwarding table portion 1020 is identical to BTFT portion 210 for node E of FIG. 3A except that BTFT portion 1020 also includes reset mask embodiments. In the illustration of FIG. 10B, reset masks are included within BTFT portion 1020 and positioned below the link bit arrays of the forwarding table for ease of comparison. In alternative embodiments, one or more reset masks may be stored in a different area of the BIER-TE forwarding table than shown in FIG. 10B, or reset masks may be stored at a location outside of the BTFT. Reset masks are included in three entries of BTFT portion 1020. Entry 1022 has a reset mask for use in a reset-on-receive procedure. Comparison of the reset mask of entry 1022 to the link bit arrays in the BTFT shows that reset bits appear in the reset mask only in the bit positions assigned to incoming links BE, CE and AE. Entries 1024 and 1026 include reset masks for a reset-on-send procedure. Comparison of these reset masks to the link bit arrays in the BTFT shows that the reset mask in entry 1024 has reset bits in the bit positions of outgoing links EF, EC and E(local), while the reset mask in entry 1026 has reset bits in the bit positions of all links (incoming and outgoing) in the BTFT.

Because BTFT portion 1020 is the BIER-TE forwarding table for node E in network 100 of FIGS. 1 through 3B, and because the forwarding examples of FIGS. 3A and 3B employ a reset-on-send procedure, application of either of the reset masks of entries 1024 and 1026 of FIG. 10B to the incoming message at node E in the forwarding examples should result in the outgoing message from node E. In the example of FIG. 3A, incoming message 314 to node E has a message bit array {0001 1101 0000}. Applying the reset mask of entry 1024 of FIG. 10B to this message bit array by performing a bitwise AND operation results in a new message bit array of {0001 1000 0000}, because any set bits in bit positions 5, 6 and 7 of the message bit array are reset by the AND operation with the zeros in those positions in the reset mask. This resulting message bit array does in fact match the MBA of message 320 shown exiting node E in FIG. 3A. Applying the reset mask of entry 1026 of FIG. 10B to the MBA of incoming message 314 also results in a new message bit array of {0001 1000 0000}. The reset mask of entry 1026 includes zeros in the same bit positions as in the mask of entry 1024, and the extra zeros in the mask of 1026

(in BPs 4 and 10) have no effect because the bits in those positions of the MBA of incoming message 314 were already reset, as a result of the reset-on-send procedure at the previous node (node C). A similar test can be performed using incoming message 338 and outgoing message 340 of node E in FIG. 3B, to show that either of the reset masks of entries 1024 and 1026 can be applied to the MBA of message 338 to produce the MBA of message 340.

Figure 10C:
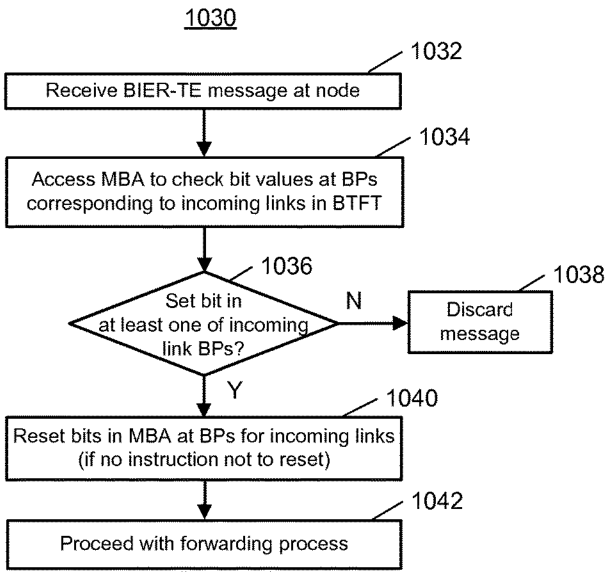
FIG. 10C is a flowchart illustrating an example of a process carried out by a node of a network described herein.

The flowchart of FIG. 10C illustrates an example of a method of acceptance checking of an incoming message at a node, combined with a reset-on-receive procedure. In an embodiment, method 1030 of FIG. 10C is performed by a forwarding engine at a BIER-TE node. Method 1030 begins with receiving a BIER-TE message at a node (step 1032) and accessing the message bit array of the received message to check bit values at bit positions corresponding to incoming links in the BTFT at the node (step 1034). In particular, the method tests whether there is a set bit in the MBA of the incoming message at a bit position corresponding to one of the incoming links represented in the BTFT (decision step 1036). If no bit of the MBA is set at a bit position corresponding to an incoming link for the node, the message is considered to be improperly received and discarded ("N" branch of decision 1036; step 1038).

As noted above, an acceptance check based on set bits in the message bit array at bit positions corresponding to incoming links will not work if a reset-on-send procedure has been performed at the previous node traversed by the incoming message. In the embodiment of FIG. 10C, method 1030 continues, for messages that pass the acceptance procedure, with performance of a reset-on-receive procedure ("Y" branch of decision 1036; step 1040). In an embodiment for which a reset procedure is important, such as a two-way link with a single assigned bit position, the reset needs to be performed before the incoming message bit array is compared to the BTFT entries as part of the forwarding process. In this way, a set bit corresponding to a link that should not be traversed again will be reset before the forwarding process determines which links the message should traverse next.

The reset-on-receive process of step 1040 resets bits in the MBA of the received message that are in bit positions corresponding to incoming links in the BTFT at the node. It is important that bits in bit positions corresponding to outgoing links are not reset at this point before the BIER-TE forwarding process has been carried out at the node. The reset-on-receive procedure may be implemented using a reset mask reflecting the bit positions of the incoming links only, similar to the reset mask in entry 1022 of FIG. 10E. A bitwise AND operation of the message bit array with such a reset mask will reset the proper bits. Use of a reset mask created by a method such as those of FIGS. 10A and 10D herein has the advantage that bit positions with "do not reset" instructions are already accounted for in creating the reset mask. In an alternative embodiment, the bits in bit positions corresponding to incoming links are reset through a different bit manipulation procedure, as understood by one of ordinary skill in the art in view of this disclosure. If bits are reset by a different procedure, however, the BTFT entries should be checked for "do not reset" instructions so that bits that shouldn't be reset aren't. After the reset-on-receive procedure, method 1030 continues with the BIER-TE forwarding process (step 1042), as discussed in connection with, for example, FIGS. 3A and 3B above, and described further below.

Figure 10D:
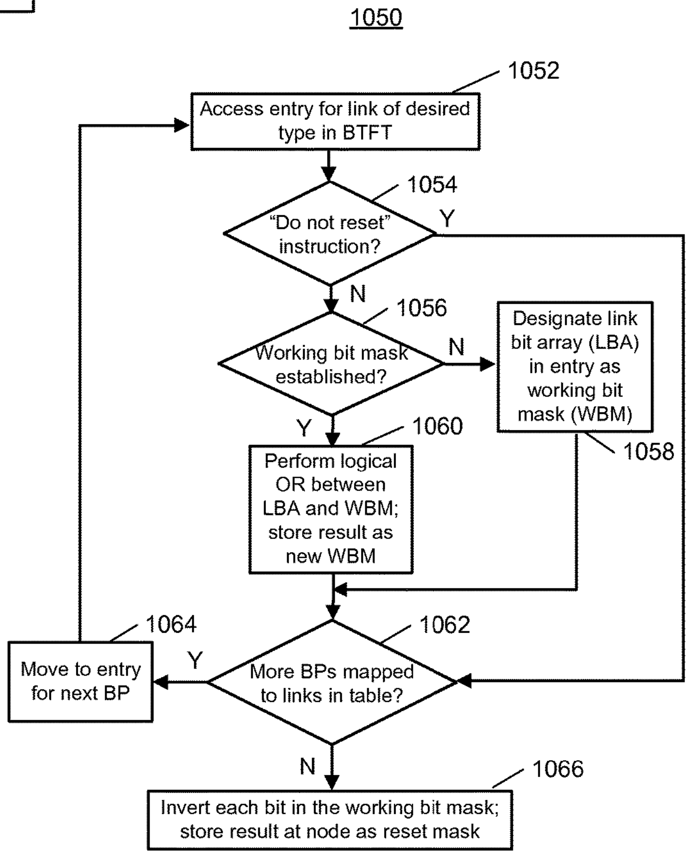
FIG. 10D is a flowchart illustrating an example of a process carried out by a controller or node of a network described herein.

An alternative method of creating a reset mask is illustrated by the flowchart of FIG. 10D. As in the case of method 1000 of FIG. 10A, the method of FIG. 10D may be carried out in some embodiments by a forwarding engine at a BIER-TE node, and in other embodiments by a BIER-TE controller. Method 1050 of FIG. 10D may be especially suitable for use with a BTFT including a complete link bit array for each bit position assigned to a link represented in the table. In the case of a BTFT including only bit position numbers, a link bit array can be generated for purposes of method 1050, however. In the embodiment of FIG. 10D, method 1050 begins with accessing the entry for a link of the desired type included in the BTFT at the node (step 1052). The type of link that an entry is accessed for depends on the type of reset procedure that a mask is being created for. If the reset mask is for a reset-on-receive procedure, the entries accessed in step 1052 are entries including only incoming links to the node. If the reset mask is for a reset-on-send procedure, on the other hand, the entries accessed in step 1052 include outgoing links from the node.

Method 1050 continues with determining whether the BTFT entry being accessed includes instructions not to reset a bit in the bit position associated with the entry (decision step 1054). If the entry includes an instruction not to reset a bit in that bit position, that entry is not used to make the reset mask. The method would in that case move on to an entry for another bit position mapped to a link represented in the BTFT ("Y" branches of decision steps 1054 and 1062; step 1064). If the entry does not include an instruction not to reset, the method continues with determining whether a working bit mask for purposes of the reset mask creation has been established ("N" branch of decision 1054; decision step 1056). If a working bit mask has not been established, the LBA of the current entry is designated as the working bit mask ("N" branch of decision 1056; step 1058). The method then continues to see whether there are more bit positions mapped to links of the desired type represented in the forwarding table (step 1062), and if so, moves to the entry for the next link (step 1064), at which point the method is restarted for the next entry.

If a working bit mask has been established, a bitwise logical OR is performed between the working bit mask and the link bit array of the current BTFT entry, and the result is stored as the new working bit mask ("Y" branch of decision 1056; step 1060). The method then continues to see whether there are more bit positions mapped to links of the desired type represented in the forwarding table (step 1062), and if so, moves to the entry for the next link (step 1064), at which point the method is restarted for the next entry. When all bit positions mapped to links of the desired type have been processed, each bit of the working bit mask is inverted, and the result is stored as the reset mask ("N" branch of decision 1062; step 1066). This method has the effect of "OR"ing together the link bit arrays for each bit position mapped to a link of the desired type (incoming, outgoing, or both) in the BTFT, and then inverting the result. This results in a bit mask having all bits set except for those in bit positions corresponding to the desired type of link, which are reset.

The methods in FIGS. 10A and 10D are merely examples of reset mask generation methods, and multiple alternatives and variations are possible. In the embodiment of FIG. 10D, for example, each link bit array for the links included in making the reset mask could first be bitwise inverted, and the resulting bit arrays could be combined by logical AND operations. Moreover, bit reset procedures can be performed without using reset masks at all.

An additional application of a bit reset procedure is as an alternative way to "break" a loop in a network portion in which a single bit position is assigned to multiple links connected in series. Considering, for example, the ring structure discussed above in connection with FIG. 6C, one way to avoid loop formation is by not assigning a bit position to the link that would close the loop (as shown in FIG. 6C). In an alternative embodiment, the bit position is assigned to each link, but the bit in that position is reset before a message is forwarded over the link that would close the loop. In the loop of FIG. 6C, for example, bit position 2 could be assigned to link BA (in the clockwise direction) and bit position 3 could be assigned to link DA (counterclockwise direction). The controller, however, would provide instructions to the appropriate nodes so that the bit in bit position 2 of a message traveling clockwise around the loop is reset before the message is forwarded from B to A, so that the message stops at B. Similarly, the bit in bit position 3 of a message traveling counterclockwise is reset before the message is forwarded from D to A. At the other nodes in the loop, the bits in those bit positions are not reset, so that the same bit position can be used for successive links along the path, as noted in the discussion of FIGS. 6A-6D above. If a reset-on-receive procedure is used, the bit in BP 2 would be reset at node B and the bit in BP 3 would be reset at node D. If a reset-on-send procedure is used, bits in both positions would be reset at node C before sending the message over the final link of the path. In an embodiment, a BIER-TE controller provides instructions to BIER-TE nodes as to whether reset procedures are to be used, and if so, what type of reset procedure to use (e.g., reset-on-send or reset-on-receive).

BIER-TE Forwarding Methods

Figure 11A:
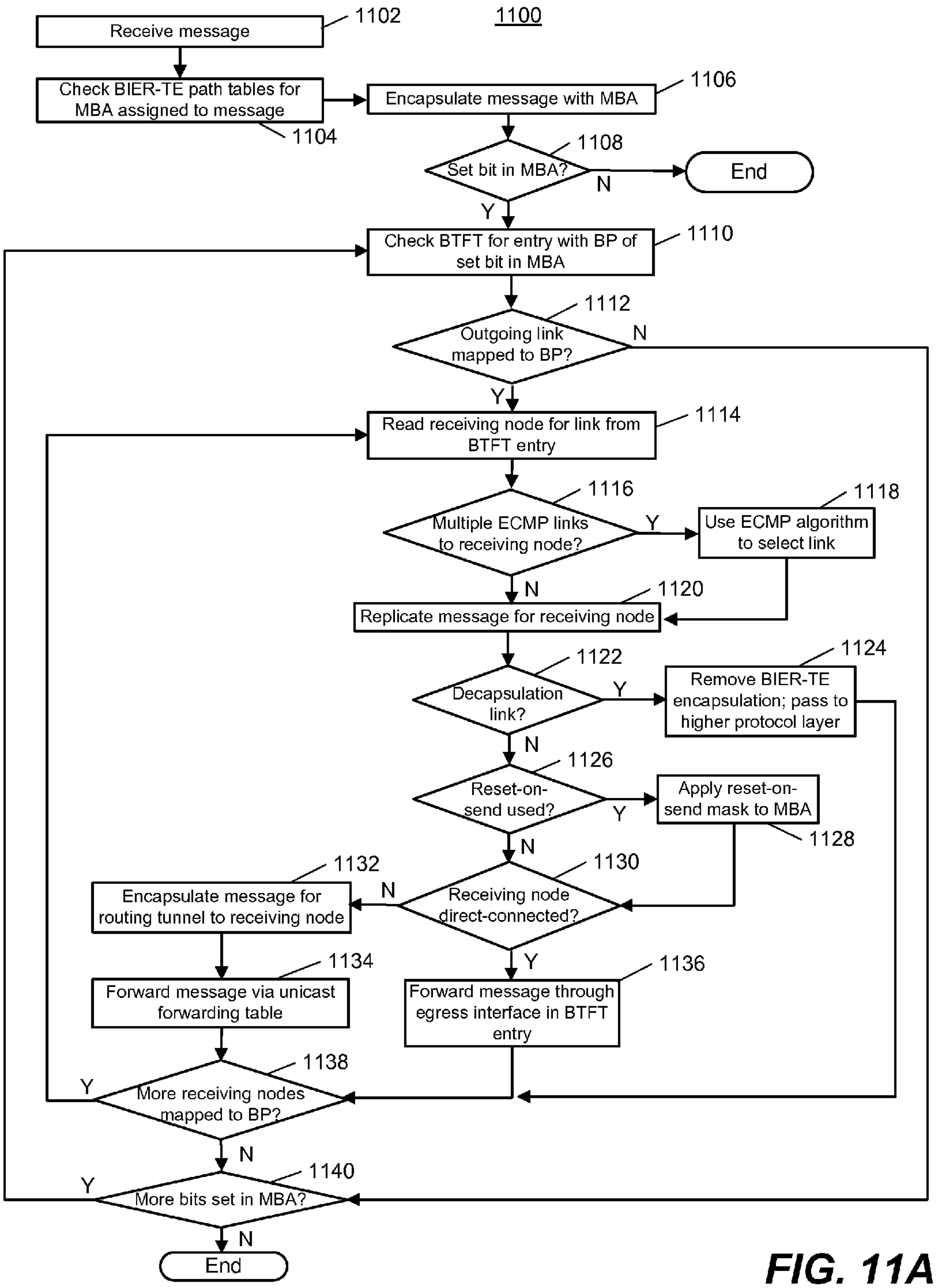
FIG. 11A is a flowchart illustrating an example of a process carried out by a node of a network described herein.
Figure 11B:
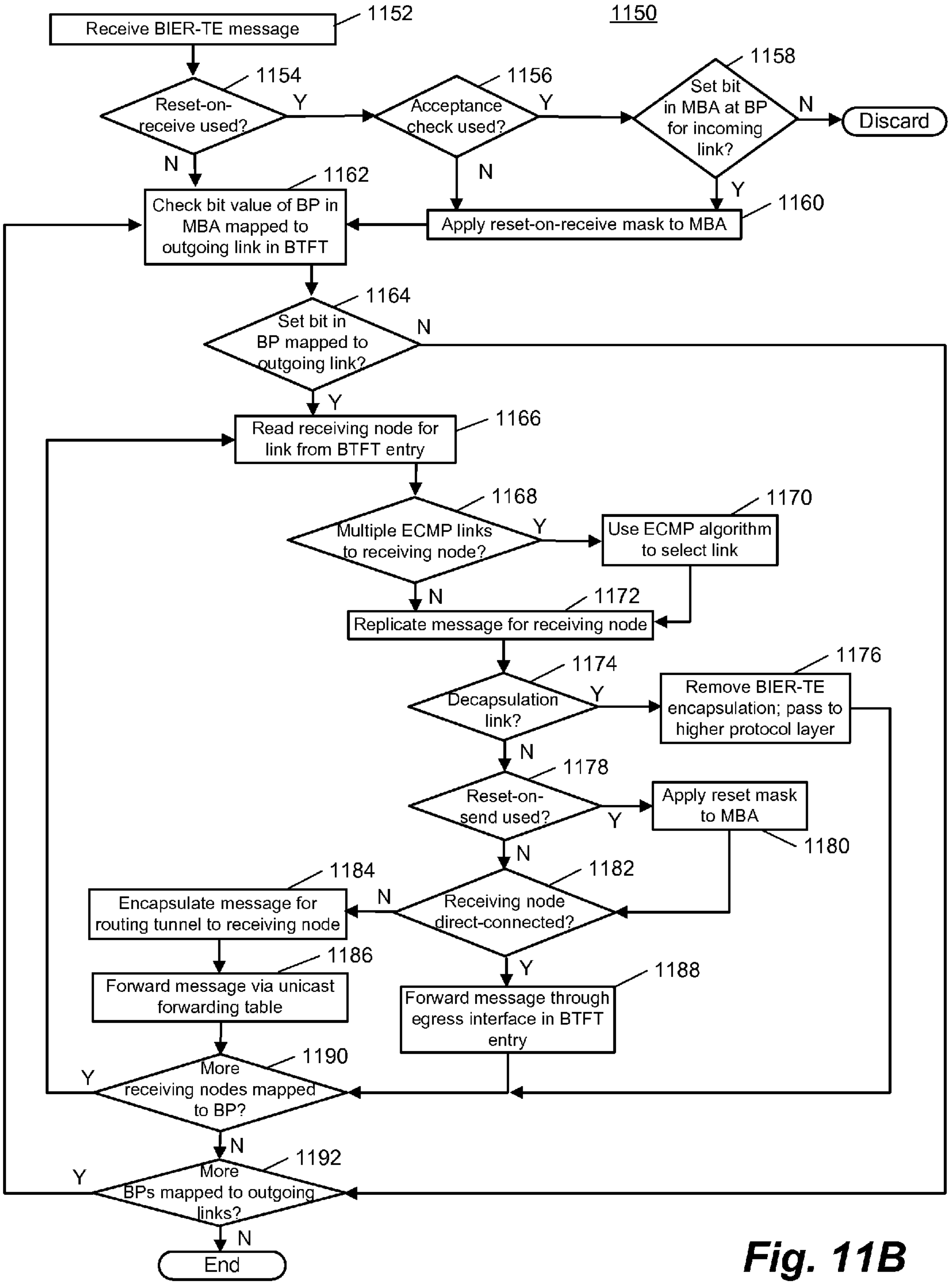
FIG. 11B is a flowchart illustrating an example of a process carried out by a node of a network described herein.

Flowcharts illustrating examples of BIER-TE forwarding processes described throughout this disclosure are shown in FIGS. 11A and 11B. The flowchart of FIG. 11A is for a method carried out at a BIER-TE ingress node. Method 1100 begins with receiving a message, such as a packet, frame or datagram (step 1102). The message is not yet a BIER-TE message when received by the ingress node. In the embodiment of method 1100, path tables mapping a message flow for the received message to a BIER-TE message bit array are checked (step 1104). In an embodiment, the received message is a multicast message including multicast group and/or source information in its encapsulation, and the path table is a group path table similar to table 214 of FIG. 2. In an alternative embodiment, the message is in a unicast message flow for which traffic engineering is desired, and BIER-TE message bit array information is mapped to the message flow in a flow path table stored at the ingress node. In a further embodiment, a unicast message flow is identified in a flow path table using IP source and destination address information. In another embodiment, ingress and egress node information for the message flow in the BIER-TE network is used to identify a unicast message flow. In yet another embodiment, a message flow, whether unicast or multicast, is identified in a flow path table using an identifier assigned using a network flow protocol such as NetFlow, developed by Cisco Systems, Inc., or Internet Protocol Flow Information Export (IPFIX), specified by the Internet Engineering Task Force (IETF), or an application based on such protocols.

For the purposes of method 1100, it is assumed that the incoming message is part of a message flow and/or multicast group that is represented in a path table at the ingress node. A message bit array (MBA) is therefore obtained and the message is encapsulated as a BIER-TE message carrying the MBA (step 1106). As discussed further above in connection with, for example, message 304 of FIG. 3A, BIER-TE encapsulation can be accomplished in various ways including establishment of a dedicated BIER-TE header or extension of existing encapsulations such as MPLS or IPv6. Once the received message is encapsulated for BIER-TE, the ingress node performs a forwarding process similar to that described above in connection with FIGS. 3A and 3B. In the embodiment of method 1100, the mechanism for comparing the message bit array in a BIER-TE message to the entries in a BIER-TE forwarding table (BTFT) is to consider each set bit in the MBA of the message, and check for a BTFT entry mapping the bit position of the set bit to a link used by that node. This comparison could also be sequenced in other ways, as discussed further below. Method 1100 of FIG. 11A ends if there are no set bits in the message bit array of the received message ("N" branch of decision step 1108).

When there is at least one set bit in the MBA of the received message (as should typically be the case), the BTFT at the forwarding node (in the case of method 1100, the BIER-TE ingress node) is checked for an entry mapping the bit position (BP) of the set bit in the MBA to an outgoing link ("Y" branch of decision 1108; step 1110; decision step 1112). In some BTFT embodiments there is an entry for every bit position, but not every entry includes a link mapped to that bit position. In other embodiments, a BTFT has entries only for those bit positions mapped to a link at that node. In either case, the BTFT is checked for an entry mapping the bit position of the currently-considered set bit in the MBA to an outgoing link. For purposes of method 1100, a "local" or "decapsulation" link is considered an outgoing link. If there is no outgoing link mapped in the BTFT to the bit position of the set bit, the method continues to the next set bit in the MBA, if there is one, to repeat the inquiry ("N" branch of decision 1112; "Y" branch of decision step 1140).

If there is an outgoing link in the BTFT mapped to the bit position of the set bit, method 1100 continues with reading of the receiving node for the link from the BTFT entry ("Y" branch of decision 1112; step 1114). This and other steps of method 1100 may be better understood with reference to FIG. 11C, which shows an example of a BTFT portion in a format that may be suitable for use with the embodiment of method 1100. Like BTFT portion 1020 of FIG. 10B, BTFT portion 1196 of FIG. 11C is a version of a BTFT for node E of network 100 shown in FIGS. 2, 3A, and 3B. In the embodiment of FIG. 11C, BTFT portion 1196 has entries sorted by bit position, and includes only those entries mapping a bit position to a link connected to the node. Instead of a column representing each link in a two-letter format, as included in BTFT portion 210 of FIG. 2, BTFT 1196 represents links using separate columns for a "send node" and a "receive node" at either end of each link, as appropriate. In the case of the entry mapping bit position 7 to a local/decapsulation link for node E, the "receive node" provided in the table for the link is the external (to the BIER domain), or upper-layer, protocol at node E that the decapsulated message is passed to. In an embodiment, an identifier of a specific protocol, such as IPv4, IPv6, or Ethernet, to name a few, is included as the "receive node" of a local decapsulation link. The external or upper-layer protocol may also be referred to as the "next protocol." In the embodiment of FIG. 11C, BTFT 1196 includes incoming links to node E, each of which has node E as the receive node. The receive, or receiving, node may also be referred to as a neighbor node or neighbor (especially in the case of a directly-connected single-hop link). Returning to method 1100 of FIG. 11A, reading of the receiving node of an outgoing link mapped to the bit position of a set bit, as called for by step 1114, is implemented in an embodiment by reading a receive node as shown in BTFT 1196 of FIG. 11C.

Method 1100 continues by determining whether there are multiple ECMP links to the receiving node read in step 1114 (decision step 1116). This is a determination of whether the path for a message includes an ECMP bundle such as that discussed above in connection with FIG. 4A. In embodiment, such a bundle would appear in a BTFT such as that of FIG. 11C as a single bit position mapped to multiple links having identical send and receive nodes, but each connected to a different interface of the BIER-TE node. In the embodiment of FIG. 11C, BTFT portion 1196 includes a column for the interface of node E that each BIER-TE link is connected to. For example, the link from node E to node F mapped to bit position 5 is connected to interface 3 of node E, where designations of interface 3 and other interfaces in the BIER-TE domain of network 100 are shown in FIG. 2. In the embodiment of BTFT portion 1196, interfaces for links to direct-connected BIER-TE nodes are included in the BTFT, while interfaces used by a different protocol are stored in, for example, the unicast forwarding table used by that protocol. In an alternate embodiment, some or all of the interfaces used by different protocols in, for example, forwarding a decapsulated BIER-TE message to a receiver or tunneling a BIER-TE packet over a routed indirect link are also stored in the BTFT of a node. Returning to method 1100, if there is an ECMP bundle an ECMP algorithm is used to select one of the links in the bundle ("Y" branch of decision 1116; step 1118).

Method 1100 continues with replication of the message for the receiving node of the link (step 1120). If the link is a decapsulation link, the BIER encapsulation is removed and the message is passed to the next protocol layer ("Y" branch of decision step 1122; step 1124). This takes care of forwarding for that link, and the method moves to seeing whether there are more links (receiving nodes) mapped to the same bit position (decision step 1138). If the link is not a decapsulation link, on the other hand, it is determined whether a reset-on-send procedure is to be used ("Y" branch of decision 1122; decision step 1126). In an embodiment, whether a reset procedure is to be used and what type of procedure is used is determined by a BIER-TE controller and communicated to the BIER-TE nodes. This information may be stored in the BTFT at each node or elsewhere at the node in such an embodiment. A reset-on-receive procedure is not considered in method 1100 because the method takes place at a BIER-TE ingress node such that received messages are not yet BIER-TE messages. In the embodiment of FIG. 11C, the BTFT includes information as to which bit positions need to be reset (such as BP 6 assigned to a two-way link) and which bit positions are not to be reset (such as those discussed above in connection with FIGS. 6A through 6D). In an embodiment, a default is established of performing a reset procedure, and a reset mask is used so that bit positions that are not to be reset can be excluded from the procedure. In a further embodiment, the controller establishes a default of performing a reset procedure with a particular timing, either a reset-on-send or a reset-on-receive procedure. Such a default reset procedure may be established separately for each node. In an embodiment, some nodes are set up to perform a reset procedure, while others are not. For example, an edge node may not need to perform a reset procedure in some embodiments. Returning to method 1100, if a reset-on-send procedure is used, an appropriate reset mask is applied to the MBA of the message replica ("Y" branch of decision 1126; step 1128).

Method 1100 continues by determining whether the receiving node is directly connected to the forwarding node (decision step 1130). In an embodiment, each BIER-TE node is aware of its directly-connected neighboring nodes, whether through operation of an IGP or through another protocol such as a Layer 2 handshaking or announcement protocol. In the embodiment of method 1100, if the receiving node of the link is directly connected, the message is forwarded through the node interface identified in the BTFT entry for the link ("Y" branch of decision 1130; step 1136). Forwarding is then completed for that link, and the method moves to seeing whether there are more links (receiving nodes) mapped to the same bit position (decision step 1138). If the receiving node is not direct-connected, the link is an indirect link such as link AE of network 100 shown in FIGS. 1 through 3B. The message is then encapsulated for unicast routing and forwarded via the appropriate unicast forwarding table ("N" branch of decision 1130; step 1132; step 1134).

After forwarding of the message replica, whether by decapsulation and passing to an upper layer protocol, forwarding to a direct-connected BIER-TE node, or encapsulating for routing to an indirectly-connected node, method 1100 continues by determining whether additional receiving nodes are mapped to the bit position (decision step 1138). An example of this situation is a network portion such as the hub-and-spoke configuration of FIG. 5A, in which links from one node to multiple neighboring nodes are mapped to the same bit position. If there are additional receiving nodes, the method returns to step 1114 and repeats for the next link ("Y" branch of decision 1138). If not, forwarding is complete for the current bit position and the method determines whether there are additional set bits in the message bit array (decision step 1140). If there is another set bit, the method returns to step 1110 and repeats for the next bit position ("Y" branch of decision 1140). When all of the set bits in the message bit array have been considered, the method ends.

An additional example of a process carried out at a BIER-TE node is illustrated by the flowchart of FIG. 11B. Method 1150 of FIG. 11B is carried out at a BIER-TE node other than an ingress node to the BIER-TE domain. As such, method 1150 begins with receiving a BIER-TE message that has already been encapsulated with a message bit array (step 1152). The method begins with determining whether a reset-on-receive process is used and whether an acceptance check is used (decision steps 1154 and 1156). In the embodiment of FIG. 11B, the determination of whether an acceptance check is to be performed is done after it is determined that a reset-on-receive procedure is used. In other embodiments, an acceptance check is performed by a node that does not employ a reset-on-receive process. A BIER-TE controller determines whether an acceptance check is to be performed by a node, in some embodiments. If an acceptance check is performed by the node, it proceeds in a manner similar to that described above in connection with FIG. 10C. If a bit is set in the message bit array of the message at a bit position mapped to an incoming link for the node, the message is accepted ("Y" branches of decision steps 1156 and 1158). Otherwise, the message is discarded, ending the method ("N" branch of decision 1158). The reset-on-receive procedure is then carried out by applying a reset-on-receive mask to the message bit array, as described further above in the discussion of reset procedures (step 1160). Both the acceptance procedure and the reset-on-receive procedure require a BIER-TE node to know any BIER-TE bit positions mapped to its incoming links. In an embodiment, this information is contained in the BTFT at the node through entries in the BTFT for incoming links.

Whether or not a reset-on-receive procedure is performed, the forwarding portion of method 1150 begins with checking a bit value in the message bit array of the received BIER-TE message, where the bit value is at a bit position mapped to an outgoing link in the BTFT of the node (step 1162). Method 1150 employs a different mechanism for comparing the MBA of the BIER-TE message to the BTFT entries than the mechanism of method 1100 of FIG. 11A. As noted above, the comparison mechanism of method 1100 is to consider each set bit in the MBA of the message, and check for a BTFT entry mapping the bit position of the set bit to a link used by that node. Method 1150, on the other hand, considers first the bit positions mapped to outgoing links in the BTFT for the node, and checks the bits at those bit positions in the MBA to see whether any of the bits are set. The ultimate result is the same by either mechanism: if a bit in the MBA is set at a position mapped to an outgoing link, the BIER-TE message is forwarded over that link.

If the result of the bit value check of step 1162 is that the bit is set, the method continues with reading the receiving node for a link corresponding to the bit position of the set bit from the appropriate BTFT entry ("Y" branch of decision step 1164; step 1166). If the result of the bit value check is that the bit is not set, the message will not be forwarded over a link mapped to the current bit position, and the method checks for any other bit positions mapped to outgoing links in the BTFT at the node ("N" branch of decision 1164; decision step 1192). It is noted that steps 1166 through 1190 of method 1150 of FIG. 11B are the same as steps 1114 through 1138 of method 1100 in FIG. 11A. These steps are carried out in the manner discussed above for method 1100. With regard to the reset-on-send procedure of steps 1178 and 1180, however, it is noted that typically no reset-on-send procedure is performed at the node if a reset-on-receive procedure is performed in steps 1154 and 1160. Use of a reset-on-send procedure would make a reset-on-receive procedure at the next node encountered by the forwarded message superfluous (because bits in bit positions for the incoming links would have already been reset), and BIER-TE-enabled nodes in a BIER-TE domain typically employ the same reset procedure timing if they employ reset procedures at all. When each bit position mapped to an outgoing link in the BTFT has been considered, and a message replica forwarded for each link mapped to a bit position having a set bit in the message bit array, the method ends ("N" branches of decision steps 1190 and 1192).

BIER-TE Network Devices

FIG. 12A is a block diagram illustrating certain components of an exemplary network device that may be associated with a node in one of the networks described herein. Network device 1200 may, for example, be associated with a core router or egress router in network 100 of FIGS. 1 through 3B. In the embodiment of FIG. 12A, network device 1200 includes a forwarding engine 1204, forwarding information 1206 and a communication interface 1202. In an embodiment, communication interface 1202 comprises multiple interfaces, and is configured both for sending and receiving messages within a network and for sending and receiving control information, either between network nodes or between the network device and a controller. Each interface may be a physical interface or a logical interface.

Forwarding engine 1204 is configured to forward messages using stored forwarding information 1206. For example, forwarding engine 1204 may perform a forwarding process similar to that illustrated in FIG. 11B. Forwarding information 1206 is used by forwarding engine 1204. In the embodiment of FIG. 12A, forwarding information 1206 includes neighbor information 1208 and a BIER-TE forwarding table 1210. In an embodiment, neighbor information 1208 is obtained through operation of a protocol other than an IGP, such as a Layer 2 handshaking or announcement protocol. BTFT 1210 includes any mappings of BIER-TE bit positions to links of the node associated with network device 1200. In an embodiment, network device 1200 does not store topology or routing information, and links mapped to bit positions in BTFT 1210 do not include indirect, or routed, links. In such an embodiment, links represented in BTFT 1210 are either directly-connected links or decapsulation links as described in this disclosure. Neighbor information 1208 and BTFT 1210 include information received over interface 1202 from network devices at other nodes and/or from a network controller. In the embodiment of FIG. 12A, communication over interface 1202 is handled via forwarding engine 1204. In other embodiments, storing and updating of forwarding information 1206 may be done through a separate connection to interface 1202, such as via a communication module not shown in FIG. 12A.

Certain components of another embodiment of a network device are illustrated by the block diagram of FIG. 12B. Network device 1220 of FIG. 12B may also be associated with a core router or egress router in network 100 of FIGS. 1 through 3B. In addition to interface 1202 and forwarding engine 1204 as described above for network device 1200, network device 1220 includes a routing module 1212 and routing information 1214. In an embodiment, routing table 1216 within routing information 1214 is a unicast routing table. In the embodiment of FIG. 12B, forwarding information 1207 includes a forwarding table 1218 in addition to neighbor information 1208 and BTFT 1210 as described above for network device 1200. In an embodiment, forwarding table 1218 is a unicast forwarding table built using routing table 1216. In such an embodiment, inclusion of routing module 1212, routing information 1214 and forwarding table 1218 allows network device 1220 to perform BIER-TE forwarding over indirect, or forward-routed, links using unicast tunneling. In the embodiment of FIG. 12B, communication over interface 1202 is handled via forwarding engine 1204 and routing module 1212. In other embodiments, storing and updating of forwarding information 1207 and/or routing information 1214 may be done through separate connections to interface 1202, such as via one or more communication modules not shown in FIG. 12B.

Figure 12C:
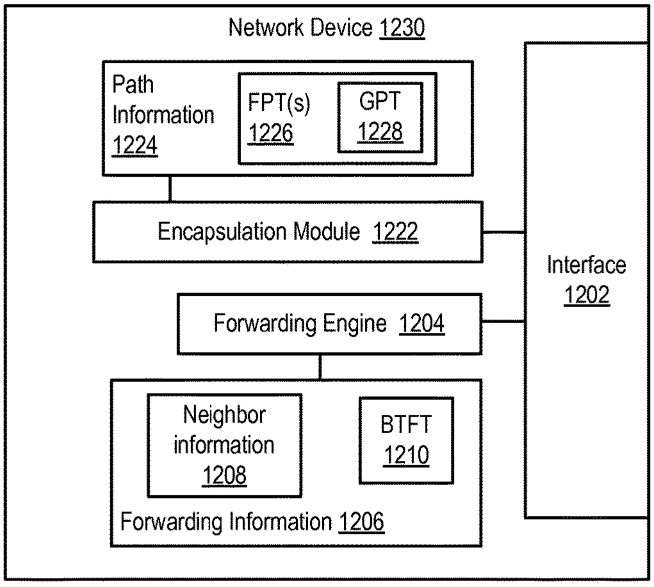

Still another embodiment of a network device is illustrated by the block diagram of FIG. 12C. In an embodiment, network device 1230 of FIG. 12C is associated with an ingress node of a BIER-TE network or domain. In addition to interface 1202, forwarding engine 1204 and forwarding information 1206 as described above for network device 1200 of FIG. 12A, network device 1230 includes an encapsulation module 1222 and path information 1224. Encapsulation module 1222 is configured to encapsulate an incoming message with BIER-TE encapsulation including a message bit array. Path information 1224 includes the message bit arrays needed to encapsulate one or more message flows using the BIER-TE network, where a message flow may include, for example, a multicast group or a traffic-engineered unicast flow. In the embodiment of FIG. 12C, path information 1224 includes one or more flow path tables (FPTs) 1226, where the flow path tables may include a multicast group path table (GPT) 1228. Like network device 1200 of FIG. 12A, network device 1230 does not store topology or routing information in the embodiment of FIG.

12C. In an alternative embodiment, network device 1230 could include a routing module, routing information, and a forwarding table as described above for network device 1220 of FIG. 12B. In the embodiment of FIG. 12C, communication over interface 1202 is handled via forwarding engine 1204 and encapsulation module 1222. In other embodiments, storing and updating of forwarding information 1206 and/or path information 1224 may be done through separate connections to interface 1202, such as via one or more communication modules not shown in FIG. 12C.

Figure 12D:
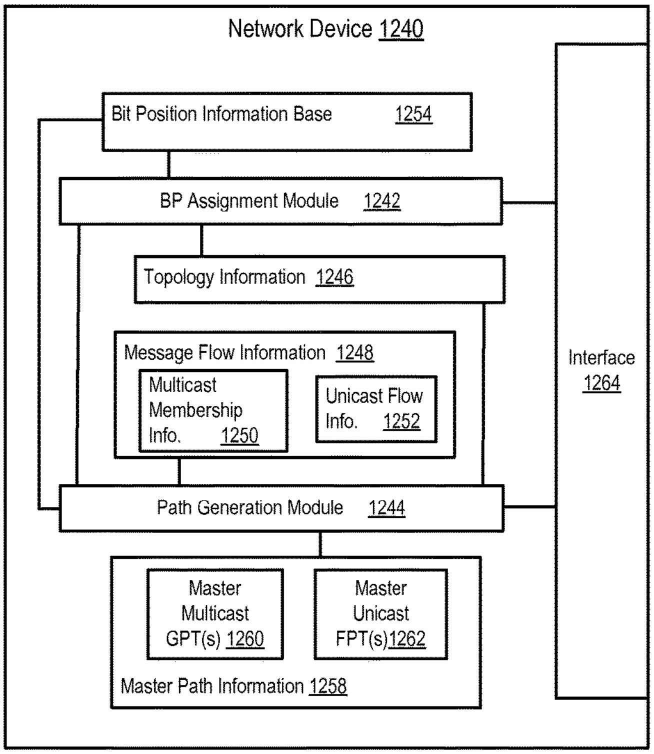

FIG. 12D illustrates certain components of an additional network device for one of the networks described herein. Network device 1240 is configured as a BIER-TE controller. In an embodiment, network device 1240 is associated with a controller host external to the data path of the BIER-TE network. In an alternative embodiment, some or all of the functions of network device 1240 are combined with those of, for example, network device 1230 and performed at an ingress node of the BIER-TE network or domain. In the embodiment of FIG. 12D, network device 1240 includes a bit position assignment module 1242 and a path generation module 1244 coupled to a communication interface 1264. In an embodiment, communication interface 1264 is configured for sending and receiving control information between network device 1240 and other network devices associated with nodes in a BIER-TE network. Communication interface 1264 may comprise multiple interfaces, and each interface may be a logical or physical interface.

Bit position assignment module 1242 is configured to assign bit positions to links within a BIER-TE network that are used to form explicit paths or trees for BIER-TE messages. For example, BP assignment module 1242 may perform an assignment process similar to that in method 700 of FIG. 7. In an embodiment, topology information 1246 is used by BP assignment module 1242. This topology information reflects how the nodes of the BIER-TE network or domain are connected to one another. In an embodiment, the topology information is obtained through interaction with each of the BIER-TE nodes using a control protocol. Alternatively, in an embodiment for which the BIER-TE nodes are running an IGP, topology information may be obtained by network device 1240 through IGP advertisements. In the embodiment of FIG. 12D, BP assignment module 1242 is also configured to use path-related information obtained from path generation module 1244 in assigning bit positions. BP assignment module is configured to store bit position assignments in BP information base 1254 in the embodiment of FIG. 12D. In an embodiment, BP Information Base 1254 acts as a kind of BIER-TE routing table, storing bit position assignments for links throughout the BIER-TE network or domain to which bit positions have been assigned. The information base can then be accessed by, for example, path generation module 1244 for use in determining explicit paths. In addition to storing bit position assignments at network device 1240, BP assignment module 1242 is configured to communicate to the network device at each BIER-TE node the bit position assignments relevant to that node. For example, in an embodiment for which network devices 1200 of FIG. 12A are associated with respective BIER-TE nodes, bit position assignments for the links relevant to each node are communicated to the network device for that node and stored in the corresponding BTFT.

Path generation module 1244 of network device 1240 is configured to determine the explicit path or tree for each message flow forwarded through the BIER-TE network or domain, and to represent the path or tree in a message bit array to be carried by messages in the flow. In addition to topology information 1246, path generation module 1244 is configured to use stored message flow information 1248. In the embodiment of FIG. 12D, message flow information 1248 includes multicast membership information 1250 and unicast flow information 1252. In an embodiment network device 1240 is adapted to receive multicast membership information 1250 from one or more provider edge nodes in a BIER-TE network. Multicast membership information may include multicast source and/or group information for transmissions sent by or received by hosts associated with such provider edge nodes. Network device 1240 is also adapted to receive unicast flow information 1248 from one or more provider edge nodes in some embodiments. In some embodiments network device 1240 is adapted to receive unicast flow information from a flow analysis device using a network flow protocol. In some embodiments of network device 1240 message flow information 1248 is limited to one or the other of multicast membership information 1250 or unicast flow information 1252. Multicast membership information 1250 and unicast flow information 1252 may also be combined into one table or other data structure in some embodiments. Path generation module 1244 is also configured to use bit position information base 1254 in creating a message bit array encoding each generated path or tree.

In the embodiment of FIG. 12D, path generation module 1244 stores master path information 1258, including one or more master multicast group path tables (GPTs) 1260 and one or more master unicast flow path tables (FPTs) 1262. In an embodiment, a master GPT maps message bit arrays to multicast group information for all BIER-TE multicast trees in a network or domain. The multicast groups represented in the master GPT may have different BIER-TE ingress nodes. In addition to storing message bit arrays for multicast groups in its own master GPT, network device 1240 sends message bit arrays and multicast group information to BIER-TE ingress nodes in order to populate a GPT at each ingress node containing message bit arrays for the multicast groups using that ingress node. In an embodiment, a GPT stored at a particular BIER-TE ingress node contains a subset of the message bit array information in master GPT 1260—the subset relating to the multicast groups using that ingress node. Similarly, a master FPT 1262 maps message bit arrays to identifiers of all BIER-TE traffic-engineered unicast flows in a network or domain, and network device 1240 sends message bit arrays and unicast flow information to BIER-TE ingress nodes for particular flows in order to populate an FPT at each ingress node for the flows starting at that node. In other embodiments, master path information 1258 includes only one or the other of master GPT(s) 1260 and master FPT(s) 1262. Master GPT 1260 and master FPT 1262 can also be combined into a single master FPT in some embodiments.

In the embodiment of FIG. 12D, path generation module 1244 and BP assignment module 1242 are configured to communicate with one another. As discussed above, assignment of bit positions and determination of paths are interdependent processes in some embodiments, and may proceed in an iterative manner and/or as an optimization. In an embodiment, information communicated between modules includes any of, or any combination of, bit position information, path information, or message flow information. In the embodiment of FIG. 12D, communication over interface 1264 is handled via BP assignment module 1242 and path generation module 1244. In other embodiments, storing and updating of information such as topology information 1246 and/or message flow information 1248 may be done through separate connections to interface 1264, such as via one or more communication modules not shown in FIG. 12D.

Figure 13:
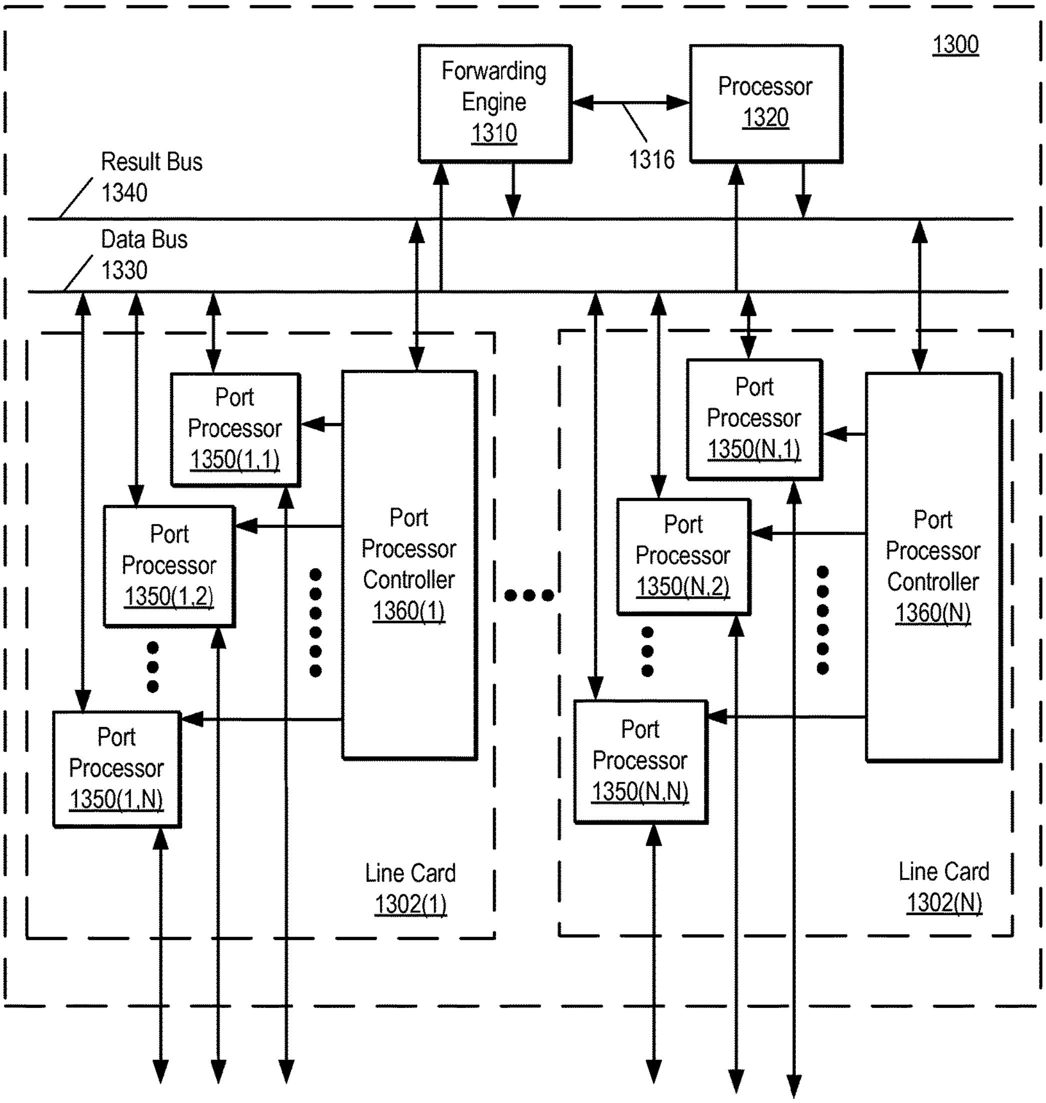
FIG. 13 is a simplified block diagram illustrating certain components of an example network device that can be employed in the networks described herein.

FIG. 13 is a block diagram illustrating certain additional and/or alternative components of nodes that can be employed in the networks described herein. In this depiction, node 1300 includes a number of line cards (line cards 1302(1)-(N)) that are communicatively coupled to a forwarding engine or packet forwarder 1310 and a processor 1320 via a data bus 1330 and a result bus 1340. Line cards 1302(1)-(N) include a number of port processors 1350(1, 1)-(N, N) which are controlled by port processor controllers 1360(1)-(N). It will also be noted that forwarding engine 1310 and processor 1320 are not only coupled to one another via data bus 1330 and result bus 1340, but are also communicatively coupled to one another by a communications link 1316.

The processors 1350 and 1360 of each line card 1302 may be mounted on a single printed circuit board. When a packet or packet and header are received, the packet or packet and header may be identified and analyzed by router 1300 in the following manner. Upon receipt, a packet (or some or all of its control information) or packet and header is sent from the one of port processors 1350(1, 1)-(N, N) at which the packet or packet and header was received to one or more of those devices coupled to data bus 1330 (e.g., others of port processors 1350(1, 1)-(N, N), forwarding engine 1310 and/or processor 1320). Handling of the packet or packet and header can be determined, for example, by forwarding engine 1310. For example, forwarding engine 1310 may determine that the packet or packet and header should be forwarded to one or more of port processors 1350(1, 1)-(N, N). This can be accomplished by indicating to corresponding one(s) of port processor controllers 1360(1)-(N) that the copy of the packet or packet and header held in the given one(s) of port processors 1350(1,1)-(N,N) should be forwarded to the appropriate one of port processors 1350(1,1)-(N,N). In addition, or alternatively, once a packet or packet and header has been identified for processing, forwarding engine 1310, processor 1320 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 14:
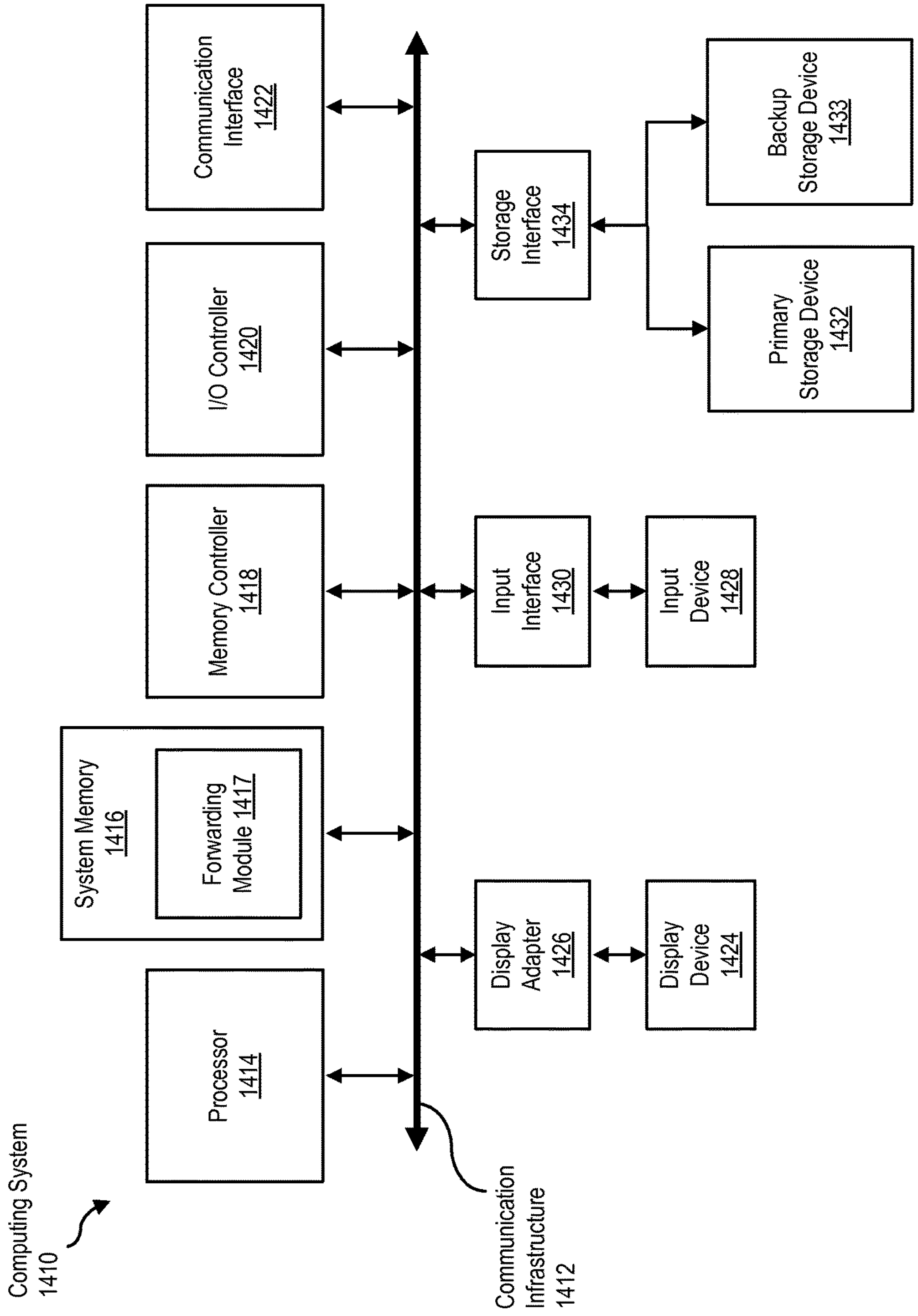
FIG. 14 is a block diagram depicting a computer system suitable for implementing embodiments of the devices and systems described herein.

FIG. 14 is a block diagram of a computing device, illustrating, for example, implementation of a forwarding module in software as described above. Computing system 1410 broadly represents any single or multi-processor computing device or system capable of executing computer-readable instructions. Examples of computing system 1410 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1410 may include at least one processor 1414 and a system memory 1416. By executing the software that implements a forwarding module 1417, computing system 1410 becomes a special purpose computing device that is configured to perform packet forwarding, in the manner described above.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the embodiments described and/or illustrated herein. For example, processor 1414 may perform and/or be a means for performing the operations described herein. Processor 1414 may also perform and/or be a means for performing any other operations, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, program instructions executable to implement a forwarding module configured to forward multicast data packets may be loaded into system memory 1416.

In certain embodiments, computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the operations or features described and/or illustrated herein.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer) for display on display device 1424.

As illustrated in FIG. 14, computing system 1410 may also include at least one input device 1428 coupled to communication infrastructure 1412 via an input interface 1430. Input device 1428 generally represents any type or form of input device capable of providing input, either computer or human generated, to computing system 1410. Examples of input device 1428 include, without limitation, a keyboard, a pointing device, a speech recognition device, or any other input device.

As illustrated in FIG. 14, computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410. A storage device like primary storage device 1432 can store information such as routing tables and forwarding tables.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14.

Computing system 1410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1410 for storage in memory via a network such as the Internet or upon a carrier medium.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1410 may be configured as an application specific integrated circuit (ASIC) adapted to implement one or more of the embodiments disclosed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method comprising:

receiving, at a first node in a network configured for traffic-engineered bit indexed forwarding, a message comprising a message bit array;

comparing bit values at one or more bit positions in the message bit array to one or more entries in a forwarding table stored at the first node, wherein the one or more bit positions are assigned to separate segments of a path or tree in the network; and forwarding the message over a segment represented in the forwarding table if a result of the comparing indicates that the segment is included in a path to be taken by the message, wherein the segment represented in the forwarding table is assigned one of the bit positions in the message bit array, the one of the bit positions in the message bit array does not represent an egress node, of the network configured for traffic-engineered bit indexed forwarding, reachable via the segment, the path to be taken by the message is defined as an end to end connection of multiple segments assigned bit positions having a first bit value in the message bit array, and the forwarding comprises changing the bit value of the bit position, in the message bit array, assigned to the segment represented in the forwarding table.

2. The method of claim 1, wherein:

the message is a multicast message; and forwarding the message comprises forwarding a replica of the multicast message.

3. The method of claim 1, wherein at least one bit position in the message bit array is assigned to a segment from the first node to a core node of the network.

4. The method of claim 1, wherein the comparing comprises comparing at least a portion of the message bit array to a corresponding portion of a link bit array in an entry of the forwarding table.

5. The method of claim 1, wherein the comparing comprises checking a bit value of a bit position in the message bit array, wherein the bit position is assigned to a segment represented in the forwarding table.

6. The method of claim 1, wherein the comparing comprises:

identifying bit positions of one or more set bits in the message bit array; and checking the forwarding table for segments assigned the respective identified bit positions.

7. The method of claim 1, wherein the segment represented in the forwarding table directly connects the first node to an adjacent node in the network.

8. The method of claim 1, wherein the segment represented in the forwarding table comprises an indirect connection to a second node in the network.

9. The method of claim 1, wherein a segment assigned a bit position in the message bit array comprises a link between a network protocol layer used to receive the message at the first node and a different protocol layer of the network.

10. The method of claim 1, wherein at least a portion of information stored in the forwarding table is received from a network controller.

11. The method of claim 10, wherein a representation of a topology of the network is not stored in the first node.

12. A network device associated with a node in a network configured for traffic-engineered bit indexed forwarding, the network device comprising:

one or more network interfaces;

a memory configured to store a forwarding table comprising one or more entries; and a processor configured to receive via one of the network interfaces a message comprising a message bit array, compare bit values at one or more bit positions in the message bit array to one or more entries in the forwarding table, wherein the one or more bit positions are assigned to separate segments of a path or tree in the network, and forward the message over a segment represented in the forwarding table if a result of comparing the bit values indicates that the segment is included in a path to be taken by the message, wherein the segment represented in the forwarding table is assigned one of the bit positions in the message bit array, the one of the bit positions in the message bit array does not represent an egress node, of the network configured for traffic-engineered bit indexed forwarding, reachable via the segment, the path to be taken by the message is defined as an end to end connection of multiple segments assigned bit positions having a first bit value in the message bit array, and forwarding the message comprises changing the bit value of the bit position, in the message bit array, assigned to the segment represented in the forwarding table.

13. The network device of claim 12, wherein the processor is further configured to:

receive a multicast message; and replicate the multicast message.

14. The network device of claim 12, wherein the segment represented in the forwarding table is a segment from the node to another node of the network.

15. The network device of claim 14, wherein the another node of the network is a core node of the network.

16. The network device of claim 12, wherein:

the memory is further configured to store topology information for the network; and the processor is further configured to encapsulate the message for unicast routing to a remote node of the network, wherein the remote node is not directly connected to the node associated with the network device.

17. The network device of claim 12, wherein:

the memory is further configured to store a path table comprising a message bit array encoding a path or tree for a message flow; and the processor is further configured to receive via one of the network interfaces a message without a message bit array, and encapsulate the message with a message bit array retrieved from the path table.

18. The network device of claim 17, wherein:

one or more sources or receivers of the message flow are members of a multicast group; and the path table maps multicast group information to the message bit array.

19. The network device of claim 12, wherein:

a segment assigned a bit position in the message bit array is a link to a higher protocol layer in the network; and the processor is further configured to remove the message bit array from the message and pass the message to the higher protocol layer at the node.

* * * * *